United States Patent [19]

Kawada

[11] Patent Number: 5,754,677
[45] Date of Patent: May 19, 1998

[54] IMAGE PROCESSING APPARATUS

[75] Inventor: Tousuke Kawada, Chiryu, Japan

[73] Assignee: Fuji Machine Mfg. Co., Ltd., Chiryu, Japan

[21] Appl. No.: 546,680

[22] Filed: Oct. 23, 1995

[30] Foreign Application Priority Data

Oct. 25, 1994 [JP] Japan ................... 6-260621

[51] Int. Cl.$^6$ ........................................ G06K 9/00
[52] U.S. Cl. ........................... 382/141; 382/209
[58] Field of Search .................... 382/209, 219,
382/211, 282, 217, 141, 218, 143, 144,
199; 356/237; 348/87, 92

[56] References Cited

U.S. PATENT DOCUMENTS

| | | | |
|---|---|---|---|
| 4,399,554 | 8/1983 | Perkins | 382/141 |
| 5,136,661 | 8/1992 | Kobayasi | 382/282 |
| 5,515,159 | 5/1996 | Sites | 356/237 |
| 5,586,058 | 12/1996 | Aloni | 364/552 |

*Primary Examiner*—Yon Couso
*Attorney, Agent, or Firm*—Oliff & Berridge, PLC

[57] ABSTRACT

An apparatus including a pick-up device which picks up an optical image of an actual object and a background, a first memory which stores image data representing the picked-up image by defining optical-characteristic values at respective positions in the optical image, a second memory which stores seek-template data representing one or more seek templates each of which includes pairs of points matching a reference edge line of a portion or a whole of a reference object, and a processing device for processing the image data and the seek-template data so that the seek template is superposed on the optical image, the image-data processing device including a judging device for making, when the optical-characteristic values of the optical image which correspond to the two points of each pair of each seek template satisfy a predetermined condition relating to an amount of difference between the optical-characteristic values inside and outside an actual edge line of the actual object in the optical image, an individual positive judgement that one of the two points of each pair is located inside the actual edge line and the other point is located outside the actual edge line, and further making, when the individual positive judgment is made with respect to the two points of each pair out of not less than a predetermined amount of the pairs, a total positive judgment that the actual object is identical with the reference object.

40 Claims, 32 Drawing Sheets

```
PRELIMINARY-PROCESSING PROGRAM
begin
    while (for each object to be image-processed)
        if (pattern matching is carried out) then
            while (a master seek template is rotated by changing a rotation angle
                to every 5 degrees from -45 degrees to +45 degrees)
                    individual seek templates are produced based on the master
                    seek template
            endwhile
        endif
    endwhile
end
```

FIG. 7

```
IMAGE-PROCESSING PROGRAM
begin
    if (an object is to be image-processed by only a pattern matching) then
        image processing is carried out by the pattern matching ()
    else if (an object is to be image-processed by the combination of pattern matching) then
        image processing is carried out by a pattern matching manager is ()
    else if (an object is to be image-processed on a virtual screen) then
        image processing is carried out on a virtual screen ()
    else
        image processing is carried out on a physical screen ()
    endif
end
```

FIG. 8

```
PATTERN-MATCHING PROGRAM
begin
    a search window is set
    while (each individual seek template is moved on a rectangular spiral within the search
        window)
        while (for each of individual seek templates having rotation angles of every 5 degrees
            from -45 to 45 degrees)
        if (OK==first seek step () ) then
            if (OK==second seek step () ) then
                if (OK==first measure step () ) then
                    if (OK==second measure step () ) then
                        return (OK )    // normal end
                    endif
                endif
            endif
        endif
        endwhile
    endwhile
    return (ERROR)    // abnormal end
end
```

FIG. 9

```
1   %tplModel{} {
2       %find {
3           _failCount=0;
4           _diffRate=0.9
5           %common{_hs=5.5,_ll=-200,_,diff=-20,_vf=PA} {
6               //  LEFT/RIGHT-EDGE-LINE CHECK
7               %linePair {_x= 32.5      _y= 27.5        _angle=0}
8               %linePair {_x= 32.5      _y=-27.5        _angle=0}
9               //  UPPER/LOWER-EDGE-LINE CHECK
10              %linePair {_x= 27.5      _y= 32.5        _angle=90}
11              %linePair {_x=-27.5      _y= 32.5        _angle=90}
12          }
13          _pitchX=2.2;
14          _pitchY=2.2;
15          _pitchA=4.5;
16          _startA=-45;
17          _endA=45;
18      }
19      %measure{
20          _failCount=0;
21          %common{_hs=3.5,_ll=-200,_vf=PA} {
22              // LEFT/RIGHT-EDGE-LINE CHECK
23              %linePair{_x=32.5,       _y=29.0,        _angle=0}
24              %linePair{_x=32.5,       _y=14.5,        _angle=0}
25              %linePair{_x=32.5,       _y= 0.0,        _angle=0}
26              %linePair{_x=32.5,       _y=-14.5,       _angle=0}
27              %linePair{_x=32.5,       _y=-29.0,       _angle=0}
28              // UPPER/LOWER-EDGE-LINE CHECK
29              %linePair{_x=29.0,       _y=32.5,        _angle=90}
30              %linePair{_x=14.5,       _y=32.5,        _angle=90}
31              %linePair{_x= 0.0,       _y=32.5,        _angle=90}
32              %linePair{_x=-14.5,      _y=32.5,        _angle=90}
33              %linePair{_x=-29.0,      _y=32.5,        _angle=90}
34          }
35      }
36  }
37
```

FIG.10

```
1   %tplMode() {
2       %find{
3           _failCount=0;
4           _diffRate=0.9;
5           // STRAIGHT-EDGE-LINE CHECK
6           %common{_x=29.0,_hs=3.7,_l l=-200,_diff=-20,_vf=PA} {
7               %line{_y= 15.0,          _angle=0}
8               %line{_y=  7.5,          _angle=0}
9               %line{_y=  0.0,          _angle=0}
10              %line{_y= -7.5,          _angle=0}
11              %line{_y=-15.0,          _angle=0}
12          }
13          // CIRCULAR-EDGE-LINE CHECK
14          %common{_pos=POLAR,_r=35.0,_hs=3.7,_l l=-200,_diff=-20,_vf=P} {
15              %linePair{_q= 35.0,      _angle=_q}
16              %linePair{_q=-35.0,      _angle=_q}
17              %linePair{_q= 90.0,      _angle=_q}
18              %line    {_q=180.0,      _angle=q}
19          }
20          _pitchX=1.48;
21          _pitchY=1.48;
22          _pitchA=5.5;
23          _startA=-180;
24          _endA=180;
25      }
26      %measure{
27          _failCount=0;
28          // STRAIGHT-EDGE-LINE CHECK
29          %common{_x=29.0,_hs=1.8,_l l=-200,_diff=-20,_vf=PA} {
30              %line{_y=15.0,           _angle=0}
31              %line{_y=10.0,           _angle=0}
32              %line{_y= 5.0,           _angle=0}
33              %line{_y= 0.0,           _angle=0}
34              %line{_y=-5.0,           _angle=0}
35              %line{_y=-10.0,          _angle=0}
36              %line{_y=-15.0,          _angle=0}
37          }
38          // CIRCULAR-EDGE-LINE CHECK
39          %common{_pos=POLAR,_r=35.0,_hs=1.8,_l l=-200,_diff=-20,_vf=P} {
40              %linePair{_q= 35.0,      _angle=_q}
41              %linePair{_q=-35.0,      _angle=_q}
42              %linePair{_q= 65.0,      _angle=_q}
43              %linePair{_q=-65.0,      _angle=_q}
44              %linePair{_q= 90.0,      _angle=_q}
45
46              %line    {_q= 165.0,     _angle=_q}
47              %line    {_q=-165.0,     _angle=_q}
48              %line    {_q= 180.0,     _angle=_q}
49          }
50      }
51  }
```

FIG.14

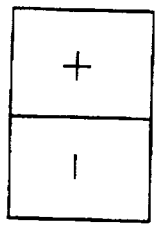
FIG.22
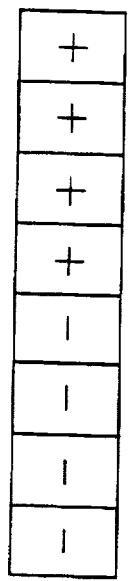
FIG.23
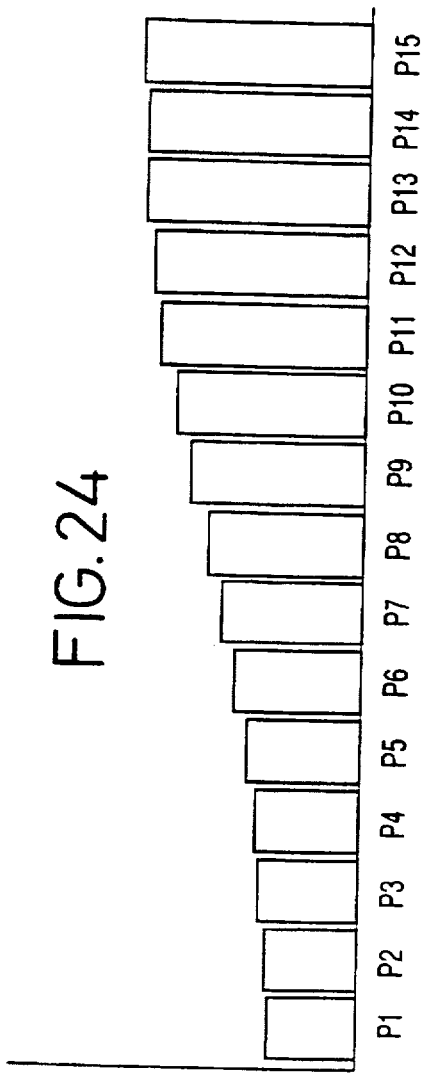
FIG.21
| P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|
| 63 | 65 | 68 | 73 | 80 | 89 | 100 | 112 | 124 | 136 | 145 | 153 | 158 | 161 | 164 |
FIG.24

|       | UPPER | LOWER |      | LEFT | RIGHT |
|-------|-------|-------|------|------|-------|
| 0°    | −     | +     | 90°  | −    | +     |
| 180°  | +     | −     | −90° | +    | −     |

IMAGE PROCESSING APPARATUS

BACKGROUND OF THE INVENTION

1. Field of the Invention

The present invention relates to an apparatus and a method for processing image data representing an optical image and particularly to the art of processing image data representing an optical image taken by an image pick-up device.

2. Related Art Statement

There is known an image processing apparatus including (a) an image pick-up device which picks up an optical image of an actual object; (b) an image-data memory which stores image data representing the optical image picked up by the image pick-up device; and (c) an image-data processing device which processes the image data stored in the image-data memory.

For example, in an image processing apparatus including a CCD (charge-coupled devices) camera as the image pick-up device, the CCD camera has a great number of charge-coupled devices which define an image pick-up surface and provide the same number of sets of binary data indicative of respective amounts of electric charges produced therein. The image-data processing device processes the thus obtained image data and determines an actual edge line, a size, a position, a rotation angle, etc. of the actual object. When the processing device processes the image data, it recognizes an image of the actual object against an image of the background thereof, by using the known normalized or characteristic cross correlation method.

SUMMARY OF THE INVENTION

It is therefore an object of the present invention to provide an apparatus and a method for processing image data by using a technique different from the normalized or characteristic cross correlation method.

The above object has been achieved by the present invention. According to a first aspect of the present invention, there is provided an image processing apparatus comprising an image pick-up device which picks up an optical image of at least a portion of an actual object and a background thereof; an image-data memory which stores image data representing the optical image picked up by the image pick-up device, the image data defining a plurality of optical-characteristic values corresponding to a plurality of positions in the optical image, respectively; a seek-template data memory which stores seek-template data representing at least one seek template, the seek template including a plurality of pairs of points which correspond to a reference edge line of at least a portion of a reference object, the seek-template data including a plurality of sets of paired-points position data each set of which defines respective positions of the two points of a corresponding one of the pairs such that one of the two points is located inside the reference edge line and the other of the two points is located outside the reference edge line; and processing means for processing the image data and the seek-template data so that the seek template represented by the seek-template data is superposed on the optical image represented by the image data, the processing means comprising judging means for making, when the optical-characteristic values of the optical image which correspond to the two points of each of the pairs satisfy a predetermined condition relating to an amount of difference between the optical-characteristic values inside and outside an actual edge line of the actual object in the optical image, an individual positive judgement that one of the two points of the each pair is located inside the actual edge line and the other point of the each pair is located outside the actual edge line, and further making, when the individual positive judgment is made with respect to the two points of each of not less than a predetermined amount of the pairs, a total positive judgment that the actual object in the optical image is identical with the reference object.

In the image processing apparatus in accordance with the first aspect of the invention, the image pick-up device may have an image pick-up surface divided into a great number of picture elements, and may produce the same number of sets of picture-element data indicative of respective optical-characteristic values of the picture elements. The thus obtained sets of picture-element data are stored as the image data in the image-data memory. In this first case, the optical-characteristic values correspond, one by one, to the picture elements. However, in a second case, the image data representing the optical image may define a plurality of optical-characteristic values which correspond to a plurality of arbitrary positions in the optical image which may, or may not, correspond one by one to the picture elements of the image pick-up surface of the image pick-up device. In the first case, the image pick-up device may have a great number of image pick-up elements which define an image pick-up surface and produce, as image data, the same number of electric signals corresponding to amounts of light received thereby. In this case, the optical image represented by the image data can be said as an image physically formed in the image pick-up surface of the image pick-up device. As far as the present invention is concerned, this image will be referred as the "physical image", and a screen (i.e., the image pick-up surface) on which the physical image is formed will be referred to as the "physical screen". The image data representing the physical image are stored in, and read from, the image-data memory, such that sets of data indicative of the electric signals produced by the image pick-up elements are related to respective positions of the image pick-up elements in the image pick-up surface, i.e., the physical screen. Since the physical image actually exists on the physical screen, it can be said as the "real image", in contrast to a "virtual image" which will be described later. Similarly, the physical screen on which the real image is present can be said as the "real screen". The image data representing the real image may be sets of analog or digital data indicative of respective magnitudes of the electric signals produced by the image pick-up elements, for example, multi-level digital data (i.e., gray-scale data) indicative of one of, e.g., 256 discrete values, or binary data indicative of one of two values one of which corresponds to electric-signal magnitudes greater than a threshold value and the other of which corresponds to the other electric-signal magnitudes not greater than the threshold value. In the above-mentioned second case, it may be assumed that the optical-characteristic values defined by the image data, e.g., sets of data indicative of the electric signals produced by the image pick-up elements, correspond to respective center points or positions of the image pick-up elements defining the image pick-up surface, i.e., physical screen. In this case, a continuous curved surface can be defined as containing the optical-characteristic values corresponding to the center positions of the image pick-up elements. This curved surface may be stored as data indicative of an expression defining the surface. Thus, the optical image represented by the thus obtained image data can also be said as the real image. In contrast, without preparing the data indicative of the curved surface in advance, it is possible that when one or more arbitrary positions or points are designated on another screen, only the optical-characteristic values of the real image which correspond to the designated points be selected or calculated. An average, or an interpolated value, of two or more optical-characteristic values may correspond to one designated point according to a predetermined rule. In this case, no real image is present, and an image defined by the optical-characteristic values corresponding to the designated points is referred to as the "virtual image", and the screen on which the virtual image is present is referred to as the "virtual screen". The processing means superposes the seek template on the optical image, i.e., places the two images in a predetermined positional relationship, e.g., defines the two images in a common x-y coordinate system. In the case where the optical image is the physical image, the processing means obtains the optical-characteristic values of the physical image which position-wise correspond to the respective points of the seek template. Meanwhile, in the case where the optical image is the virtual image, the processing means assumes that the seek template is placed on the virtual screen on which the virtual image is present, and obtains the optical-characteristic values of the physical image which position-wise correspond to the respective points of the seek template placed on the virtual screen. In either case, there should be some amount of difference (e.g., difference itself, or ratio) between the optical-characteristic values of the optical image which are located inside and outside the actual edge line of the actual object in the optical image. If the optical-characteristic values of the optical image which position-wise correspond to the two points of each pair in the seek template satisfy a predetermined condition relating to the above-mentioned difference amount, then the judging means makes an individual positive judgment that one of the two points of each pair is located inside the actual edge line of the actual object and the other point is located outside the actual edge line, i.e., in the background in the optical image. And, if the individual positive judgment is made with respect to the two points of each pair out of not less than a predetermined amount (e.g., number or proportion) of all the pairs, then the judging means makes a total positive judgment that the actual object in the optical image is identical with the reference object corresponding to the seek template. The optical-characteristic values may be, e.g., luminance values or hue values. The image data may be sets of analog data, or digital data (e.g., binary data), indicative of the optical-characteristic values, respectively. In particular, in the case where the image data are sets of binary data, the judging means makes an individual positive judgment if one of the two points of each pair corresponds to a set of binary data indicative of "0" and the other point corresponds to a set of binary data indicative of "1". In the case where the image pick-up device picks up the optical image of each of actual objects in a fixed positional relationship, the processing means superposes, at a fixed position, a single seek template on the optical image of each actual object. On the other hand, in the case where at least one of a position and a rotation angle of each actual object may be changeable for some reason, the judging means may seek each actual object by using one or more modified seek templates obtained by changing at least one of a position and a rotation angle of a master seek template. The seek-template memory may store only the master seek template, or both the master seek template and the modified seek templates. In the former case, the judging means may produce, by linear transformation, each of the modified seek templates from the master seek template by changing the position and/or rotation angle of the master seek template. If more than a predetermined number of modified seek templates are used but each actual object is not judged as being identical with the reference object, the judging means may make a final negative judgment that each actual object is not identical with the reference object. Alternatively, if a modified seek template does not fall within a predetermined seek area in which the judging means can seek each actual object, the judging means may make a final negative judgment. The present image processing apparatus is preferably used in an electronic-circuit assembly line. For example, in the case where the present apparatus is employed in an electronic-component (EC) mounting system, it image-processes ECs to be mounted on printed circuit boards (PCBs), and/or detectable marks fixed to the PCBs. Meanwhile, in the case where the present apparatus is employed in a screen printing machine, it image-processes detectable marks fixed to a screen employed therein. The present apparatus may image-process not only a whole, but also a portion, of an object. For example, in the case of a rectangular EC chip, the present apparatus may image-process the whole of the EC chip. Meanwhile, in the case of an EC having lead wires or soldered bumps, the present apparatus may image-process a main portion of the EC other than the lead wires or soldered bumps, or one of the lead wires or soldered bumps. The present apparatus may image-process not only an object located outside an edge line of another object but also an object located inside an edge line of another object. For example, the present apparatus may image-process not only a lead wire or soldered bump located outside an edge line of a main portion of another object but also a lead wire or soldered bump located inside the edge line of the main portion. In the last case, a seek template corresponding to a reference edge line of a reference object located inside an edge line of another object, is used in such a manner that the seek template is superposed on a picked-up optical image, within a seek area where an image of the lead wire or soldered bump is expected to be present inside the edge line of another object. Thus, the present image processing apparatus judges whether an actual object is identical with a reference object, based on image data representing an optical image of the actual object and seek-template data representing one or more seek templates. Since the present apparatus makes this judgment by dealing with only the optical-characteristic values of the optical image which correspond to the points of each seek template, it carries out the image processing of the actual object in a simple manner and in a short time.

In a preferred embodiment in accordance with the first aspect of the invention, the image processing apparatus further comprises a measure-template data memory which stores, for the actual object which is judged by the judging means to be identical with the reference object, measure-template data representing at least one measure template, the measure template including a plurality of segments each of which intersects the reference edge line of the reference object, the measure-template data including a plurality of sets of segment data each set of which defines a corresponding one of the segments such that the one segment connects between two points one of which is located inside the reference edge line and the other of which is located outside the reference edge line, wherein the processing means further comprises edge-point specifying means for specifying, based the optical-characteristic values of the optical image which correspond to each of the segments, an edge point on the each segment which point is located on the actual edge line of the actual object in the optical image. In the present embodiment, the judging means judges whether the actual object is identical with the reference object, and the edge-specifying means specifies the edge points for only the actual object which is judged by the judging means to be identical with the reference object. Since the edge-point specifying means does not specify any edge points for the actual object not identical with the reference object, such as foreign matters, the present apparatus can carry out the image processing of actual objects with high efficiency. The respective segments of the measure template may be obtained by connecting between the two points of each out of the pairs of points of the seek template with which the actual object is judged to be identical with the reference object. In the latter case, it is not necessary to prepare the measure template in advance. In addition, the thus obtained measure template ensures that an edge point is specified on each of more than a predetermined amount of segments out of all the segments, since the seek template from which the measure template is derived includes more than the same amount of pairs of points each pair of which satisfy the predetermined condition relating to an amount of difference between the optical-characteristic values inside and outside the edge line of the actual object in the optical image. However, it is not essentially required that the segments of the measure template be derived from the pairs of points of the seek template, i.e., the measure template may be prepared independent of the seek template. Also, the number of the segments of the measure template may not be equal to that of the pairs of points of the seek template.

According to a preferred feature in accordance with the first aspect of the invention, the processing means further comprises re-judging means for making, based on the edge points specified on the segments by the edge-point specifying means, a positive re-judgment that the actual object in the optical image is identical with the reference object. For example, in the case where there are different sorts of actual objects to be image-processed, a total positive judgment made by the judging means may be incorrect. Hence, the re-judging means re-judges, based on the edge points specified on the segments, whether the actual object which has been judged to be identical with the reference object by the judging means is correctly identical with the reference object. Thus, the reliability of judgment is improved. Since the processing means does not carry out any further image-processing steps on an actual object to which a negative judgment has been made, the efficiency of the image processing is improved.

According to another feature in accordance with the first aspect of the invention, the re-judging means comprises middle-point-utilizing judging means for making the positive re-judgment based on respective positional errors of the edge points specified on the segments from corresponding middle points of the segments. For example, in the case where the actual object is a rectangular EC ship, it is possible to employ a measure template including the same number of equal-length segments for each of two parallel portions of a reference edge line of a reference object for the EC chip. In the latter case, the respective positions of all the segments of the measure template may be pre-determined so that if there is no positional nor angular error between the actual edge line of the actual object and that measure template superposed thereon, then the edge points specified on the segments completely coincide with the corresponding middle points of the segments. However, even though there may be some positional and/or angular errors between the actual object and the measure template, the re-judging means can judge whether the EC chip is identical with the reference object therefor, if an addition of respective vectors starting at the respective middle points and ending at the corresponding edge points is equal to zero.

According to another feature in accordance with the first aspect of the invention, the processing means further comprises object-parameter calculating means for calculating, based on the edge points specified on the segments by the edge-point specifying means, at least one of a size, a position, and a rotation amount of the actual object. In the case where the number of the edge points specified on the segments of the measure template is great enough to determine a shape of the actual edge line of the actual object, the object-parameter calculating means can calculate each of the size, position, and rotation amount or angle of the actual object, based on the edge points only. In the case where the number of the edge points is small, the object-parameter calculating means can determine one or more of those parameters, if the calculating means can get access to aid data indicative of the specific sort of the actual object. In the case where the present image processing apparatus operates for image-processing only a single sort of actual object, such as a rectangular object or alternatively a circular object, the object-parameter calculating means can determine those parameters without having to get access to the aid data. Thus, the processing means can recognize two actual objects having a similar shape but different sizes, against each other, judge whether an error of positioning of an actual object is greater than a threshold value, calculate a correction amount to correct the error of positioning of the object, judge whether an error of angle-positioning of an actual object is greater than a threshold angle, or calculate a correction angle to correct the error of angle-positioning of the object.

According to another feature in accordance with the first aspect of the invention, the object-parameter calculating means comprises middle-point-utilizing calculating means for calculating the at least one of the size, the position, and the rotation amount of the actual object, based on respective positional errors of the edge points specified on the segments from corresponding middle points of the segments. Since each parameter can be calculated from a small number of related values, the errors of calculation are reduced and the accuracy of calculation is improved.

According to another feature in accordance with the first aspect of the invention, the processing means further comprises repeating means for consecutively operating the judging means to judge whether the actual object in the optical image is identical with the reference object, by using each of a plurality of seek templates different from the seek template with respect to at least one of position and rotation angle, until the judging means makes the total positive judgment.

According to another feature in accordance with the first aspect of the invention, the processing means further comprises repeating means for consecutively operating the judging means to judge whether the actual object in the optical image is identical with the reference object, by using each of a plurality of second seek templates different from the seek template as a first seek template with respect to at least one of position and rotation angle, till the judging means makes the total positive judgment; and first segment-producing means for producing the segments of said measure template by straightly connecting between the two points of each pair out of the pairs of points of one of the first and second seek templates with which template the actual object has been judged to be identical with the reference object by the judging means. Without seek-template data representing the seek template in question, the measure template may be produced by the processing means based on parameter data indicative of a shape and a size of the actual object. In the latter case, however, the operator is required to prepare and input the parameter data, and the total amount of working of the operator inevitably increases.

According to another feature in accordance with the first aspect of the invention, the processing means further comprises second segment-producing means for producing a plurality of segments of a re-measure template different from the measure template, based on the edge points specified on the segments of the measure template by the edge-point specifying means, and the edge-point specifying means comprises means for specifying respective edge points on the segments of the re-measure template. The respective positions of the segments of the re-measure template may be determined such that actual edge points to be specified on the segments by the edge-point specifying means are expected to coincide with corresponding reference edge points (e.g., middle points) of the segments. Therefore, as the number of repetition of the edge-point specifying operations increases, the positional errors of actual edge points from the reference edge points decrease. Thus, the respective positions of the actual edge points can be specified with higher accuracy.

According to another feature in accordance with the first aspect of the invention, the second segment-producing means comprises means for producing the re-measure template including a greater number of the segments than a number of the segments of the measure template produced by the first segment-producing means, based on the edge points specified on the segments of the measure template by the edge-point specifying means and master-measure-template data representing a master measure template. Since a greater number of edge points are specified, the size, position, or rotation amount of the actual object can be calculated with higher accuracy.

According to another feature in accordance with the first aspect of the invention, the edge-point specifying means comprises means for calculating the optical characteristic value of the optical image which corresponds to each of division points determined on the each segment; and means for specifying, as the edge point, a point on the each segment where the calculated optical characteristic values corresponding to the division points most significantly change. In the case where the optical image is a physical image present on a physical screen and the measure template is superposed on the physical image on the physical screen, the optical characteristic values of the physical image which position-wise correspond to the division points specified on the segments of the measure template, are read from the image-data memory. On the other hand, in the case where the optical image is a virtual image present on a virtual screen and the measure template is superposed on the virtual image on the virtual screen, the optical characteristic values of the physical image which position-wise correspond to the division points specified on the segments of the measure template, are obtained as image data representing the virtual image. The division points may, or may not, be points designated by point designating means. For example, it is possible to calculate the optical characteristic values of the physical image which correspond to points which are designated on each segment by the point designating means and determine, based on the obtained values, an expression defining the optical characteristic values corresponding to that segment. In the latter case, it is possible to determine division points different from the designated points used to determine the expression and specify edge points based on the optical characteristic values corresponding to the division points. In either case, division points are determined on each segment only, and an edge point is determined based on optical characteristic values corresponding to a considerably small number of division points. Thus, the calculations of edge points can be performed in an easy manner and at a high speed.

According to another feature in accordance with the first aspect of the invention, the image pick-up device comprises a plurality of image pick-up elements each of which detects a light incident thereto and produces an electric signal indicative of an optical characteristic value of the received light, and the edge-point specifying means further comprises means for determining the division points on the each segment at a regular interval of distance which is shorter than a regular interval of distance of the image-pick up elements of the image pick-up device. Since the changes of the optical characteristic values which correspond to the greater number of division points than that of the image pick-up elements, can be dealt with, the degree of resolution of the image processing is increased. That is, the resolution of the image processing is not limited by the size of each image pick-up element of the image pick-up device.

According to another feature in accordance with the first aspect of the invention, the image pick-up device comprises a plurality of image pick-up elements each of which detects a light incident thereto and produces an electric signal indicative of an optical-characteristic value of the received light, the image-data memory stores a set of picture-element data representing the optical-characteristic value indicated by the electric signal produced by the each image pick-up element, in relation with a position of the each image pick-up element in the image pick-up device, and the processing means further comprises designating means for designating a plurality of virtual points on a virtual screen corresponding to a physical screen defined by the image pick-up elements, and means for calculating the optical characteristic value of the optical image which corresponds to each of the virtual points designated by the designating means. Since only the optical characteristic values of the optical image which correspond to the virtual points designated by the designating means, are dealt with, the efficiency of the image processing is improved. Since the number of the virtual points designated by the designating means is considerably small, the image processing of the image data can be completed in a short time. In addition, a memory having a small memory capacity suffices for storing the image data.

According to another feature in accordance with the first aspect of the invention, the image processing apparatus further comprises a monitor device which displays the optical image and the seek template superposed on the optical image, based on the image data and the seek-template data; and an input device which is operable for inputting input-related data into the processing means, and the processing means further comprises control means for operating the monitor device to display, when the input-related data are input through operation of the input device while the monitor device displays the optical image and the seek template, an image corresponding to the input-related data, in place of at least a portion of the optical image and the seek template. The input-related data may be not only data input through the input device but also data obtained by the calculation based on the input data or data read from memory means in response to the input data. While watching the screen of the monitor device, an operator can judge whether he or she has correctly input data, and know the current state or result of the image processing, so that he or she may input modified or corrected data, as needed. Since the single monitor device can display the two images corresponding to the image data and the input-related data, the present image processing apparatus enjoys a simple construction and a low production cost. In addition, since the input-related data are given priority to the image data and the seek (or measure) template data, the operator can input data while reviewing the input data on, e.g., the CRT screen of the monitor device.

According to a second aspect of the present invention, there is provided an image processing apparatus comprising an image pick-up device which picks up an optical image of at least a portion of an actual object and a background thereof; an image data memory which stores image data representing the optical image picked up by the image pick-up device, the image data defining a plurality of optical-characteristic values corresponding to a plurality of positions in the optical image, respectively; a measure-template data memory which stores measure-template data representing at least one measure template, the measure template including a plurality of segments each of which intersects a reference edge line of at least a portion of a reference object, the measure-template data including a plurality of sets of segment data each set of which defines a corresponding one of the segments such that the one segment connects between two points one of which is located inside the reference edge line and the other of which is located outside the reference edge line; and processing means for processing the image data and the measure-template data so that the measure template represented by the measure-template data is superposed on the optical image represented by the image data, the image-data processing means including edge-point specifying means for specifying, based the optical-characteristic values of the optical image which correspond to each of the segments, an edge point on the each segment which point is located on an actual edge line of the actual object in the optical image. The measure-template data memory may store the measure-template data defining the at least one measure template in a coordinate system, the edge-point specifying means comprising means for determining coordinate values of the edge point in the coordinate system.

In the image processing apparatus in accordance with the second aspect of the invention, the processing means superposes the measure template on the optical image, i.e., places the two images in a predetermined positional relationship, e.g., defines the two images in a common x-y coordinate system. The optical image represented by the image data may be a physical or real image present on a physical or real screen, or a virtual image present on a virtual screen. In the case where the optical image is the physical image, the processing means obtains the optical-characteristic values of the physical image which position-wise correspond to each of the respective segments of the measure template. Meanwhile, in the case where the optical image is the virtual image, the processing means assumes that the measure template is placed on the virtual screen on which the virtual image is present, and obtains the optical-characteristic values of the physical image which position-wise correspond to each of the respective segments of the measure template placed on the virtual screen. Since there is a difference between the optical-characteristic values of the optical image which are located inside and outside the actual edge line of the actual object in the optical image, rates of change of the optical-characteristic values of the optical image which position-wise correspond to each of the segments of the measure template should most significantly change on the actual edge line of the actual object in the optical image. Therefore, the edge-point specifying means may specify an edge point on each segment based on the optical-characteristic values of the optical image which position-wise correspond to each segment. In the present image processing apparatus, the edge-point specifying means specifies the edge points on the segments of the measure template. In the case where the present apparatus is provided with data indicative of a shape of the actual object, it can determine a size, a position, a rotation amount, etc. of the actual object by using a measure template including a considerably small number of segments. Even if the present apparatus is not provided with data indicative of a shape of the actual object, it can determine or estimate, using a measure template having a considerably great number of segments, the shape of the actual object based on many edge points specified on the many segments of the measure template, and can determine a size, a position, a rotation amount, etc. of the actual object based on the shape and the specified edge points.

According to a preferred feature in accordance with the second aspect of the invention, the edge-point specifying means comprises means for specifying, based on the image data stored in the image-data memory, the edge point on the each segment such that the specified edge point corresponds to a maximum value of respective absolute values of change rates of the optical characteristic values of the optical image which correspond to the each segment. The optical characteristic values of the optical image may be luminance values, and the respective absolute values of change rates of the luminance values corresponding to each segment takes a maximum value at the edge point, under normal conditions.

According to another feature in accordance with the second aspect of the invention, the processing means further comprises failure-treating means for recognizing, when the maximum value of the respective absolute values of the change rates is smaller than a reference value, a failure with the each segment and inhibiting the edge-point specifying means from specifying the edge point on the each segment with which the failure is recognized. For example, if dust adheres to the edge line of the actual object, or a defect is present on the edge line, where the actual object has greater luminance values than those of the background, then the edge line of the actual object may exhibit decreased luminance values and have little difference from those of the background. If, in the last case, an edge point is specified, on each segment, at a position corresponding to a maximum value of respective absolute values of the change rates of the luminance values, then the edge point might be erroneously specified on the outline of the dust or defect. However, the present apparatus is free from this problem.

According to another feature in accordance with the second aspect of the invention, the processing means further comprises object-parameter calculating means for calculating, based on the edge points specified on the segments by the edge-point specifying means, at least one of a size, a position, and a rotation amount of the actual object, and control means for operating, when the failure-treating means recognizes the failure on each of not more than a predetermined amount of segments out of the segments, the object-parameter calculating means to calculate the at least one of the size, the position, and the rotation amount of the actual object, and inhibiting, when the failure-treating means recognizes the failure on each of more than the predetermined amount of segments, the calculating means from calculating the size, the position, and the rotation amount.

According to another feature in accordance with the second aspect of the invention, the object-parameter calculating means comprises positional-error determining means for determining, based on positional errors between the edge points specified on the segments by the edge-point specifying means, and corresponding ones of a plurality of target edge points, a positional error of a first position of a representative point of the actual object from a second position of a reference representative point. The positional error of the first position of the representative point of the actual object contains errors of distance and direction as measured from the second position of the reference representative point. The calculation of the positional error of the first position is carried out by taking into account whether a plurality of failures have been recognized with a plurality of segments of the measure template and/or with which segment or segments a failure or failures has/have been recognized.

According to another feature in accordance with the second aspect of the invention, the object-parameter calculating means further comprises size determining means for determining the size of the actual object; and size-factor determining means for determining a size factor defined by a ratio of the size determined by the size determining means, to a reference size of the reference object, and the positional-error determining means comprises target-edge-point determining means for determining the target edge points based on the size factor determined by the size-factor determining means and a plurality of reference edge points corresponding to the reference edge line of the reference object having the reference size.

According to another feature in accordance with the second aspect of the invention, the size-factor determining means comprises single-size-factor determining means for determining, as the size factor, an average of respective ratios of a plurality of actual dimensions of the actual object in a plurality of different directions, to a plurality of reference dimensions of the reference object in the different directions.

According to another feature in accordance with the second aspect of the invention, the size-factor determining means comprises plural-size-factors determining means for determining, as the size factor with respect to each of a plurality of different directions, a ratio of an actual dimension of the actual object in the optical image in the each direction, to a reference dimension of the reference object in the each direction.

According to a third aspect of the present invention, there is provided an electronic-component feeding system, comprising an image processing apparatus in accordance with the first or second aspect of the invention; an intermittent-rotation member which is intermittently rotated by a predetermined angle; a plurality of holding devices which are provided on the intermittent-rotation member such that the holding devices are equiangularly spaced from each other by the predetermined angle, each of the holding devices being adapted to hold an electronic component as the actual object, wherein when the intermittent-rotation member is intermittently rotated, the each holding device is sequentially moved to each of a plurality of stopping positions where the each holding device is stopped, so that the electronic component held by the each holding device is fed from a start position as one of the stopping positions to an end position as another of the stopping positions; the image-pick up device being provided at an intermediate position between the start and end positions, and picking up, as the optical image, an image of the electronic component held by the each holding device; the image-data memory concurrently storing a first number of batches of image data representing respective images of the electronic components held by the first number of holding devices out of the holding devices, the first number being not greater than a second number of the intermittent rotations from the intermediate position to the end position; and the image processing apparatus finishing the processing of each batch of image data out of the first number of batches of image data, before the electronic component corresponding to the each batch of image data is moved to the end position.

In the electronic-component feeding system in accordance with the third aspect of the invention, when the intermittent-rotation member feeds both a first actual object needing a short time for image processing thereof and a second actual object needing a long time for the same purpose, the image processing apparatus image-processes both the first and second actual objects in such a manner that an average of the short and long times is equal to, or shorter than, a time needed for each intermittent rotation of the intermittent-rotation member. Thus, the time needed for each intermittent rotation (i.e., sum of respective times of stopping and rotation) can be reduced.

According to a preferred feature in accordance with the third aspect of the invention, the each holding device receives the electronic component from an electronic-component supplying device, at a receiving position as the start position, and mounts the electronic component on a substrate as the actual object, at a mounting position as the end position.

According to a fourth aspect of the present invention, there is provided a method of processing image data representing an optical image of at least a portion of an actual object and a background thereof, comprising the steps of picking up the optical image by using an image pick-up device, storing, in an image data memory, the image data representing the optical image picked up by the image pick-up device, the image data defining a plurality of optical-characteristic values corresponding to a plurality of positions in the optical image, respectively, storing, in a seek-template data memory, seek-template data representing at least one seek template, the seek template including a plurality of pairs of points which correspond to a reference edge line of at least a portion of a reference object, the seek-template data including a plurality of sets of paired-points position data each set of which defines respective positions of the two points of a corresponding one of the pairs such that one of the two points is located inside the reference edge line and the other of the two points is located outside the reference edge line, and processing the image data and the seek-template data so that the seek template represented by the seek-template data is superposed on the optical image represented by the image data, wherein, when the optical-characteristic values of the optical image which correspond to the two points of each of the pairs satisfy a predetermined condition relating to an amount of difference between the optical-characteristic values inside and outside an actual edge line of the actual object in the optical image, an individual positive judgement is made that one of the two points of the each pair is located inside the actual edge line and the other point of the each pair is located outside the actual edge line, and wherein, when the individual positive judgment is made with respect to the two points of each of not less than a predetermined amount of the pairs, a total positive judgment is made that the actual object in the optical image is identical with the reference object.

In the image processing method in accordance with the fourth aspect of the invention, whether the actual object is identical with the reference object is judged at a high speed.

In a preferred embodiment in accordance with the fourth aspect of the invention, the method further comprises the steps of storing, in a measure-template data memory, measure-template data representing at least one measure template, for the actual object which is judged to be identical with the reference object, the measure template including a plurality of segments each of which intersects the reference edge line of the reference object, the measure-template data including a plurality of sets of segment data each set of which defines a corresponding one of the segments such that the one segment connects between two points one of which is located inside the reference edge line and the other of which is located outside the reference edge line, and specifying, based the optical-characteristic values of the optical image which correspond to each of the segments, an edge point on the each segment which point is located on the actual edge line of the actual object in the optical image.

According to a preferred feature in accordance with the fourth aspect of the invention, the step of processing the image data comprises processing the image data representing an optical image of a portion of an electronic component as the portion of the actual object and a background of the portion of the electronic component.

According to another feature in accordance with the fourth aspect of the invention, the step of processing the image data comprises processing the image data representing an optical image of a whole of an electronic component as a whole of the actual object and a background of the whole of the electronic component.

According to a fifth aspect of the present invention, there is provided a method of processing an optical image of at least a portion of an actual object and a background thereof, comprising the steps of picking up the optical image by using an image pick-up device, storing, in an image data memory, image data representing the optical image picked up by the image pick-up device, the image data defining a plurality of optical-characteristic values corresponding to a plurality of positions in the optical image, respectively, storing, in a measure-template data memory, measure-template data representing at least one measure template, the measure template including a plurality of segments each of which intersects a reference edge line of at least a portion of a reference object, the measure-template data including a plurality of sets of segment data each set of which defines a corresponding one of the segments such that the one segment connects between two points one of which is located inside the reference edge line and the other of which is located outside the reference edge line, and processing the image data and the measure-template data so that the measure template represented by the measure-template data is superposed on the optical image represented by the image data, wherein, based the optical-characteristic values of the optical image which correspond to each of the segments, an edge point is specified on the each segment such that the edge point is located on an actual edge line of the actual object in the optical image.

In the image processing method in accordance with the fifth aspect of the invention, the edge points are specified for the actual object, at a high speed.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 7 is a view representing a preliminary-processing program which is stored in a DRAM (dynamic RAM) of the control device of FIG. 6;

FIG. 8 is a view representing an image-processing program which is stored in the DRAM of FIG. 6;

FIG. 9 is a view representing a pattern-matching program which is stored in the DRAM of FIG. 6;

FIG. 10 is a view showing data needed to carry out the pattern-matching program on a square EC;

FIG. 14 is a view showing data needed to carry out the pattern-matching program on a partly cut disc as an actual object to be image-processed;

FIG. 21 is a table showing luminance values calculated as corresponding to the division points of FIG. 20;

FIG. 22 is a view of a differential filter used to differentiate the luminance values of FIG. 21;

FIG. 23 is a view of another differential filter used to differentiate the luminance values of FIG. 21;

FIG. 24 is a graph showing the luminance values of FIG. 21;

DETAILED DESCRIPTION OF THE PREFERRED EMBODIMENTS

Figure 1:
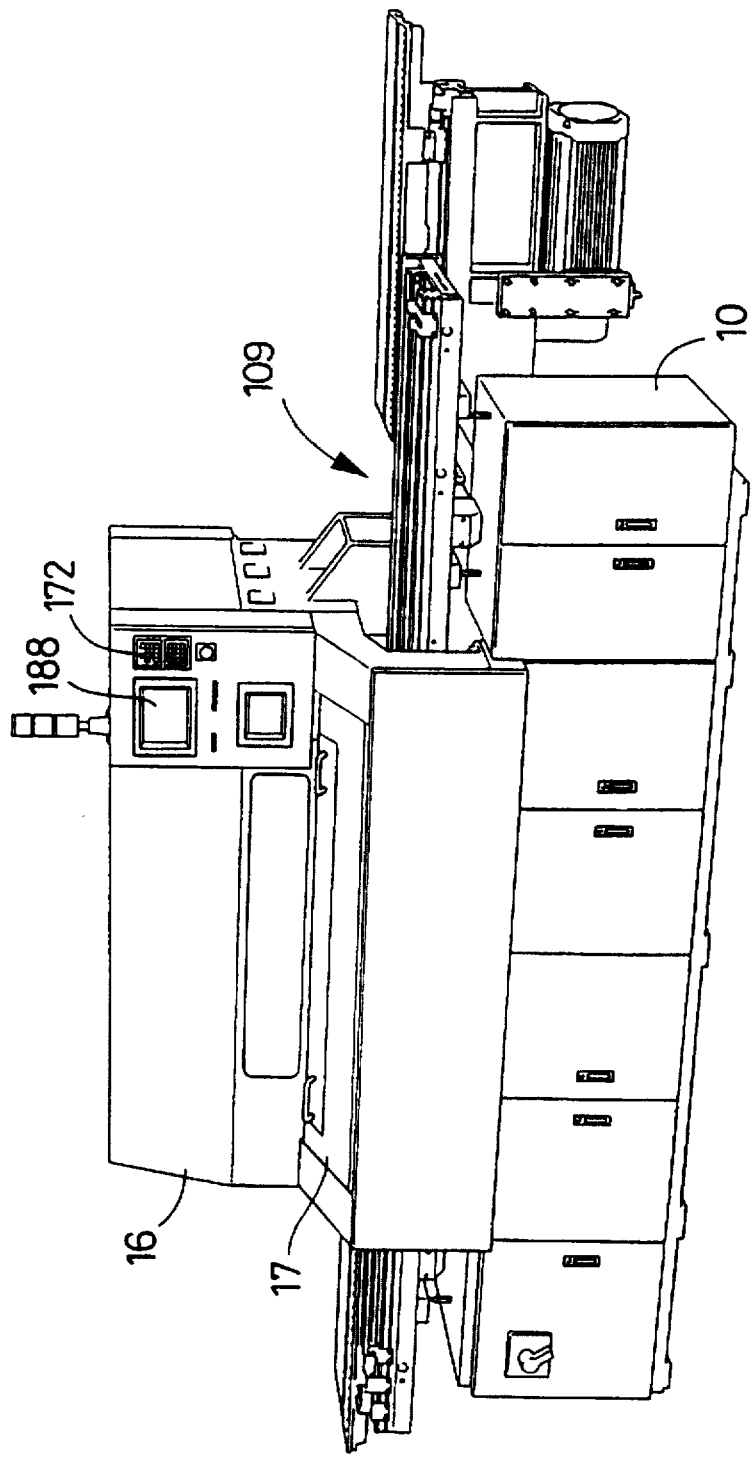
FIG. 1 is a perspective view of an electronic-component (EC) mounting system including an image processing apparatus to which the present invention is applied.
Figure 2:
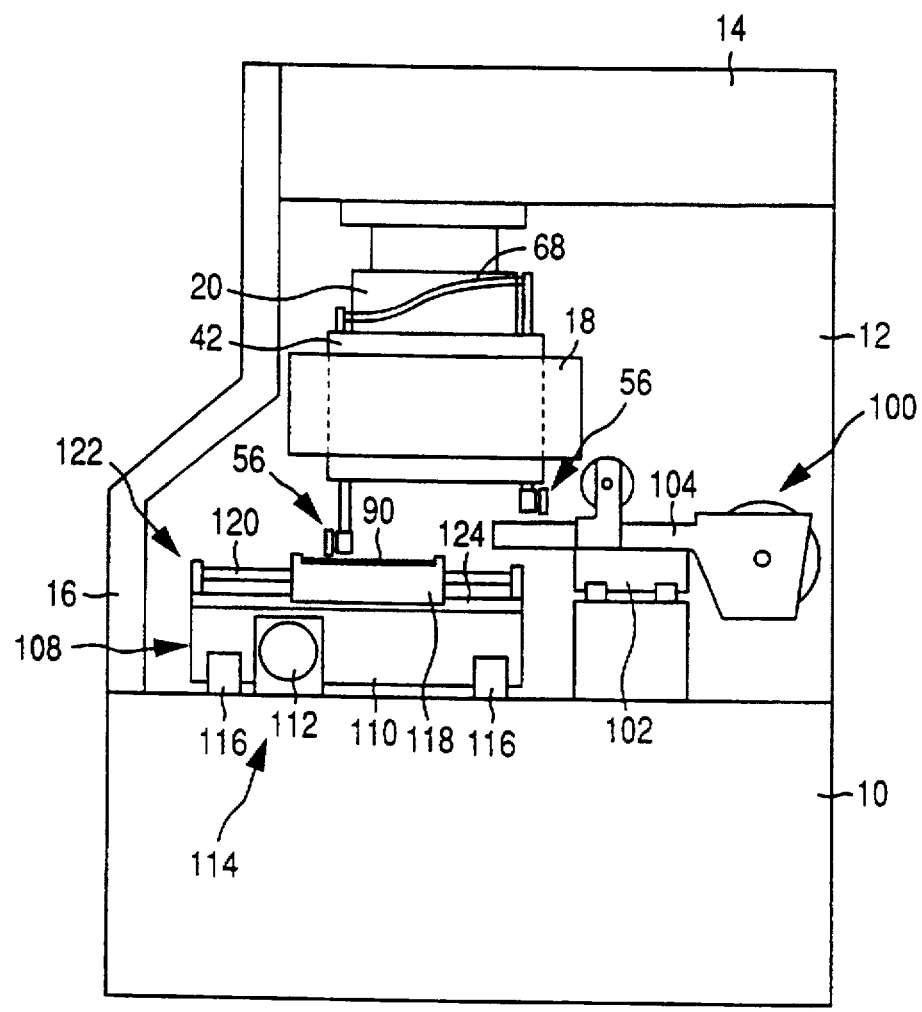
FIG. 2 is an elevation view of an index table, an EC supplying device, and a printed-circuit-board (PCB) feeding device of the EC mounting system of FIG. 1.

Referring first to FIGS. 1 and 2, there is shown an electronic-component mounting system including an image processing apparatus to which the present invention is applied. The mounting system is for mounting electronic components (hereinafter, referred to as the "EC" or "ECs" if appropriate) on an object such as a printed circuit board ("PCB" or "PCBs").

Reference numeral 10 designates a bed on which a pair of side walls 12 stand upright. In FIG. 2, one of the side walls 12 is removed for illustrative purposes and only the other side wall 12 is shown. The two side walls 12 are provided at respective positions apart from each other in an X direction in which PCBs are conveyed, and each side wall 12 extends in a Y direction perpendicular to the X direction. The two side walls 12 cooperate with each other to support a cam box 14 on respective top ends thereof. A front wall 16 is provided in front of the side walls 12. A cover member 17 which can be opened and closed cooperates with the front wall 16 to cover a front portion of the EC mounting system.

Figure 3:
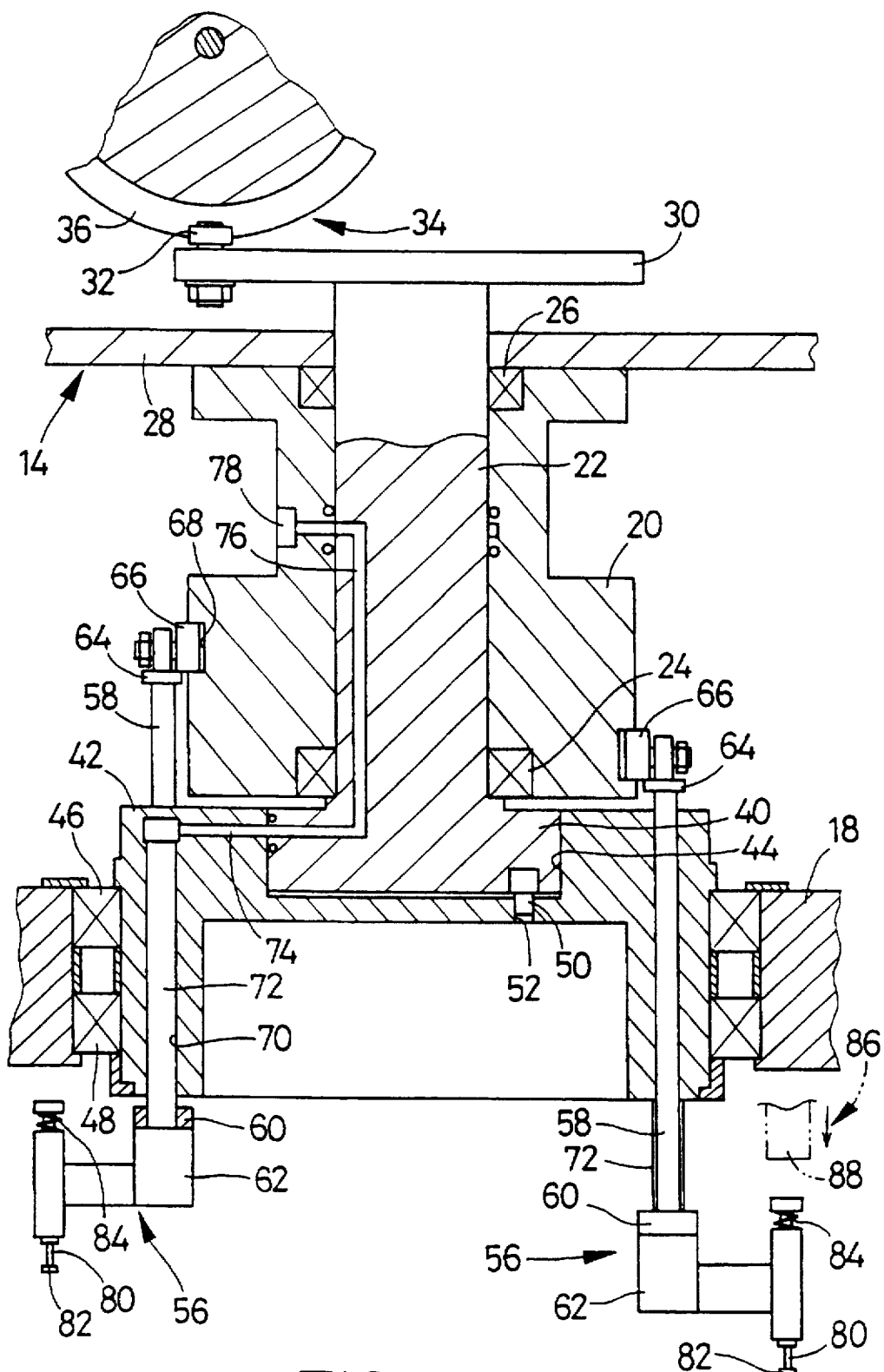
FIG. 3 is a cross-sectional elevation view of the index table and a table-rotating device of the system of FIG. 1.

Respective intermediate portions of the two side walls 12 cooperate with each other to bear a support plate 18 extending parallel to the X direction. As shown in FIG. 3, a cylindrical cam 20 is fixed to the cam box 14, so that the cam 20 and the box 14 cooperate with each other to support an axis member 22 via bearings 24, 26 such that the axis member 22 is rotatable about a vertical axis line thereof and is immovable parallel to the axis line thereof. A top end portion of the axis member 22 projects upward through a bottom wall 28 of the cam box 14, and a large-diameter disc 30 is fixed to the top end of the axis member 22. A plurality of rollers 32 are attached to the disc 30 such that each roller 32 is rotatable about a vertical axis line thereof. The rollers 32 can sequentially engage a groove 36 of a barrel cam 34.

A bottom end portion of the axis member 22 projects downward from the cylindrical cam 20, and provides a large-diameter engagement portion 40, which is engaged with an engagement hole 44 of an index table 42. The index table 42 is supported by the support plate 18 via bearings 46, 48 such that the index table 42 is rotatable about a vertical axis line thereof and is immovable parallel to the axis line thereof. A pin 50 which is fixed to the engagement portion 40 of the axis member 22, is engaged with a hole 52 of the index table 42, so that the rotation of the axis member 22 may be transmitted to the index table 42. When the barrel cam 34 is rotated by an electric motor (not shown) and the rollers 32 are sequentially engaged with the groove 36 of the cam 34, the axis member 22 and the index table 42 are intermittently rotated, each time by a predetermined angle.

Figure 4:
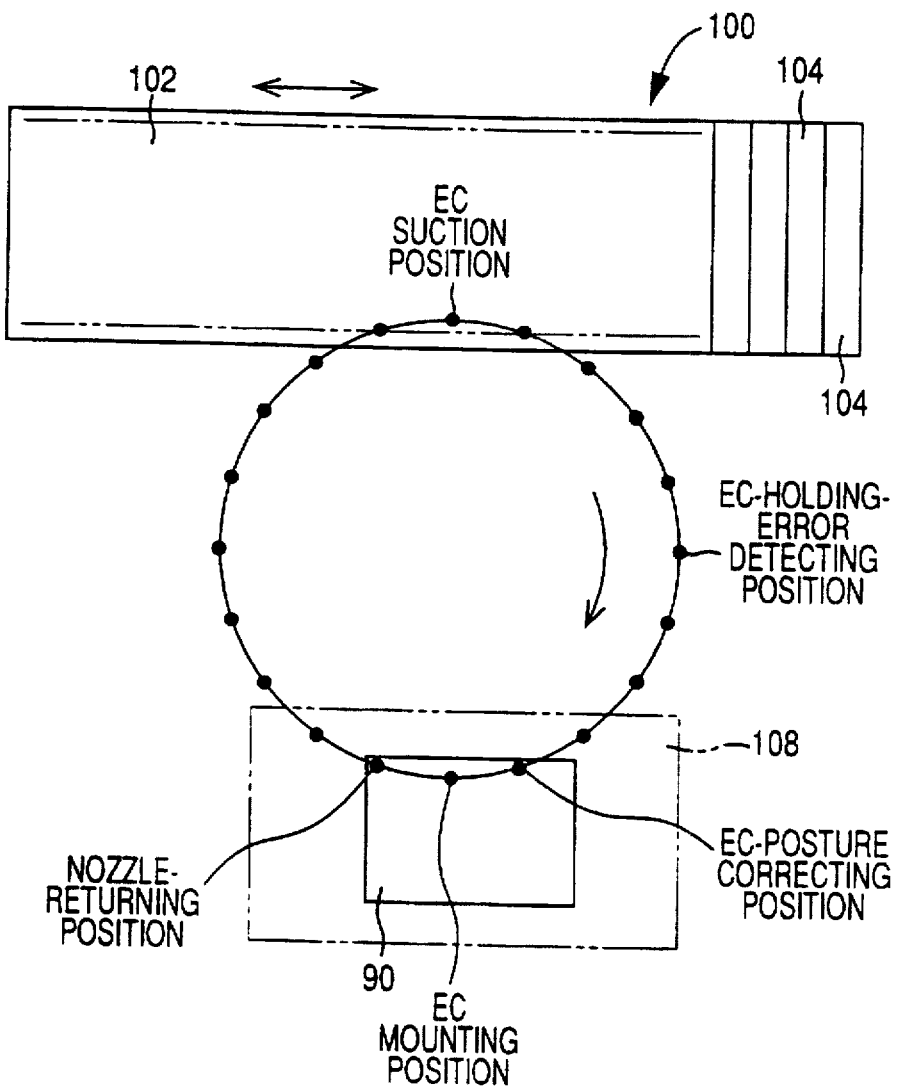
FIG. 4 is a schematic plan view showing twenty operative positions provided in the system of FIG. 1, together with the EC supplying device and the PCB.

Twenty EC mounting heads 56 (only two 56 are shown in FIG. 3) are attached to the index table 42 equiangularly along a circle whose center rides on the axis line of the index table 42. As shown in FIG. 4, twenty operative positions such as an EC suction position, an EC-holding-error detecting position, an EC-posture correcting position, an EC mounting position, a nozzle returning position, etc. are provided around the index table 42. When the index table 42 is intermittently rotated, each of the EC mounting heads 56 is sequentially moved to each of the twenty operative positions.

Each EC mounting head 56 is fixed to a pair of guide rods 58 (only one 58 is shown in FIG. 3) which are slideably fit in the index table 42 such that the guide rods 58 are movable up and down. Respective bottom ends of the pair of guide rods 58 are fixed to a support member 60 which supports a base member 62 of each EC mounting head 56. Respective top ends of the two guide rods 58 are connected to a connection plate 64 to which a roller 66 is attached such that the roller 66 is rotatable about an axis line thereof extending radially of the index table 42 and such that the roller 66 is engaged with a groove 68 formed in an outer circumferential surface of the cylindrical cam 20. As shown in FIG. 2, an elevation level or height of the groove 68 changes so that as the index table 42 is rotated, each EC mounting head 56 is moved up and down between an uppermost position, i.e., EC suction position and a lowermost position, i.e., EC mounting position.

A pipe 72 is fit in a hole 70 formed in a vertical direction through the index table 42 such that the pipe 72 is airtight and movable along an axis line thereof. A lower end of the pipe 72 is fixed to the support member 60. The hole 70 is connected to a vacuum source (not shown) via a first passage 74 formed in the index table 42, a second passage 76 formed in the axis member 22, a port 78 formed in the cylindrical cam 20, and a hose (not shown). A vacuum or negative pressure is supplied to each EC mounting head 56 via the pipe 72. Even when each EC mounting head 56 is moved up and down, the supplying of the vacuum to each mounting head 56 is maintain ed because of the moving up and down of the pipe 72.

A suction nozzle 80 is fit in the base member 62 of each EC mounting head 56 such that the suction nozzle 80 is rotatable about an axis line thereof and is movable along the axis line thereof. The suction nozzle 80 holds an EC (electronic component) 82 by applying suction to the EC 82 using the vacuum supplied via the pipe 72, etc. The suction nozzle 80 is biased upward by a biasing spring 84 relative to the base member 62 of each EC mounting head 56, and is pushed down by a pushing member 88 of a pushing device 88 which is provided at each of the EC suction position and the EC mounting position, so that the suction nozzle 80 takes the EC 80 and mounts the same 80 on a PCB (printed circuit board) 90.

As shown in FIG. 2, an EC supplying device 100 is provided at the EC suction position. The EC supplying device 100 includes a movable table 102 which is movable along a straight line which is tangent to a locus of rotation of the index table 42 and extends parallel to the X direction. The EC supplying device 100 additionally includes a plurality of EC supplying cartridges 104 which are arranged in a direction of movement of the movable table 102. When the movable table 102 is moved by a table moving device (not shown), a selected one of the EC supplying cartridges 104 is moved to an EC supplying position where the selected cartridge 114 supplies ECs 82 to the EC mounting heads 56.

Each EC supplying cartridge 104 feeds an EC carrier tape which includes an EC accommodating tape having a plurality of EC accommodating pockets accommodating a plurality of ECs 82, respectively, and a cover film covering respective openings of the EC accommodating pockets. Each cartridge 104 includes a tape feeding device (not shown) which feeds, by utilizing an air cylinder as a drive source, the EC carrier tape in the Y direction perpendicular to the X direction in a horizontal plane. As the EC carrier tape is fed by the tape feeding device of each cartridge 104, the cover film is peeled off the EC accommodating tape and a leading one of the EC accommodating pockets from which the cover film has been removed is positioned at an EC taking position, i.e., EC suction position, so that the EC 82 is taken from the leading pocket by the EC suction nozzle 80 of each EC mounting head 56.

As shown in FIG. 2, at the EC mounting position, a PCB feeding device 108 which supports the PCB 90 as an object on which ECs 82 are to be mounted and moves the PCB 90 in the X and Y directions, is provided at an elevation level lower than that at which a PCB conveyor 109 (FIG. 1) is provided. The PCB feeding device 108 includes an X-direction table 110, X-direction guide rails 116, and an X-direction moving device 114 which includes an X-direction servo motor 112 and a ball screw, a nut, etc. (not shown) and moves the X-direction table 110 in the X direction.

A Y-direction table 118 is provided on the X-direction table 110. A Y-direction moving device 122 which includes a Y-direction servo motor (not shown), a ball screw 120, a nut (not shown), etc., cooperates with Y-direction guide rails 124 to move the Y-direction table 118 in the Y direction. On the Y-direction table 118, there is provided a PCB supporting and moving device (not shown) which receives a PCB 90 from the PCB conveyor 109, supports the PCB 90 by sandwiching the same 90 between upper PCB-hold-down members and lower PCB-support members, and moves the PCB 90 up and down. The PCB conveyor 109 conveys each PCB 90 in the X direction, and the PCB 90 is transferred onto the PCB supporting and moving device. The PCB 90 supported on the PCB supporting and moving device is movable to any position in a horizontal plane lower than the elevation level of the PCB conveyor 109, based on the combination of the respective movements of the X-direction and Y-direction tables 110, 118.

Two detectable marks are fixed to each PCB 90, and respective images of the PCB marks are taken by a first CCD (charge-coupled devices) camera 128 (FIG. 6) provided on the bed 10. The CCD camera 128 is employed as an image pick-up device in the present embodiment. After the PCB 90 is put on the PCB supporting and moving device, the PCB 90 is moved down and subsequently moved by the PCB moving device 108 to an image pick-up position where each of the PCB marks is aligned with an axis line of the CCD camera 128, so that the image of each PCB mark is picked up by the CCD camera 128.

The PCB moving device 108 is provided at a position lower than those at which the PCB conveyor 109 and the EC supplying device 100 are provided. The PCB moving device 108 is provided at such a position which ensures that when the PCB 90 is supported on the PCB supporting and moving device being currently placed at a lowermost, PCB supporting position thereof, the PCB moving device 108 can enter a space under each EC supplying cartridge 104. Thus, the PCB moving device 108 and the EC supplying device can be provided to overlap each other in a horizontal direction, and the EC mounting system can be constructed to be compact.

Figure 5:
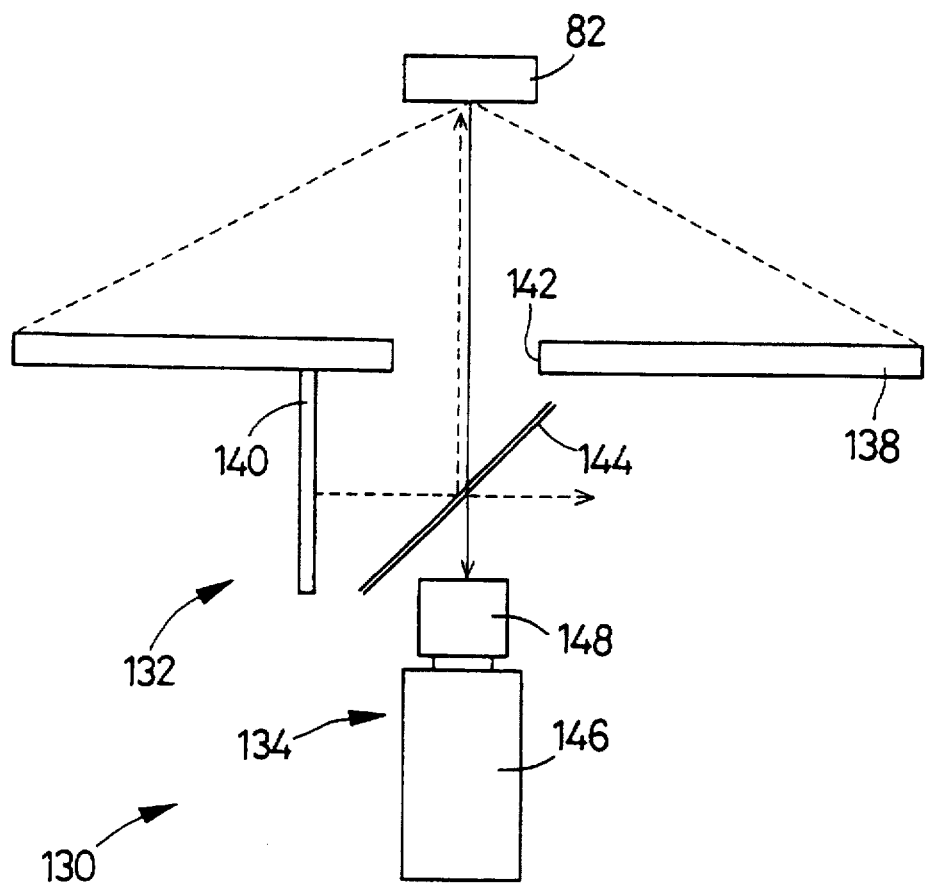
FIG. 5 is an elevation view showing a CCD camera provided at an EC-holding-error detecting position as one of the operative positions of the system of FIG. 1, together with a lighting device therefor.

At the EC-holding-error detecting position, there is provided an image taking device 130 as shown in FIG. 5. The image taking device 130 includes a lighting device 132 and a second CCD camera 134 as an image pick-up device. The lighting device 132 includes a first flat-light emitter 138 and a second flat-light emitter 140. The first light emitter 138 extends in a horizontal direction, and includes a number of light emitting diodes covered by a milky scattering plate. Thus, the first light emitter 138 emits scattered light through the scattering plate. The first light emitter 138 has a through-hole 142 which is formed at a position where the through-hole 142 is aligned with the EC suction nozzle 80 of each EC mounting head 56 being stopped at the EC-holding-error detecting position and which extends in a vertical direction through a thickness of the first light emitter 138. The second light emitter 140 is provided under the first light emitter 138 such that the second light emitter 140 extends in a vertical direction. The second light emitter 140 includes a number of light emitting diodes covered by a milky scattering plate. Thus, the second light emitter 140 emits scattered light through the scattering plate toward a half mirror 144 which is provided under the first light emitter 138 such that the half mirror 144 is aligned with the through-hole 142 of the first light emitter 138.

The half mirror 144 is inclined by 45 degrees with respect to respective planes of the first and second flat light emitters 138, 140. The second CCD camera 134 is provided opposite to the first light emitter 138 with respect to the half mirror 144. The CCD camera 134 includes a lens 148 and an image-sensing device 146 in which a number of solid-state image pick-up elements (i.e., CCDs) are arranged in a flat plane to provide an image pick-up surface.

Each EC 82 is irradiated with the light emitted by the first light emitter 138, and with the light which has been emitted by the second light emitter 138, subsequently been reflected by the half mirror 144, and then passed through the through-hole 142 of the first light emitter 138. Thus, the EC 82 is highly uniformly irradiated as if the EC 82 were irradiated by the second CCD camera 134 as well. In the present embodiment, the first and second light emitters 138, 140 and the half mirror 144 cooperate with one another to provide the lighting device 132. The light reflected by the EC 82 passes through the half mirror 144 and is incident to the CCD camera 134, so that an image is formed on the image pick-up surface of the image-sensing device 146.

Figure 6:
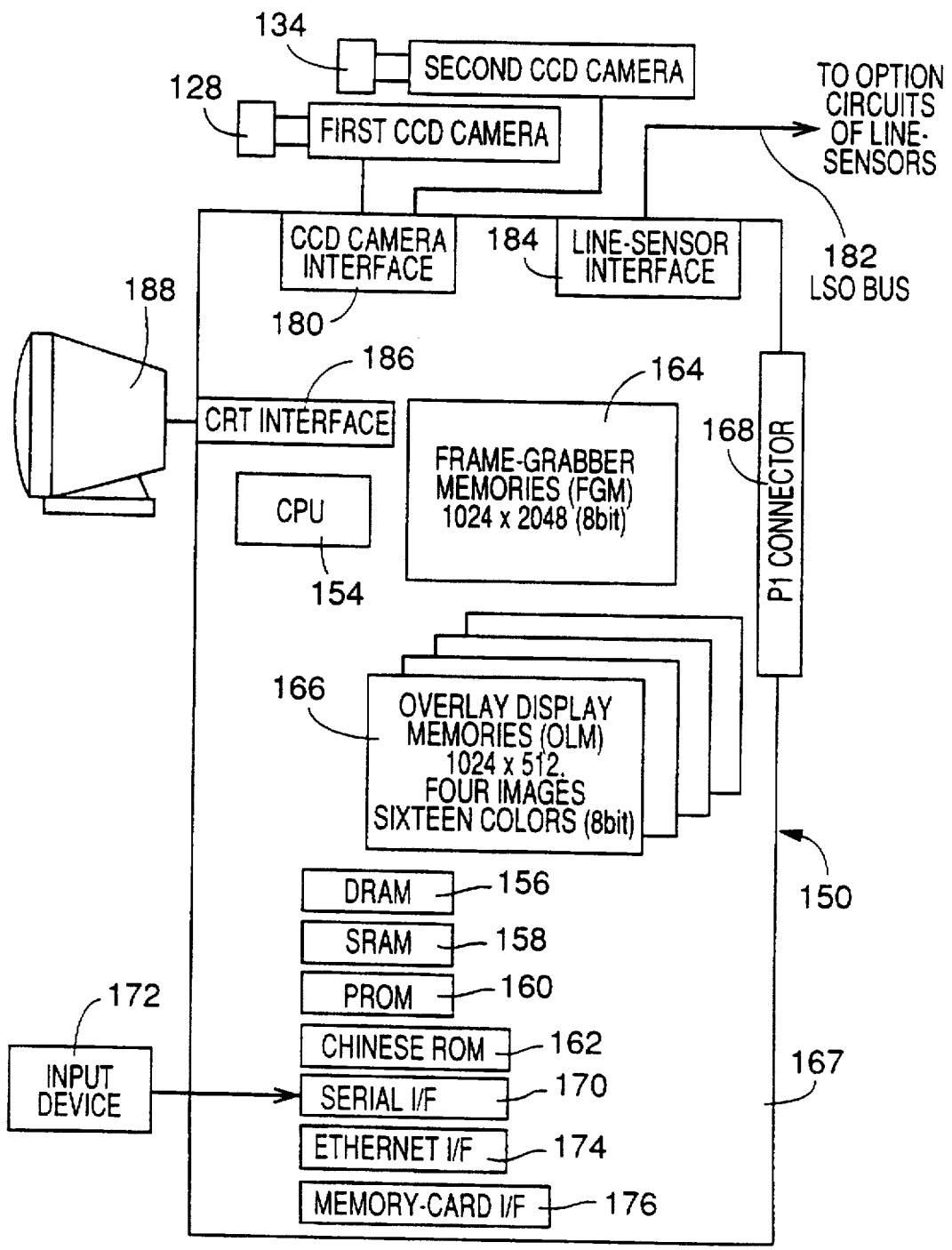
FIG. 6 is a diagrammatic view of a control device which controls the CCD camera of FIG. 5.

The second CCD camera 134, and the previously-described first CCD camera 128 used for picking up the images of marks of each PCB 90 are controlled by a control device 150 shown in FIG. 6. In the present embodiment, the first and second CCD cameras 128 and the control device 150 cooperate with one another to provide the image processing apparatus of the EC mounting system. The control device 150 is essentially provided by a computer, and includes a central processing unit (CPU) 154, a dynamic random access memory (DRAM) 156, a static random access memory (SRAM) 158, a programmable read only memory (PROM) 160, a Chinese-letter read only memory 162 (hereinafter referred to as the "Chinese ROM 162"), four frame-grabber memories ("FGMs") 164, and four overlay display memories ("OLMs") 166, all of which are connected to one another via internal bus (not shown) provided on a common circuit substrate 167.

A two-channel serial interface 170 is also connected to the above-mentioned internal bus, and an input device 172 is connected to the serial interface 170. The input device 172 is used for inputting, into the computer of the control device 150, information and commands needed to operate the EC mounting system as a whole, and particularly inputting information needed to perform image processing, such as the sort, and/or the total number, of actual objects to be image-processed. The input device 172 includes alphanumeric keys, and is provided on the front wall 16 as shown in FIG. 1. An Ethernet interface 174 and a memory-card interface 176 are also connected to the internal bus.

The Ethernet interface 174 is used for communicating with another computer which controls other portions of the EC mounting system than the image processing apparatus. For example, the control device 150 can be connected to one or more external control devices in the case where one or more options are needed. In the latter case, the Ethernet interface 174 is used for exchanging data via a P1 connector 168. In the EC mounting system, the index table 42, the EC mounting heads 56, the pushing devices 86, the EC supplying device 100, the PCB feeding device 108, the PCB conveyor 109, etc. are controlled by a second control device (not shown) which is essentially provided by a computer different from that of the first control device 150 for the image processing. The second control device is connected to the P1 connector via an external bus (not shown). Since the second control device has little importance to the present invention, the description and illustration thereof is omitted.

When a memory card in which the programs prepared for the image processing are pre-stored is inserted in a card reader (not shown) of the control device 150, the CPU 154 utilizes the PROM 160 to read the programs from the memory card, and data needed to carry out the programs, via the memory-card interface 176, and stores the obtained programs and data in the DRAM 156.

A CCD-camera interface 180 is also connected to the internal bus. The first CCD camera 128 for picking up the images of marks of each PCB 90 and the second CCD camera 134 for picking up the images of ECs 80 held by the EC mounting heads 56 are connected to the CCD-camera interface 180. Image data representative of the images of PCB marks picked up by the first CCD camera 128 and image data representative of the images of ECs 82 picked up by the second CCD camera 134 are stored in the FGMs 164 via the CCD-camera interface 180. As described previously, the control device 150 includes the four FGMs 164, and four batches of first image data for four ECs 82 which are to be successively mounted on a PCB 90 are sequentially stored in the four FGMs 164, respectively. Two batches of second image data for two PCB marks are produced and used at respective timings different from those at which the batches of first image data for the ECs 82 are taken and used. Therefore, one of the four FGMs 164 is also used for storing the batches of second image data for the PCB marks.

An LSO (line sensor option) bus 182 and a line-sensor-circuit interface 184 are connected to the FGMs 164, so that image data representing an image obtained by a line sensor (not shown) as a sort of an image sensor are stored in each of the FGMs 174. In the case where an actual object to be image-processed is extremely large, an image pick-up device having a large number of image pick-up elements in one line or each line is needed. In the latter case, the line sensor is used in place of the first or second CCD camera 128, 134. In addition, in the case where it is required to pick up an image of an actual object which is being moved, the line sensor is used. When the line sensor is used, an option circuit (not shown) of the line sensor is connected to the interface 184 via the LSO bus 182, so that the image data obtained by the line sensor are stored in the FGMs 164.

A CRT (cathode ray tube) interface 186 is also connected to the internal bus of the control device 150. A monitor CRT device 188 is connected to the CRT interface 186. As shown in FIG. 1, the CRT device 188 and the input device 172 are provided side by side on the front wall 16. The CRT device 188 is capable of displaying both a full-color image and a monochromatic image.

Four batches of image data obtained by picking up respective monochromatic images of four ECs 82 are stored in the four FGMs 164, respectively. Meanwhile, the four OLMs 166 store four batches of image data representing four sixteen-color images, respectively. The CRT device 188 displays a selected one of the four monochromatic images, superposes one of the four color images which corresponds to the selected monochromatic image, and additionally displays the current state or result of the image processing.

The CRT device 188 also displays color images corresponding to data which have been input through the input device 172. For this operation, the Chinese ROM 162 is used.

In the EC mounting system, the ECs 82 are mounted on the PCB 90 while the index table 42 is rotated. Specifically described, each EC mounting head 56 is moved to the EC suction position where the EC suction nozzle 80 of each mounting head 56 takes an EC 82 from one of the EC supplying cartridges 104, and subsequently moved to the EC-holding-error detecting position where an image of the EC 82 held by the EC suction nozzle 80 is taken by the second CCD camera 134. The thus obtained image (data) of the EC 82 is processed by the control device 150, so that an X-direction and a Y-direction positional error of the EC 82 from respective reference positions, and an angular error of the same 82 from a reference angle about the axis line of the EC suction nozzle 80 are calculated. The X- and Y-direction positional errors of the EC 82 are corrected by moving the PCB 90 relative to the EC 82 held by the suction nozzle 80, and the angular error of the same 82 is corrected at the EC-posture correcting position where a nozzle rotating device (not shown) is provided which is engageable with the EC suction nozzle 80 to rotate the same 80. Thus, the EC suction nozzle 80 is rotated by an angle needed to correct the detected angular error of the EC 82 relative thereto. Following the correction of the angular error of the EC 82, the EC 82 is mounted at a predetermined location on the PCB 90, at the EC mounting position. After the mounting of the EC 82 on the PBC 90, the EC suction nozzle 80 is rotated by the same angle as that by which the suction nozzle 80 is rotated to correct the angular error, in a direction opposite to the direction of rotation thereof to correct the angular error. Thus, the EC suction nozzle 80 is returned to an initial angular position thereof.

Each PCB 90 is conveyed on the PCB conveyor 109, subsequently transferred onto the PCB supporting and moving device, and then respective images of the two marks of each PCB 90 are taken by the first CCD camera 128. The thus obtained images (image data) of the PCB marks are processed by the control device 150, so that an X-direction and a Y-direction positional error of the PCB 90 from respective reference positions, and an angular error of the same 90 from a reference angular position about a vertical line are calculated. When the EC 82 is mounted on the PCB 90, the X-and Y-direction positional errors of the PCB 90 are corrected by operating the PCB feeding device 108 to move the PCB 90 relative to the EC 82 held by the suction nozzle 80, simultaneously with the correction of the X- and Y-direction positional errors of the EC 82, and the angular error of the same 90 is corrected by operating the nozzle rotating device to rotate the EC suction nozzle 80, simultaneously with the correction of the angular error of the EC 82.

Hereinafter, there will be described the processing of the image data obtained by the first or second CCD camera 128, 134.

As described previously, the programs and data needed for the image processing are stored in a memory card and, when the memory card is set in the card reader (not shown) of the control device 150, the programs and data are read from the memory card and are stored in the DRAM 156. The programs read out from the memory card are represented by FIGS. 7 to 9.

FIG. 7 shows a preliminary-processing program, which is carried out after the program is stored in the DRAM 156 and when a manufacturing program is started. First, it is judged whether a pattern-matching process is to be performed with respect to each of actual objects which are needed to carry out the above-indicated manufacturing program and each of which is to be image-processed. If a positive judgment is made with respect to one actual object, individual seek templates are produced based on a master seek template and are stored in the DRAM 156. A similar processing is sequentially carried out on each of the other actual objects to be image-processed.

The above-mentioned master seek template is defined by a plurality of pairs of coordinate points placed on an X-Y coordinate system or plane (hereinafter, referred as the "master-seek-template coordinate plane"). The masterseek-template coordinate plane coincides with a reference coordinate plane of the present image processing apparatus. That is, an origin and an X and a Y axis of the masterseek-template coordinate plane coincide with those of the reference coordinate plane of the image processing apparatus, i.e., center of the field of vision of each of the first or second CCD camera 128, 134 and two orthogonal coordinate axes of the field of vision. Seek-template data representing a master seek template are prepared in advance based on a shape and a size of an actual object to be image-processed and are pre-stored in a memory card. When the preliminary-processing program is read from the memory card and stored in the DRAM 156, the seek-template data are also read and stored in the DRAM 156.

Figure 11:
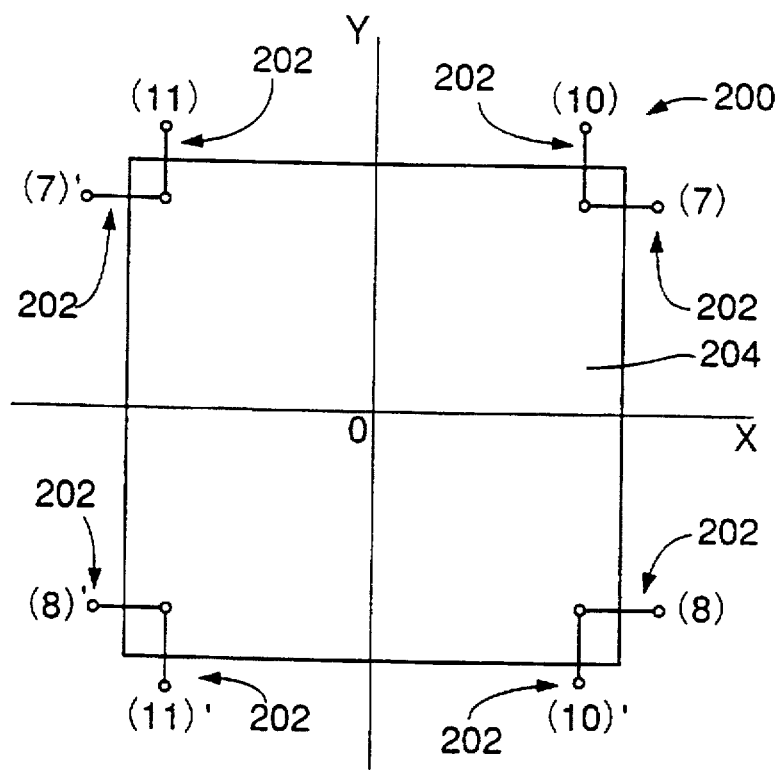
FIG. 11 is a view showing a master seek template defined by the data shown in FIG. 10, together with the square EC.
Figure 12:
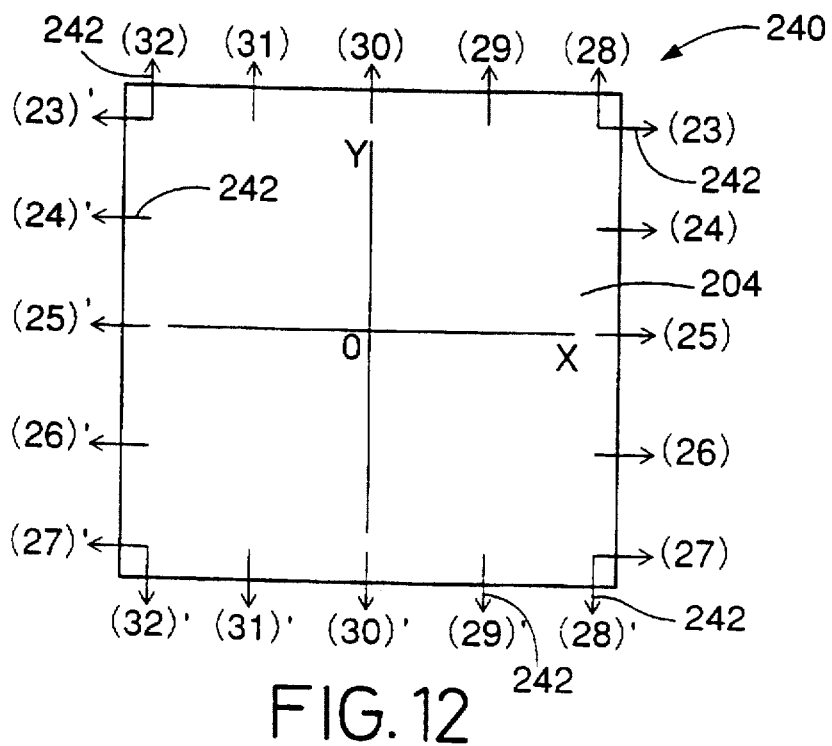
FIG. 12 is a view showing a master measure template defined by the data shown in FIG. 10, together with the square EC.

FIG. 10 shows an example of seek-template data representing a master seek template 200, shown in FIG. 12, which is prepared for recognizing or seeking a square EC 204 as an actual object to be image-processed. In FIG. 10, the seek-template data are provided by lines 7, 8, 10, and 11, and line 5 (only "hs (half span)=5.5"). The half span "hs" means half the distance between each pair of points 202. In FIG. 10, the term "Pair" requires that another pair of points 202 be located on a straight line extended from a segment connecting between a related pair of points 202, symmetrically with the related pair of points 202 with respect to an appropriate one of the Y axis, X axis, and origin of the template coordinate plane. FIG. 11 shows four original pairs of points 202 {(7), (8), (10), and (11)}, corresponding to lines 7, 8, 10, and 11 shown in FIG. 10, and four symmetrical pairs of points 202 {(7)', (8)', (10)', and (11)'}. In the example shown in FIG. 11, two pairs of points 202 (e.g., pair of points (7) and pair of points (10)) include a common point.

In the present embodiment, it is assumed that a middle point of each pair of points 202 of the master seek template 200 rides on an edge line of a reference object which has no size error, no positional error, or no angular error. Therefore, one of each pair of points 202 is located inside the edge line of the reference object and the other point is located outside the edge line.

However, generally, it is not essentially required that a middle point of each pair of points 202 of the master seek template 200 ride on an edge line of a reference object, so long as the two points of each pair are located inside and outside the edge line, respectively.

Although in the example shown in FIG. 11 each pair of points 202 include one point common to another pair of points 202, this is not an essential requirement, either.

In FIG. 11, the two points of each pair 202 are connected by a segment for illustrative purposes only, and no data corresponding to those segments is contained in the seek-template data shown in FIG. 10.

Figure 15:
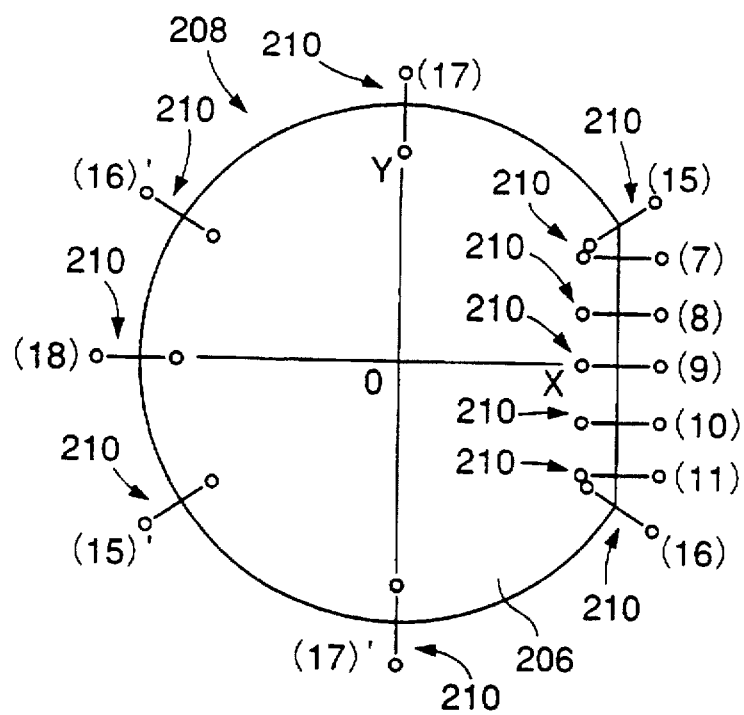
FIG. 15 is a view showing a master seek template defined by the data shown in FIG. 14, together with the disc.

FIG. 14 shows an example of seek-template data defining a master seek template 208, shown in FIG. 15, which is prepared for recognizing a partly cut, circular plate 206 as an actual object to be image-processed. In FIG. 14, the seek-template data are provided by lines 7–11 and lines 15–17. FIG. 15 shows five original pairs of points 210 {(7), (8), (9), (10), and (11)}, three original pairs of points 210 {(15), (16), and (17)} corresponding to lines 15–17 shown in FIG. 14, and three symmetrical pairs of points 210 {(15)', (16)', and (17)'}. However, the master seek template 208 does not include any pairs of points symmetrical with the pairs of points 210 {(7), (8), (9), (10), and (11)}.

Figure 13:
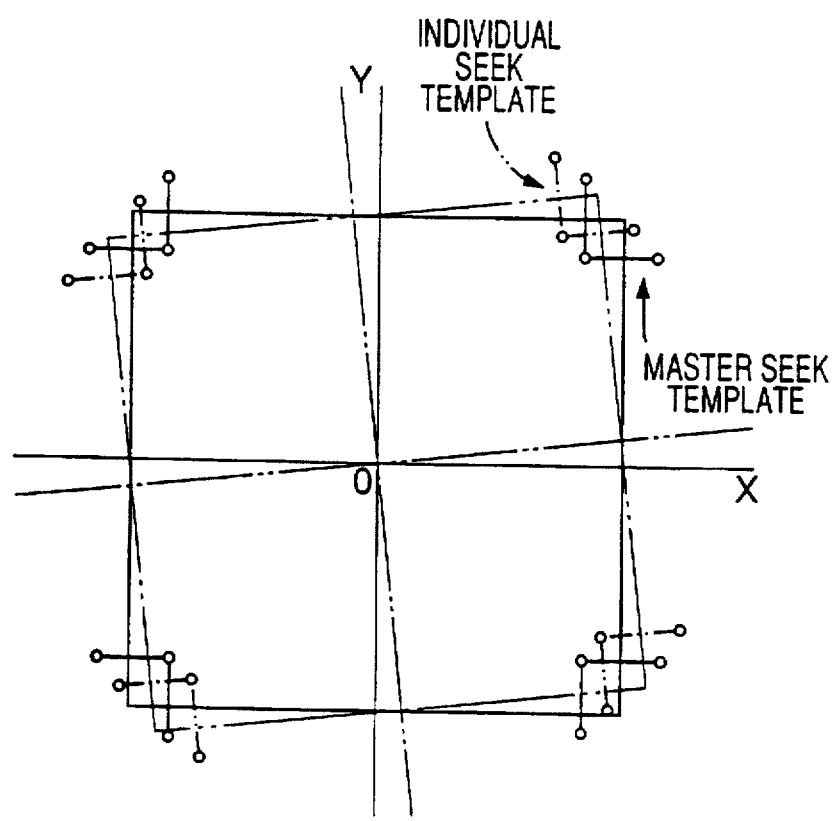
FIG. 13 is a view showing a manner in which an individual seek template is produced based on the master seek template of FIG. 11.

In the present embodiment, seek-template data are prepared in advance, and are pre-stored in a memory card, for each of all sorts of ECs 82 and all sorts of PCB marks that are treated as actual objects to be image-processed. When the image processing is carried out, all batches of seek-template data are read from the memory card and stored in the DRAM 156. Accordingly, when an actual object is image-processed, a set of seek-template data corresponding to the sort of the actual object are read from the DRAM 156, and individual seek templates are produced based on the thus obtained set of seek-template data. A master seek template corresponds to one of the individual seek templates which is produced based on the seek-template data such that that "one" individual seek template is not rotated by any angle. The other individual seek templates are obtained by rotating the master seek template by respective angles equal to respective products of a predetermined rotation pitch and respective integral numbers, within a predetermined angular range, as shown at two-dot chain lines in FIG. 13. The thus obtained individual seek templates are stored in the DRAM 156. The individual seek templates have respective coordinate planes each obtained by cooordinate transformation of the master-seek-template coordinate plane.

As shown in FIG. 10, data indicative of the above-mentioned predetermined rotation pitch and angular range are stored together with each set of seek-template data in the DRAM 156. The term "pitchA=4.5" on line 15 shown in FIG. 10 is indicative of the predetermined rotation pitch (i.e., 4.5 degrees), the term "start=–45" on line 16 is indicative of a start angle of the predetermined angular range (i.e., –45 degrees), and the term "end=45" on line 17 is indicative of an end angle (i.e., 45 degrees) of the same angular range. Data indicative of a rotation pitch and an angular range based on which individual seek templates are produced are prepared for each sort of an actual object to be image-processed. For example, in the case where it can be estimated that a certain actual object to be image-processed suffers from a large angular error, a large angular range is predetermined for that object. In the example shown in FIG. 7, the preliminary-processing program defines an individual-seek-template production angular range of –45 to +45 degrees and a rotation pitch of 4.5 degrees.

If the production of all individual seek templates for one actual object to be image-processed is ended, the control in accordance with the control program shown in FIG. 7 is returned to the start. Then, for the next actual object to be image-processed, it is judged whether the pattern-matching process should be carried out and, if a positive judgment is made, individual seek templates are produced for that object. On the other hand, if a negative judgment is made, the control returned to the start and, for the next, third object, it is judged whether the pattern-matching process should be carried out. If this judgement has been made for each of all the actual objects to be image-processed and the production of individual seek templates has been done for each of the actual objects for which a positive judgement has been made, the control in accordance with the program of FIG. 7 is ended.

Next, there will be described the control in accordance with an image-processing program shown in FIG. 8. This program is carried out after the image of the EC 82 or PCB mark is picked up by the first or second CCD camera 128, 134 and the batches of image data representative of the picked-up image are stored in an appropriate one of the four FGMs 164 of the control device 150. First, if an actual object to be image-processed is one which is to be image-processed by only a single pattern-matching process, for example, if an actual object is a rectangular EC chip, the actual object is image-processed according to a pattern-matching program shown in FIG. 9.

Next, it is judged whether an actual object to be image-processed is one which is to to be image-processed by a pattern-matching manager which combines two or more pattern-matching processes. The combination of pattern-matching processes will be described later. For example, if an actual object is an EC having lead wires or solder bumps and accordingly having a complicated shape, such as QFP (quad flat package) EC, PLCC (plastic leaded chip carrier) EC, or BGA (ball grid array) EC, a positive judgment is made at this step.

If a negative judgment is made at the above step, i.e., if the operation of the pattern-matching manager is not needed, then it is judged at the next step whether an actual object is to be image-processed on a virtual screen. If a negative judgment is made, it is judged whether an actual object is to be image-processed on a physical screen.

A physical screen is defined as one on which a batch of image data actually exist which include a number of sets of picture-element data each of which is indicative of an optical-characteristic value of a corresponding one of a number of picture elements of a picked-up image. A virtual screen is defined as one on which a plurality of sets of virtual-point data are assumed to exist which are obtained, as needed, by the calculation based on the batch of image data and each set of which is indicative of an optical-characteristic value of a corresponding one of a plurality of virtual points designated independent of the picture elements of the picked-up image represented by the batch of image data. Each of the pattern-matching program of FIG. 9 and the pattern-matching manager is carried out on a virtual screen as will be described later. However, the present image processing apparatus is adapted to be able to carry out image processing on either a virtual screen or a physical screen, without using either the pattern-matching program of FIG. 9 or the pattern-matching manager. A positive or a negative judgment made at this step is based on command data contained in the manufacturing program prepared for mounting the ECs 82 on the PCBs 90.

There will be described the pattern-matching program shown in FIG. 9.

First, a search window is produced which defines or limits a seek area within which an actual object to be image-processed is sought. The production of the search window is achieved by designating the coordinate values of points defining a portion, or all, of the image pick-up surface of the first or second CCD camera 128, 134. Whether an actual object is a PCB mark or an EC and of which sort the PCB or EC is are known from EC mounting data contained in the manufacturing program prepared for the EC mounting operation. Thus, the present image processing apparatus approximately estimates the position of a picked-up image of the actual object formed on the image pick-up matrix of the first or second CCD camera 128, 134. Thus, the search window produced fully encompasses or covers the picked-up image of the actual object, even if the actual object may have more or less positional and/or angular errors. In this way, the search window has a narrower area which needs only a shorter time to seek the actual object.

The pattern-matching process basically includes four steps, i.e., seek step, re-seek step, measure step, and re-measure step. The seek step is for seeking an actual object; the re-seek step is for specifying edge points corresponding to an actual edge line of the actual object; the measure step is for calculating the coordinate values of each of the edge points; and the re-measure step is for repeating the measure step by one or more times. This pattern-matching process ends when all the four steps end. However, if an abnormality is recognized in any step, that step is immediately ended and fails to proceed with the following step. That is, in that case, the pattern-matching process is immediately ended.

First of all, the seek step will be described below.

Figure 17:
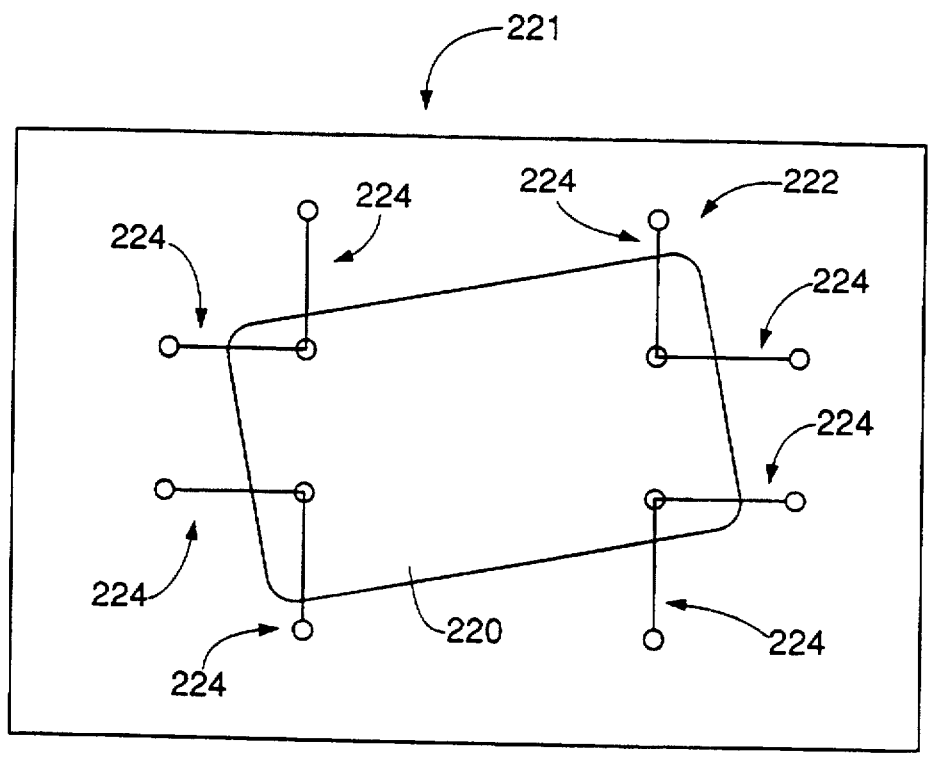
FIG. 17 is a view showing a manner in which an individual seek template is placed on a virtual screen in a seek step of the pattern matching program of FIG. 9.

In the seek step, individual seek templates are sequentially read, one by one, from the DRAM 156. It is assumed that as shown in FIG. 17, each individual seek template 222 is superposed, on a virtual screen 221, on a physical image which, in fact, is not present on the virtual screen 221 but on a physical screen, i.e., image pick-up surface of the first or second CCD camera 128, 134 and which contains a picked-up image 220 of an actual object to be image-processed and a background of the actual object. Subsequently, the CPU 154 determines respective optical characteristic values of the physical image which correspond to two points of each pair out of a plurality of pairs of points 224 contained in each individual seek template 222. The seek-template defining points 224 are designated as virtual points on the virtual screen 221. In the present embodiment, optical characteristic values are luminance values. More specifically described, the CPU 154 calculates, by interpolation, a luminance value corresponding to each of the points 224 based on the luminance value or values of a corresponding picture element or elements of the picked-up image 220 and the background image. Regarding the example shown in FIG. 10, the first individual seek template has a rotation angle of −45 degrees. FIG. 17 visualizes the points 224 that define the individual seek template 222, correspond to the thus determined respective luminance values, and exist on the virtual screen 221. Thus, the respective luminance values corresponding to the template-defining points 224 are determined based on the respective luminance values of the picture elements of the physical image which correspond to the points 224 in a predetermined positional relationship. Regarding the virtual screen 221 shown in FIG. 17, the picked-up image 220 or the image data representing the actual image 220 is just assumed to exist thereon but, in fact, does not exist. This is also the case with FIGS. 19, 20, and 27.

Figure 18:
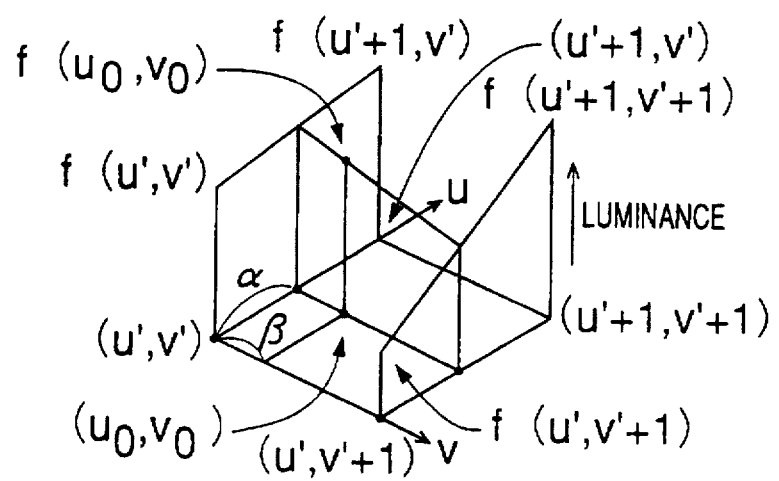
FIG. 18 is a view illustrating a manner in which a luminance value corresponding to a virtual point designated on the virtual screen is calculated by linear interpolation.

The interpolation of the respective luminance values of the picture elements of the picked-up image 220 and the background which correspond to each of the template-defining points 224 may be carried out using a curved surface, for example, a bicubic spline surface defined by 4 ×4 (=16) control points provided by 4×4 picture elements which correspond to that each of the defining points 224. However, in the present embodiment, four picture elements of the physical image which are adjacent to each defining point 224 on the virtual screen 221 are used to determine, by a simple, linear interpolation, a luminance value corresponding to each point 224. In FIG. 18, a point, $(u_0, v_0)$, corresponds to a template-defining point 224; $f(u_0, v_0)$ is indicative of a luminance value of the point $(u_0, v_0)$; points, $(u', v')$, $(u'+1, v')$, $(u', v'+1)$, $(u'+1, v'+1)$, are respective centers of four picture elements adjacent to the point $(u_0, v_0)$; and $f(u', v')$, $f(u'+1, v')$, $f(u', v'+1)$, and $f(u'+1, v'+1)$ are indicative of respective luminance values of the four adjacent picture elements. The luminance value, f, corresponding to each point 224 is calculated according to the following expression (1):

$$\begin{aligned} f &= (u_0, v_0) \\ &= f(u', v')(1-\alpha)(1-\beta) + f(u'+1, v')\alpha(1-\beta) \\ &\quad + f(u', v'+1)(1-\alpha)\beta + f(u'+1, v'+1)\alpha\beta \end{aligned} \quad (1)$$

Figure 49:
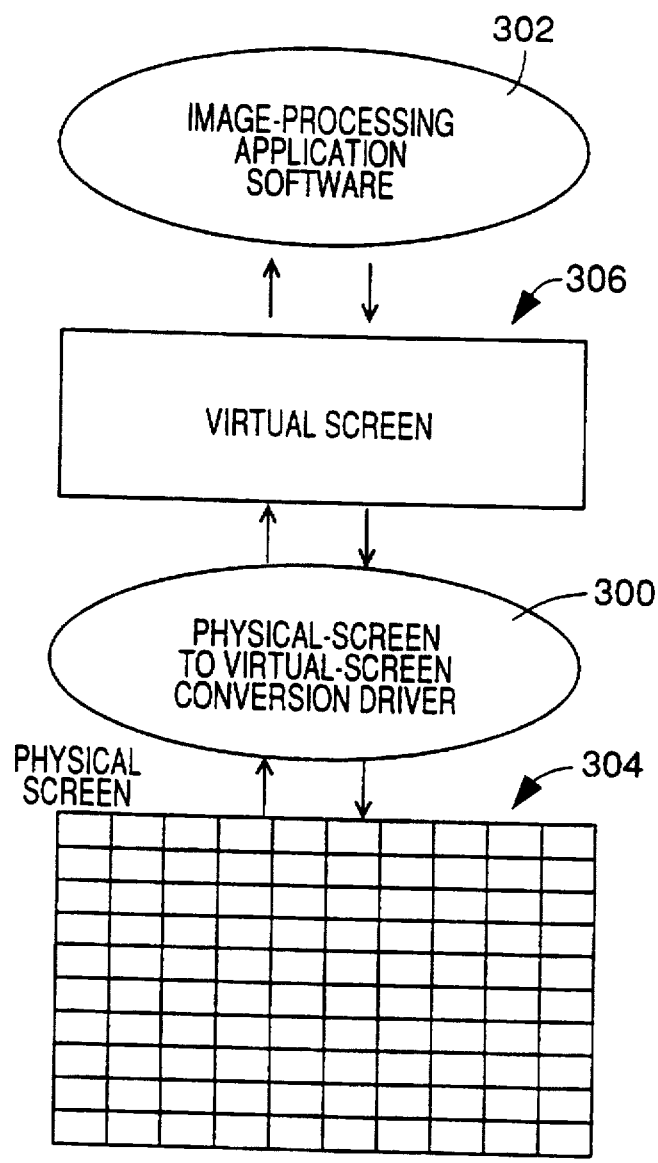
FIG. 49 is a view illustratively showing a physical-screen to virtual-screen conversion driver which is used to produce image data representing a virtual image on a virtual plane, based on image data representing a physical image present on a physical screen, in the control device which controls the first or second CCD camera as an image pick-up device.

The above determination or calculation of luminance value f is carried out by a physical-screen to virtual-screen ("PS/VS") conversion driver 300 shown in FIG. 49. The PS/VS conversion driver 300 is independent of an image-processing application software 302 employed in the present image processing apparatus. Each time the PS/VS conversion driver 300 is needed to produce image data defining virtual points on a virtual screen 306, based on image data existing on a physical screen 304, the CPU 154 uses the PS/VS conversion driver 300 to produce the image data defining the virtual image on the virtual screen 306.

Each time the respective luminance values corresponding to the two points 224 of each pair are determined, those two luminance values are compared with each other. When the first or second CCD camera 128, 134 picks up an actual image of an actual object such as an EC 82 or a PCB mark, the actual object reflects more amount of light to the CCD camera 128, 134, than the background of the actual object. Thus, there occurs a difference between the respective amounts of electric charges produced in a portion of the solid-state image pick-up elements of the CCD camera 128, 134 which corresponds to the actual object and the remaining portion of the image pick-up elements of the same 128, 134 which corresponds to the background of the actual object. That is, the picked-up image of the actual object to be image-processed is brighter than the image of the background. Therefore, if an absolute value of a difference of the respective luminance values corresponding to the two points 224 of each pair is not smaller than a predetermined reference value, it can be concluded that one of the two points 224 of each pair is located inside an edge line of the actual object and the other point 224 is located outside the actual edge line, i.e., in the background.

Data indicative of the above-mentioned reference luminance value are pre-stored together with the seek-template data in the memory card, and are stored in advance in the DRAM 156. In the example of FIG. 10, line 5 defines a reference luminance value, diff=−20. In the present embodiment, a difference of the respective luminance values corresponding to the two points 224 of each pair is obtained by subtracting the luminance value of a virtual point corresponding to one of the two points 224 which is estimated to be located inside the edge line of an actual object, from that corresponding to the other point 224 which is estimated to be located outside the actual edge line. If the thus obtained difference is smaller than −20 (degrees), it is judged that one point 224 which is estimated to be located inside the edge line is actually located inside the edge line and the other point 224 which is estimated to be located outside the edge line is actually located outside the edge line. In the present embodiment, each set of picture-element data is indicative of one of 256 degrees as a luminance value of a corresponding picture element.

However, it is possible to determine the luminance difference by subtracting the luminance value corresponding to one of the two points 224 which is estimated to be located outside the edge line of an actual object, from that corresponding to the other point 224 which is estimated to be located inside the actual edge line. In the latter case, line 5 of FIG. 10 may be modified to define a reference value, diff=20.

In either case, the pair of points 224 in question satisfies a predetermined condition that an absolute value of the luminance difference is not smaller than a reference value (hereinafter, referred to as the "luminance-difference condition"), and it is therefore concluded that one of the two points 224 is located inside the edge line of the actual object and the other point 224 is located outside the actual edge line.

However, one or more pairs of points 224 may fail to satisfy the luminance-difference condition, (a) because the actual object being image-processed is not identical with the reference object corresponding to the master seek template, (b) because the EC suction nozzle or nozzles 80 of one or more EC mounting heads 56 has/have failed to hold an EC 82, or (c) because the solid-state image pick-up elements of the first or second CCD camera 128, 134 cannot pick up any image due to dust adhering thereto. Hereinafter, this is referred to as the "point-pair failure". If the CPU 154 finds not smaller than a predetermined number of point-pair failures (e.g., one, two, etc.), the CPU 154 judges that the actual object being image-processed is not identical with the reference object corresponding to the master seek template represented by the seek-template data stored in the DRAM 156. For example, in the example of FIG. 10, line 3 defines a number of permissible point-pair failures, failCount=0. Therefore, unless every pair of points 224 satisfies the luminance-difference condition, it is not judged that the actual object being image-processed is identical with the reference object corresponding to the master seek template.

In the case where the number of permissible point-pair failures (i.e. failCount) is predetermined at one or a greater number, the CPU 154 judges, if not smaller than the predetermined number of pairs of points fail to satisfy the luminance-difference condition, that the actual object being image-processed is not identical with the reference object corresponding to the master seek template.

Meanwhile, if the CPU 54 makes a positive judgment that an actual object being image-processed is identical with a reference object, as a result of use of an individual seek template having a rotation angle of 0 degree, the seek step is ended, and the re-seek step is started. On the other hand, if a negative judgment is made, another individual seek template having a different rotation angle is read out from the DRAM 156 to further image-process the actual object in question.

So long as negative judgments are made, each of the individual seek templates having different rotation angles are sequentially read out from the DRAM 156 to image-process the actual object in question. Unless a positive judgment is obtained even after every individual seek template is used, then the seeking operation is continued by displacing the position of the individual seek templates to a new one. More specifically described, each individual seek template is moved in the X and/or Y directions at respective pitches to a new position where each individual seek template is used to seek out the actual object identical with the reference object. Therefore, the coordinate plane of each individual seek template is moved by the same pitch or pitches.

Data indicative of the above-mentioned X-direction and Y-direction movement pitches are prepared in advance and pre-stored with the seek-template data in the memory card. In the example of FIG. 10, lines 13 and 14 define X-direction and Y-direction movement pitches, pitchX=2.2, pitchY=2.2, respectively. First, each individual seek template is moved to a new position in the Y direction by the Y-direction pitch (pitchY=2.2). Specifically described, the coordinate values of each of the points 224 defining each individual seek template are moved to the new position by the predetermined pitch in a positive direction of the Y direction. The thus modified individual seek template 222 is used to judge whether the actual object being image-processed is identical with the reference object. Unless a positive judgment is made even if all the individual seek templates having the different rotation angles are moved to the new position and applied to the picked-up image 220 on the virtual screen 221, next each individual seek template is moved to another new position in a positive direction of the X direction by the X-direction pitch (pitchX=2.2). Unless a positive judgment is made at this new position, next each individual seek template is moved in a negative direction of the Y direction by the Y-direction pitch. Unless a positive judgment is made at this new position, next each individual seek template is moved once more in the negative direction of the Y direction by the Y-direction pitch. Thus, each individual seek template is moved within the search window so as to draw a rectangular spiral locus of movement.

If no positive judgment is made and one or more pairs of points 224 go out of the search window as a result of the above-mentioned spiral movement of the individual seek templates 222, the CPU 154 judges that the individual seek templates 222 can no longer be moved and obtains a final conclusion that the actual object being image-processed is not identical with the reference object, i.e., there is no reference object within the search window. Thus, the CPU 154 recognizes an abnormality, commands the monitor CRT device 188 to display that the abnormality has occurred, and stores data indicative of the occurrence of the abnormality in the DRAM 156. If the actual object being image-processed for which the abnormality has been found is an EC 82, that EC 82 is not mounted on a PCB 90. That is, at the EC mounting position, the pushing device 82 is inhibited from pushing the EC suction nozzle 80 holding that EC 82. Meanwhile, if the actual object for which the abnormality has been recognized is a mark fixed to a PCB 90, that PCB 90 is fed out without any EC 82 being mounted thereon.

Regarding the picked-up image 220 shown in FIG. 17, all the pairs of points 224 of the individual seek template 220 satisfies the luminance-difference condition, and the two points 224 of every pair are located inside and outside the edge line of the picked-up image 220, respectively. In this case, a positive judgment is made that the actual object having the picked-up image 220 being processed is identical with the reference object corresponding to the master seek template, and data indicative of the position and rotation angle of this individual seek template 220 are stored in the DRAM 156.

Figure 19:
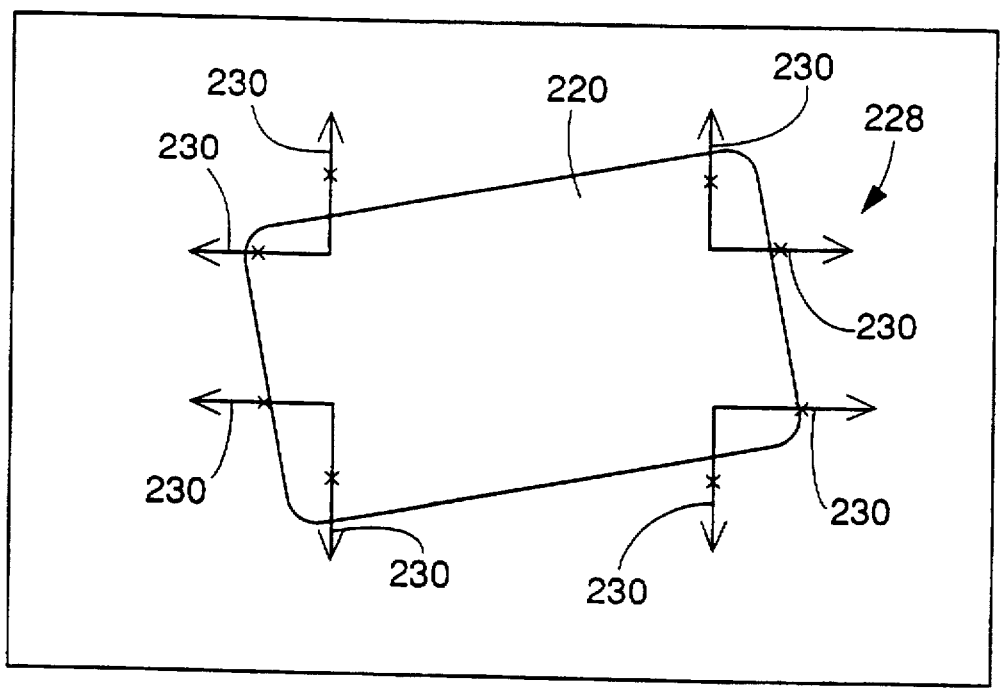
FIG. 19 is a view showing a re-seek template which is placed on a virtual screen in a re-seek step of the pattern-matching program of FIG. 9.

Next, the seek step is followed by the re-seek step in which a re-seek template 228 is used to specify edge points corresponding to the edge line of the picked-up image 220 being processed, as shown in FIG. 19. The re-seek template 228 includes a plurality of segments or seek lines 230. The seek lines 230 are produced based on the seek template 222 with which the actual object having the picked-up image 220 being processed is judged to be identical with the reference object, in the seek step. Each seek line 230 is defined as a straight segment connecting between the two points 224 of a corresponding pair. Thus, the seek lines 230 of the re-seek template 228 exist on the virtual screen.

Figure 20:
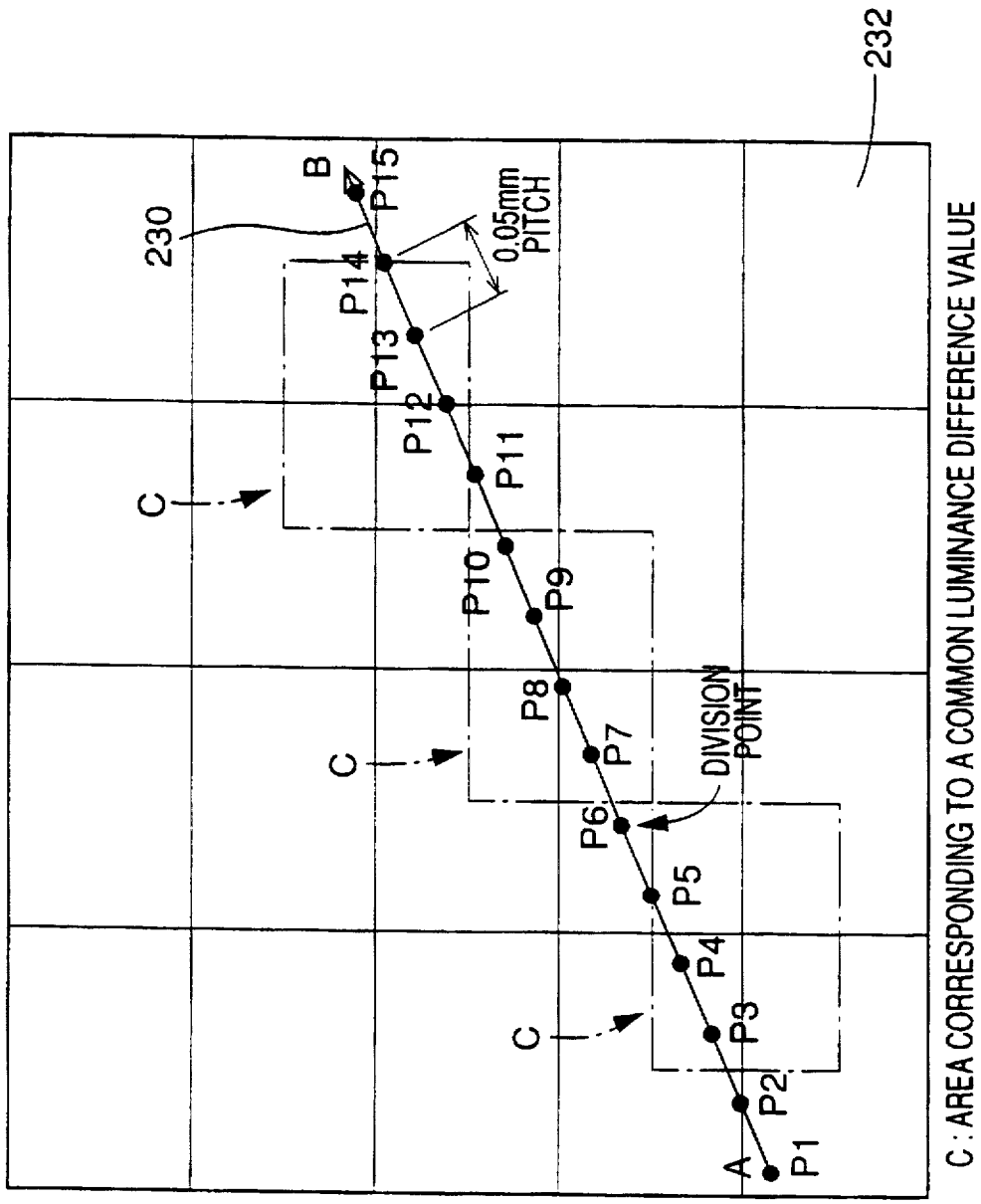
FIG. 20 is a view showing a relationship between division points determined on a seek line of the re-seek template of FIG. 19 and solid-state image pick-up elements which provide an image pick-up surface.

Each of the seek lines 230 is used to seek an edge point corresponding to the edge line of the picked-up image 220 being processed. As shown in FIG. 20, each seek line 230 is divided by a predetermined pitch (e.g., 0.05 mm) to provide a plurality of division points, P1 to P15. The CPU 154 calculates a luminance value corresponding to each division point P1–P15 by linear-interpolating the respective luminance values of the picture elements of the picked-up image 220 which correspond to each division point P1–P15, in the same manner as that employed in the seek step. The above division pitch is predetermined at a value shorter than a length of diagonal lines of each solid-state image pick-up element of the first or second CCD camera 128, 134. Thus, three or four division points P are located within each image pick-up element corresponding to each picture element of the image 220. The thus obtained division points P are virtual points which are assumed to exist on the virtual screen.

FIG. 21 shows a table containing the respective luminance values of the fifteen division points P1–P15 obtained by the linear interpolation. The luminance values are positive values which increase as the picture elements of the picked-up image 220 become brighter. In the present embodiment, the image pick-up device 130 emits light toward outer surfaces of an actual object to be image-processed and picks up an image of the actual object based on the light reflected from the surfaces thereof. The following description is made on the assumption that an actual object to be image- processed is brighter than the background thereof and the picture elements of the picked-up image of the actual object have greater luminance values than those of the background.

Figure 25:
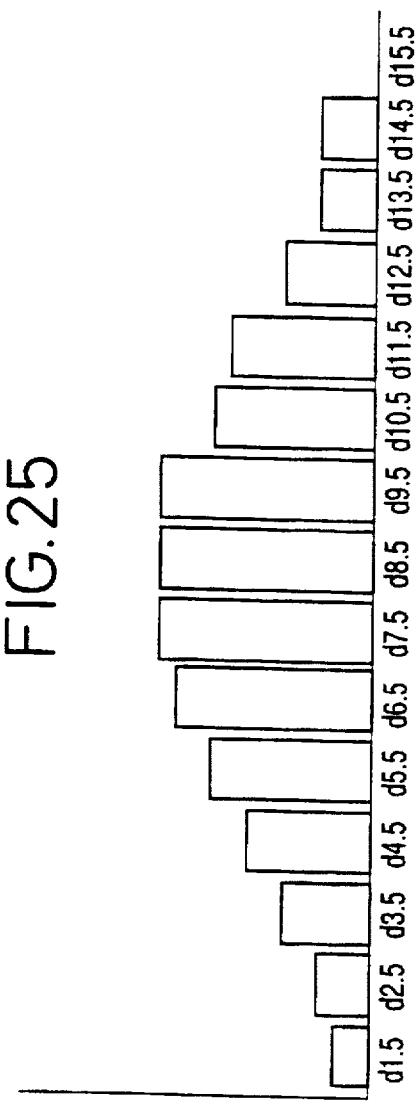
FIG. 25 is a graph showing differential values obtained by using the filter of FIG. 22.

FIG. 24 shows a bar graph representing the luminance values of the division points P1–P15 shown in FIG. 21. A difference filter is used to obtain difference values of the luminance values of the division points P1–P15 and specify an edge point on each seek line 230 which corresponds to the greatest difference value. FIG. 25 shows difference values obtained by applying a difference filter shown in FIG. 22 to the luminance values of the division points P1–P15 shown in FIG. 21. The difference filter shown in FIG. 22 is used, in a direction from one, A, of two opposite end points, A and B, of each seek line 230 (FIG. 20) toward the other end point, B, to subtract a luminance value of each point P1–P14 from that of the following point P2–P15. As shown in FIG. 25, each of the thus obtained difference values is associated with a middle point between a corresponding pair of adjacent points P.

The positive and negative signs of the difference values of the luminance values of the division points P1–P15 are inverted depending up the directions in which the difference filter is used. In the manner that the filter is used in the direction from outside the edge line of the picked-up image 220 toward inside of the same, the difference values have the positive sign. On the other hand, in the manner that the filter is used in the opposite direction from inside the edge line of the picked-up image 220 toward outside of the same, the differential values have the negative sign. In the first manner, the greatest one of respective absolute values of the difference values (i.e., rates of change) corresponds to the greatest one of the difference values and, in the second manner, the greatest one of respective absolute values of the difference values corresponds to the smallest one of the difference values. Hereinafter, the greatest difference value obtained in the first manner is referred to as the "maximum differential value" and the smallest difference value obtained in the second manner is referred to as the "minimum difference value". Each of FIGS. 25 and 26 shows difference values obtained in the first manner.

Figure 26:
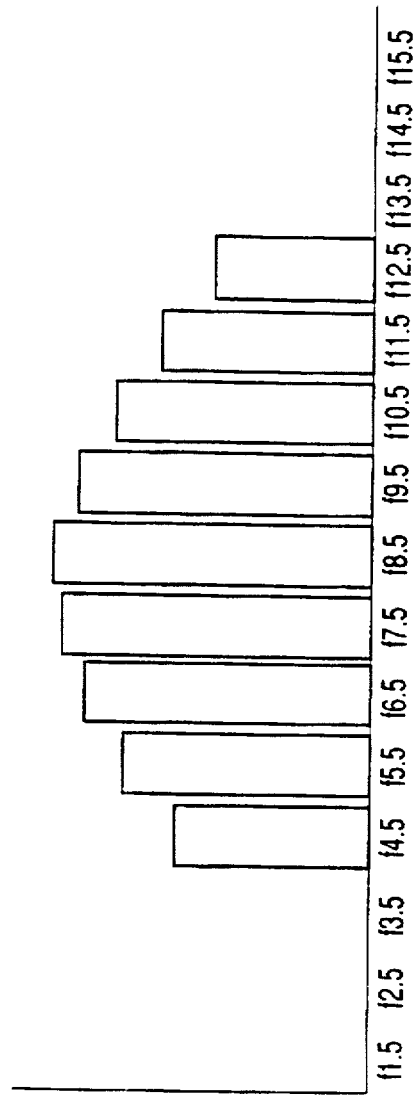
FIG. 26 is a graph showing differential values obtained by using the filter of FIG. 23.

FIG. 26 shows difference values obtained by applying another difference filter shown in FIG. 23, to the luminance values of the division points P1–P15 shown in FIG. 21, in the same direction in which the filter of FIG. 22 is used. While the difference values of FIG. 25 cannot be said to have the greatest value significantly different from the other values, the difference values of FIG. 26 can be said to have the maximum difference value of 177 at a position of f8.5 on the seek line 230. Thus, the CPU 154 recognizes that the luminance values of the picked-up image 220 and the background most significantly change at the point of f8.5 on the seek line 230. The difference filter shown in FIG. 23 is used to subtract the respective luminance values of each group of four successive division points A1–A12 from those of the following group of four successive division points $A_5$–$A_{15}$.

In the case where dust or the like adheres to a portion of the solid-state image pick-up elements of the CCD camera 128, 134 which portion corresponds to the edge line of the pick-up image 220, and adversely influences the amounts of electric charges produced in that portion of image pick-up surface, a maximum or minimum difference value may be determined at a position different from that of an edge point. However, the absolute value of that maximum or minimum difference value would be considerably small. In contrast thereto, a maximum or minimum difference value obtained with a sufficient proximity to an edge point would be considerably great because of a significantly large difference between the brightness of the actual object and the brightness of the background. Therefore, a threshold or reference value is employed to judge whether an absolute value of an obtained maximum or minimum difference value is not smaller than the reference value and, if a negative judgment is made, discard that maximum or minimum difference value. In the above-described first manner, a positive reference value is employed to judge whether a maximum difference value is not smaller than the positive reference value and, if a negative judgment is made, adopt the maximum difference value as corresponding to an edge point corresponding to the edge line of the picked-up image 220. Thus, the position of the edge point is determined in a manner which will be described later. In the above-described second manner, a negative reference value is employed to judge whether a minimum difference value is not greater than the negative reference value and, if a negative judgment is made, adopt the minimum difference value as corresponding to an edge point corresponding to the edge line of the picked-up image 220. Similarly, the position of the edge point is determined. However, if a positive judgment is made in the first or second manner, the CPU 154 recognizes that the maximum or minimum difference value does not correspond to an edge point, and counts it as a failure of the seek line 230 in the re-seek step.

In the example shown in FIG. 10, a difference filter is used to obtain difference values, in a direction from inside the edge line of a picked-up image toward outside the same, which direction is opposite to the direction in which a difference filter is used to obtain the differential values shown in FIG. 25 or FIG. 26. Therefore, a minimum difference value of the difference values obtained for the example of FIG. 10 is compared with a negative reference value, "11=−200", defined by line 5 of FIG. 10. If the minimum difference value is not greater than the reference value, the CPU 154 judges that the minimum difference value corresponds to an edge point on the edge line. Thus, the position of the edge point is determined as described below.

The edge points are specified on the edge lines by using a prescribed sort of difference filter. A number, N, designating a differential filter suitable for the division pitch of the division points P1–P15 is determined according to the following expression (2):

$$N = gUnit/(\text{division pitch}) \quad (2)$$

where gUnit is the length of diagonal lines of the image pick-up elements of the CCD camera 128, 134.

The filter shown in FIG. 22 has the number N=2, and the filter shown in FIG. 23 has the number N=4.

The position of each edge point is determined according to the following expressions (3), (4), (5), and (6), in the case where the filter (N=4) of FIG. 23 is used:

$$dl = f_{max} \times 4 - (f_{(max-1)} + f_{(max-2)} + f_{(max-3)} + f_{(max-4)}) \quad (3)$$

$$dr = f_{max} \times 4 - (f_{(max+1)} + f_{(max+2)} + f_{(max+3)} + f_{(max+4)}) \quad (3)$$

$$\text{edgepitch} = (dl \times N)/(dl+dr) - N/2 \quad (5)$$

(edge-point position)=(number of pitches from position of start division point to position of point corresponding to maximum difference value +edgepitch)×(dividing pitch)  (6)

In the expressions (3), (4), the terms, $f_{(max \pm n)}$, indicate the difference values obtained from the luminance values by using the filter N=4. In particular, the term, $f_{max}$, means the maximum (or minimum) difference value. In FIG. 26, the symbol "f" is used with a number to designate a position on the seek line 230 at which a corresponding difference value is obtained. Meanwhile, in the expressions (3), (4), the symbol "f" of the terms, $f_{(max \pm n)}$, indicates a difference value corresponding to a position designated by the number, max ±n. Regarding the example of FIG. 26, $f_{max}$ is the maximum difference value obtained at the position f8.5; $f_{(max-1)}$, $f_{(max-2)}$, $f_{(max-3)}$, and $f_{(max-4)}$ are difference values obtained at the positions f7.5, f6.5, f5.5, f4.5, respectively; and $f_{(max+1)}$, $f_{(max+2)}$, $f_{(max+3)}$, and $f_{(max+4)}$ are difference values obtained at the positions f9.5, f10.5, f11.5, f12.5, respectively.

The expressions (3), (4) used for the case where the filter N=4 is used are generalized such that the value "dl" is obtained by subtracting, from a product of the maximum (or minimum) difference value and the number N, a sum of the same number (N) of difference values located upstream of the maximum (or minimum) difference value in the direction in which the filter is used and such that the value "dr" is obtained by subtracting, from the same product, a sum of the number (N) of difference values located downstream of the maximum (or minimum) difference value in the same direction. In the particular case where the filter of FIG. 23 is applied to the luminance values of FIG. 21, the number of pitches from the position of start division point A to the position of a point corresponding to the maximum difference value, occurring in the expression (6), is 8.5 (i.e., f8.5 in FIG. 26).

In this way, the position of each edge point is determined by, first, determining the respective luminance values of division points P1–P15 by linear interpolation, subsequently approximately differentiating those luminance values by using a difference filter, then doing the calculations according to the expressions (3) to (6), and finally determining a point corresponding to the maximum (or minimum) difference value as an edge point at which luminance values most greatly change on a seek line. Regarding the seek line 230 shown in FIG. 20, the expression (6) provides 0.403 mm for the position of the edge point which means that the edge point is distant by 0.403 mm from the start division point A (P1).

In this way, the position of an edge point is determined on each of the seek lines 230 shown in FIG. 19. If a number of the failures of the seek lines 230 is not greater than a reference number, the CPU 154 judges that the re-seek step was normal, and proceeds with the following measure step. On the other hand, if the failure number is greater than the reference number, the CPU 154 recognizes an abnormality and operates in the same manner as described above for the seek step. However, in the case where the CPU 154 is programmed to recognize an actual object being image-processed as being identical with a reference object when a number of the failures of the pairs of points 202 is not greater than a reference number, the CPU 154 recognizes an abnormality based on a sum of the respective numbers of the point-pair failures and the seek-line failures. In the example of FIG. 10, line 3 defines a seek-line reference number, "failCount=0". In this case, therefore, when even a single seek-line failure is recognized, the re-seek step is immediately ended abnormally.

If the re-seek step is ended normally, the control of the CPU 154 proceeds with the measure step. In the re-seek step, an edge point is specified on each seek line 230. However, there would be more or less a positional error between the edge point and the middle point (hereinafter, referred to as the "ideal point") of the seek line 230. In FIG. 19, each ideal point is indicated at symbol, "x". If the actual object being image-processed has no size error or no positional or angular error, all the edge points should coincide with the corresponding ideal points. In fact, however, the actual object being image- processed may have a size error and/or a positional and/or angular error, and the specified edge points may not coincide with the corresponding ideal points on the seek lines 230.

Figure 27:
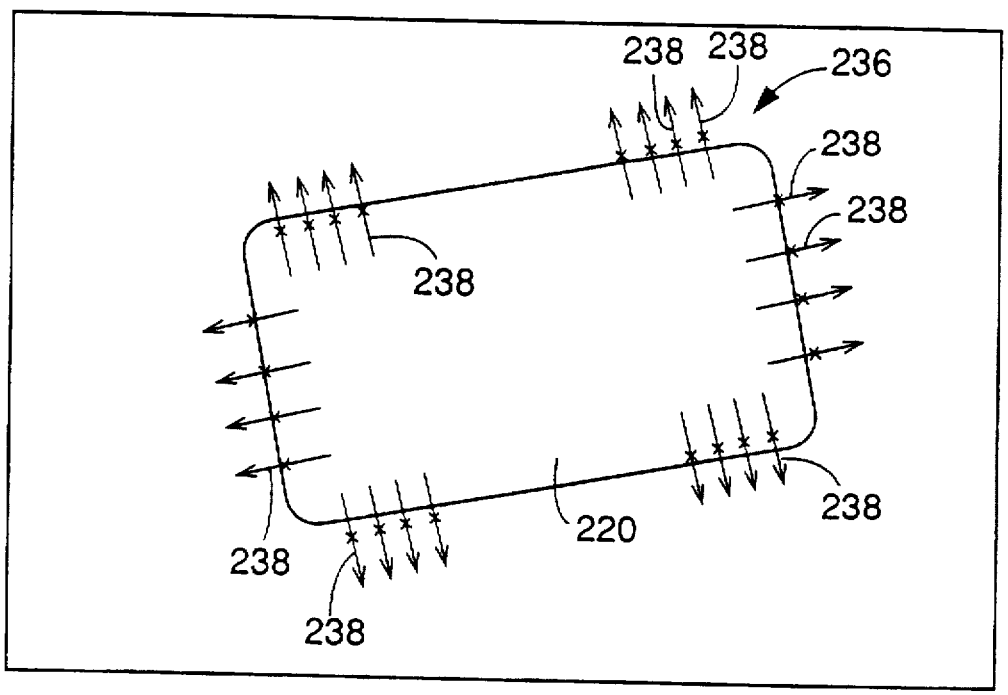
FIG. 27 is a view showing an individual measure template which is placed on a virtual screen in a measure step of the pattern-matching program of FIG. 9.

In the measure step, the position of each edge point is determined. First, the CPU 154 automatically produces a measure template 236 as shown in FIG. 27. The measure template 236 includes a plurality of segments or seek lines 238, and is produced based on measure-template data, data indicative of a position and a rotation angle of the coordinate plane of the individual seek template used in the re-seek step which are relative to the reference X-Y coordinate plane, and the positions of the edge points determined in the re-seek step.

As shown in FIG. 10, the measure-template data are stored with the seek-template data. Lines 20 to 33 of FIG. 10 provide data needed to carry out the measure step. Specifically described, line 21 ("hs=3.5"), lines 23–27, and lines 29–33 provide the measure-template data. FIG. 12 shows a master measure template 240 defined by the measure-template data. Reference numerals 242 designate seek lines. In the present embodiment, a master measure template 240 for a particular sort of EC 82 includes a greater number of seek lines than the number of the pairs of points of a master seek template 200 for the same EC 82.

Figure 16:
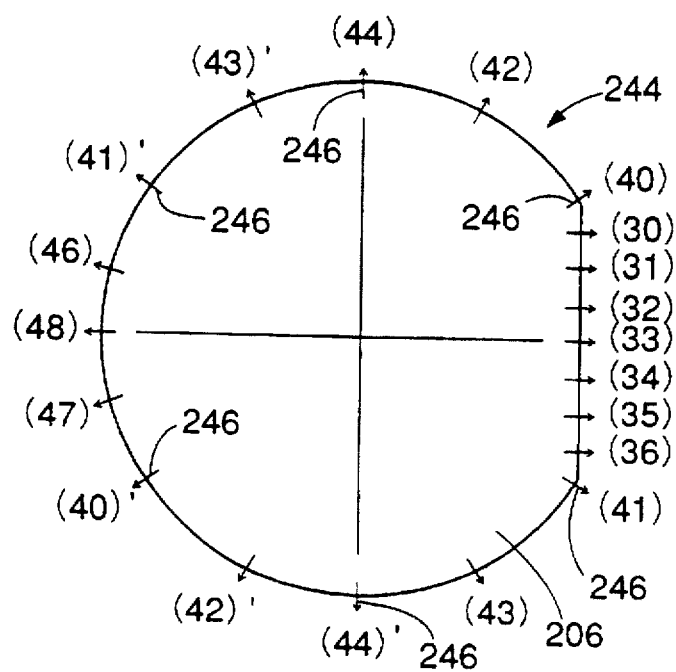
FIG. 16 is a view showing a master measure template defined by the data shown in FIG. 14, together with the disc.

FIG. 16 shows a master measure template 244 including a plurality of seek lines 246, which is employed for the partly cut disc 206 as an actual object to be image-processed.

Some or all of the seek lines of each master measure template are paired. The two seek lines of each pair are symmetrical with each other with respect to an appropriate one of the X axis, Y axis, and origin of the reference X-Y coordinate plane. Hereinafter, the two seek lines of each pair is referred to as the "set of paired lines", if appropriate.

An individual measure template is produced by coordinate transformation of a master measure template. This coordinate transformation is so determined as to compensate for the relative positional and angular differences between the respective coordinate planes of the master seek template and the re-seek template (the latter is the individual seek template with which the actual object identical with the reference object is found in the seek step) and for the relative positional and angular differences between the actual object being image-processed and the re-seek template (those differences are calculated, in a manner described later, based on the coordinate values of the edge points specified in the re-seek step).

After the automatic production of the measure template has ended, the determination of an edge point on each of the seek lines of the measure template is done in the same manner as that used at the re-seek step. More specifically described, each seek line is divided at a predetermined pitch to determine division points, and a luminance value corresponding to each division point is calculated by linear interpolation of the respective luminance values of the four picture elements of the picked-up image which correspond to each division point. Subsequently, a difference filter is used to calculate difference values of the respective luminance values of the division points, and an edge point is specified on each seek line based on the thus obtained difference values. An appropriate number of permissible seek-line failures is predetermined for the measure step as well. A failure of a seek line is recognized when an edge point cannot be specified on the seek line, similar to a failure of a seek line recognized in the re-seek step. If the CPU 154 finds only not greater than a predetermined number of seek-line failures, the measure step normally ends, and the control of the CPU 154 proceeds with the following, re-measure step. On the other hand, if the CPU 154 finds greater than the predetermined number of seek-line failures, the CPU 154 recognizes an abnormality, and operates for dealing with the abnormality in the same manner as that employed in the seek step.

In the re-measure step, a re-measure template is produced and edge points are specified. The re-measure template is automatically produced based on the measure template and the edge points specified in the measure step. Specifically described, based on the edge points obtained in the measure step, the measure template is moved and/or rotated by coordinate transformation into such a re-measure template which is estimated such that the ideal points of the seek lines of the re-measure template would coincide with corresponding edge points, respectively. However, in fact, even with the re-measure template, some or all of the ideal points may not coincide with the corresponding edge points to be obtained in the re-measure step. In the re-measure step, too, edge points are specified on the seek lines of the re-measure template in the same manner as described in the re-seek step.

The same seek-line failure number as used in the measure step is used in judging whether an abnormality has occurred in the re-measure step. If the CPU 154 finds greater than a predetermined number of failure seek lines on which no edge point can be specified, the CPU 154 recognizes an abnormality, immediately ends the re-measure step, and operates for dealing with the abnormality in the same manner as that used in the seek step. On the other hand, if the CPU 154 finds only not greater than the predetermined number of failure seek lines on which no edge point can be specified, the CPU 154 normally ends the re-measure step, and subsequently calculates object vectors and thereby determines a size, a position, and/or a rotation amount or angle of the actual object being image-processed. The more times the re-measure step is repeated, the more the positional errors between the ideal points and the corresponding edge points decrease. Thus, the accuracy of determination of edge points increases. The re-measure step is repeated while a new re-measure template is automatically produced based on the preceding re-measure template and the edge points determined using the preceding re-measure template. A number of repetition of this step is pre-determined and pre-stored.

The monitor CRT device 188 displays each of the individual steps of the image processing. For example, in the seek step, the CRT device 188 displays a monochromatic image including the actual object being image-processed and the background thereof, based on the image data stored in the FGMs 164 (e.g., one of four batches of image data corresponding to four ECs 82). For example, the CRT device 188 superposes, on the monochromatic image, a color image of each of individual seek templates having different rotation angles and/or positions such that the individual seek templates are sequentially displayed one after another and are moved along a "rectangular" spiral line. Thus, the operator can know the current state of the image processing.

The CRT device 188 is operable in one of two operation modes, i.e., automatic selection mode and manual selection mode. When the CRT device 188 operates in the automatic selection mode, the device 188 can selectively display the current state of the image processing and the input-related data which may be the data input through the input device 172 or the data produced by the CPU 154 (e.g., data indicative of an abnormality recognized by the same 154), while giving priority to the input-related data. Therefore, if the operator inputs data through the input device 172 when the CRT device 188 is in the automatic selection mode, the CRT device 188 automatically switches from displaying of the current state of the image processing to displaying of the data input.

On the other hand, while the manual selection mode is used, the CRT device 188 displays only one of the two sorts of information manually selected by the operator.

Next, there will be described a manner in which object vectors are calculated on the actual object being image-processed. The calculations which will be described below are carried out according to an object-vector calculation program which is pre-stored in the memory card and is copied into the DRAM 156 when the memory card is set in the card reader of the control device 150.

A size, a position, and/or a rotation angle of the actual object is/are calculated depending upon a command or commands. For example, regarding the example shown in FIG. 10, line 5 defines vector-calculation commands, "vf= PA", wherein the letter "P" commands the calculation of a position and the letter "A" commands the calculation of a rotation angle. Thus, the calculations of a position and an angle of the actual object will be carried out.

The calculation of a size is needed under each of the following conditions: (1) that a size of an actual object to be image-processed is needed; (2) that a shape of an actual object to be image-processed may be similar to the shape of a reference object and the former may not be identical with the latter; and (3) that one or more failures are recognized when edge points are specified on seek lines and the accuracy of measurement of a position of an actual object being image-processed should be maintained. An example of the condition (2) is such that ECs having similar shapes and having difference sizes should be identified against each other. Under the condition (3), the size of an actual object to be image-processed is needed because a position of the actual object should be determined while taking the failures into account, as will be described later.

In the present embodiment, if none of the above three conditions (1), (2), and (3) is satisfied, no size calculation is carried out. When size calculation is needed, the calculation is carried out prior to the calculations of a position and a rotation angle.

Next, there will be described an example wherein an actual object being image-processed is a rectangular EC chip 250 shown in FIG. 28, the calculations of a size, a position, and a rotation amount or angle of the EC chip 250 are prescribed, and one or more seek-line failures are recognized.

First, the size calculation is described. The size calculation is carried out by using sets of paired seek lines which are prescribed to be used for size calculation. That is, in the case where no set of paired seek lines is prescribed to be used for size calculation even though there may be non-paired seek lines prescribed therefor, no size calculation is carried out. If measure-template data contain no command or prescription for size calculation, a flag, F, is pre-set to F=0; and if the measure-template data contain at least one command, the flag F is pre-set to F=1. Thus, the CPU 154 can judge based on the flag F whether size calculation should be carried out for the actual object. In the case where size calculation is not prescribed, the CPU 154 can easily know that from only the flag F without judging whether each set of paired seek lines is prescribed to be used for size calculation. This contributes to reducing the image-processing time.

A first step of the size calculation is the calculation of X and Y size factors. As indicated on the rectangular chip 250 shown in FIG. 28, the X size factor is obtained by averaging respective values each of which is obtained by dividing a distance ("measured span") between the edge points of a corresponding one out of the sets of paired seek lines prescribed to be used for size calculation and extending parallel to the X axis, by a distance ("reference span") between the ideal points (indicated at symbols "x") of the corresponding one set of paired seek lines. The Y size factor is obtained by averaging respective values each of which is obtained by dividing a measured span of a corresponding one out of the sets of paired seek lines prescribed to be used for size calculation and extending parallel to the Y axis, by a reference span of the corresponding one set of paired seek lines. The X and Y axes are those of the reference X-Y coordinate system.

Figure 28:
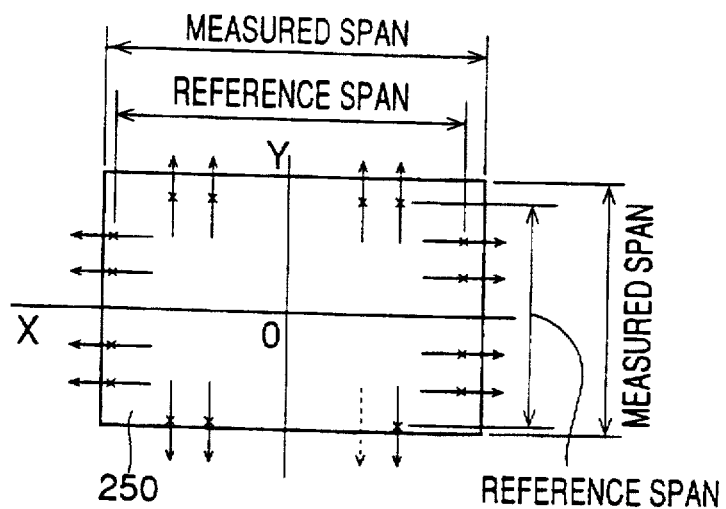
FIG. 28 is a view illustrating a manner in which a size of a rectangular EC chip as an example of an actual object is calculated after a pattern-matching operation.

In FIG. 28, a seek line with which a failure is recognized is indicated at broken line. A set of paired seek lines including the failure seek line is not used for the size calculation. The size of the EC chip 250 is calculated by multiplying the X and Y reference spans of the EC chip 250 by the X and Y size factors, respectively.

Figure 29:
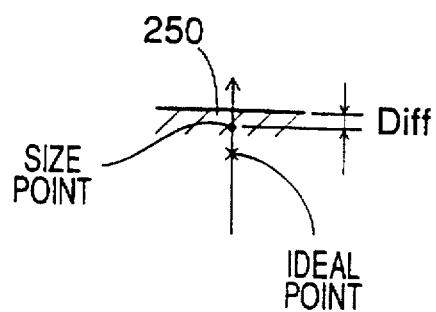
FIG. 29 is a view illustrating a manner in which a difference or distance between a size point and an edge point is calculated as a step of the size calculation.

In the case where a failure is recognized with at least one seek line, a "size" point is specified by correcting, with the size factors, the ideal point of each of the normal seek lines other than the failure seek line or lines. As shown in FIG. 29, regarding a normal seek line extending parallel to the Y axis, a Y coordinate of a size point is obtained by multiplying a Y coordinate of an ideal point of the seek line by a Y size factor. Similarly, an X coordinate of a size point is obtained by multiplying an X coordinate of an ideal point by an X size factor, though not shown.

As described above, the calculations of size factors are achieved by using only the sets of paired seek lines which are parallel to the X or Y axis. However, the calculations of size points using the obtained size factors are carried out on seek lines which are not parallel to the X or Y axis. The calculations of size points for inclined seek lines, and calculations which will be described below, are substantially the same as those for seek lines of a re-measure template which is used on a circular PCB mark.

Next, a difference or error, diff, between an edge point and a size point on each seek line is calculated. Regarding an actual object having a size error, size points can coincide with ideal points of seek lines of a re-measure template which is produced by taking the size error into account. Therefore, the error "diff" can purely represent a positional error of the edge point from the ideal point. The calculation of error "diff" is carried out by subtracting the coordinate values of the size point from those of the edge point. If an x or y coordinate value of the error "diff" is positive, that means that the edge point is displaced from the ideal point in a positive direction along the X or Y axis. On the other hand, if the x or y coordinate value of the error "diff" is negative, that means that the edge point is displaced from the ideal point in a negative direction along the X or Y axis.

The size points are calculated, upon recognition of a seek-line failure or failures, so as to reduce the influence of the failures to the calculation of a position of the actual object being image-processed, i.e., to reduce the error of calculation of the position. For example, in the case where the actual object being image- processed has a larger or smaller size than a reference size of the reference object, i.e., has a size error and has no position error, a failure may be recognized with one of a certain set of paired seek lines and may not be recognized with the other seek line. In the latter case, if a size point is not calculated on the failure seek line and is calculated on the normal (non-failure) seek line, a positional error between the size and ideal points of the normal seek line is not balanced by anything and, though in fact there is no position error, the CPU 154 would have the calculation result indicating that the actual object is out of position in a direction from a reference position of the reference object toward the side of the normal seek line. The calculation of size points is carried out to avoid this problem.

Next, the calculations of a position and a rotation angle of the actual object will be described below.

The rotation-angle calculation is carried out based on only seek lines which have respective rotation angles of 0, 90, 180, and 270 degrees and are prescribed to be used for this calculation. The calculations using the 0- and 180-degree seek lines are simultaneously achieved, and those using the 90- and 270-degree seek lines are simultaneously achieved.

The position and rotation angle of the actual object are calculated with respect to a rotation center, RC, which is defined by a predetermined expression (described below) used when the computer of the control device 150 carries out the calculations. The rotation center RC is a representative position of the actual object, and is utilized when the positional and/or angular errors of the actual object from a reference position and a reference angle, e.g., origin of the reference X-Y coordinate plane and zero degree from the positive half of the X axis, are calculated in the manners described below. In the case where the actual object has a positional error from the reference position thereof or in the case where one or more failures are recognized with one or more seek lines, an actual rotation center RC is moved from a reference rotation center RC; and in the case where the actual object has an angular error from the reference angle thereof or in the case where one or more failures are recognized with one or more seek lines, the actual object is rotated about the actual rotation center RC. The reference rotation center RC may, or may not, coincide with a designated center, DC, which is designated as a representative position of the actual object by the operator. The designated center DC is used as a reference position of the actual object when the EC mounting program according to which ECs 82 are amounted on PCBs 90 is produced. For example, the designated center DC is located at the origin of the reference X-Y coordinate plane. The amounts of correction of the actual position and rotation angle of each EC 82 are calculated with respect to the designated center DC in the reference X-Y coordinate plane.

Figure 30:
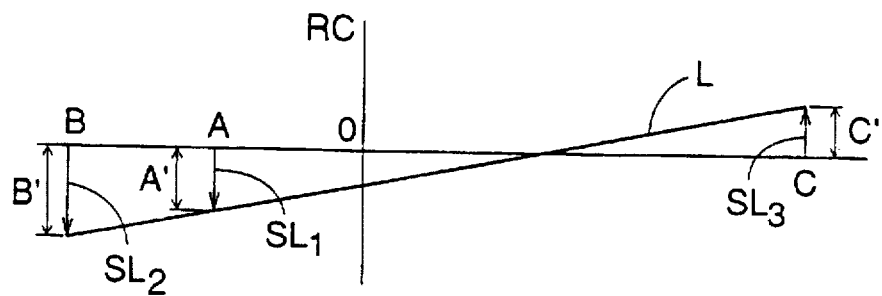
FIG. 30 is a view illustrating a manner in which a rotation center and a rotation amount of a straight segment as an example of an actual object is calculated.

First, the manner in which the calculations of a position and a rotation angle of an actual object are described on a simple example, for example, a straight segment, L, shown in FIG. 30. It is assumed that four seek lines are used for the straight segment L and a failure is recognized on one of the four seek lines, or that three seek lines are used for the segment L. In this case, a positional error, Diff, is calculated on each of the three seek lines, $SL_1$, $SL_2$, $SL_3$, and a rotation center RC is calculated by the computer such that the rotation center RC is nearer to the two seek lines $SL_1$, $SL_2$ on the left-hand side as seen in FIG. 30. More specifically, the rotation center RC is located at a position ensuring that an absolute value of a sum of respective positional errors between each of the seek lines located on one side and the rotation center RC (in the case of a single seek line, the error between the single seek line and the rotation center RC) is equal to an absolute value of a sum of respective positional errors between each of the seek lines on the other side and the rotation center RC (in the case of a single seek line, the error between the single seek line and the rotation center RC). In other words, assuming that a positive sign is given to the respective distances between each of the seek lines located on one side and the rotation center RC and a negative sign is given to the respective distances between each of the seek lines located on the other side and the rotation center RC, the rotation center RC is determined at a position ensuring that a sum of all the respective distances between each of all the seek lines and the rotation center RC is equal to zero. In the case where one failure is recognized with one of the original four seek lines, the thus determined rotation center RC is an actual rotation center RC; and in the case where no failure is recognized with the original three seek lines, the determined rotation center RC is a reference rotation center RC.

The rotation angle (in radians) of the actual object is calculated according to the following expression (7):

$$(\text{Rotation Angle}) = (AO \cdot A' + BO \cdot B' + CO \cdot C')/(AO^2 + BO^2 + CO^2) \qquad (7)$$

where AO is the distance between the rotation center RC and the seek line $SL_1$, BO is the distance between the rotation center RC and the seek line $SL_2$, CO is the distance between the rotation center RC and the seek line $SL_3$, A' is the positional error Diff calculated on the seek line $SL_1$, B' is the positional error Diff calculated on the seek line $SL_2$, and C' is the positional error Diff calculated on the seek line $SL_3$.

The position of the rotation center RC is calculated according to the following expression (8):

$$(\text{Rotation Center}) = (A' + B' + C')/3 \qquad (8)$$

The actual rotation angle of the actual object may be obtained in a different manner in which an actual rotation angle of each seek line is calculated based on the positional error Diff thereof and the distance of the edge point thereof from the rotation center RC and the rotation angle in question is calculated by averaging the thus obtained respective angles of the seek lines. In the latter case, however, the rotation angle as a finally obtained value may adversely be influenced if the actual edge line of the actual object has an uneven portion and a rotation angle of that portion is largely deviated from those of the other portions. In contrast, the rotation angle obtained according to the expression (7) is less influenced by the error or errors of a particular edge point or points. Thus, the accuracy of calculation of the rotation angle of the actual object is improved.

Figure 31:
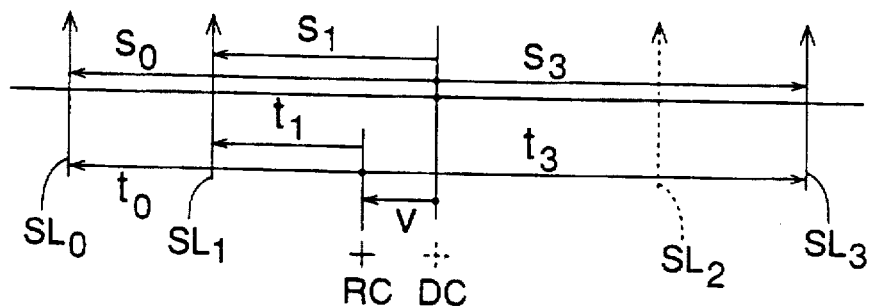
FIG. 31 is a view illustrating a manner in which an error of a rotation center of an actual object from a designated center is calculated in the case where a failure is recognized with a seek line.

FIG. 31 shows an error, v, of an actual rotation center RC from a designated center DC that is produced in the case where a failure is recognized on one (e.g. seek line $SL_2$) or more of a plurality of seek lines, $SL_0$ to $SL_3$. In many cases, the designated center DC is determined at a center of an actual object to be image-processed, and seek lines are provided symmetrically with each other with respect to the designated center DC such that a reference rotation center RC coincides with the designated center DC. Therefore, if a failure occurs to one or more seek lines and an actual rotation center RC is determined based on the seek lines other than the failure seek line or lines, there occurs a positional error between the designated center DC and the actual rotation center RC.

As described previously, assuming that a positive sign is given to the respective distances between each of the respective edge points of seek lines located on one side and the actual rotation center RC and a negative sign is given to the respective distances between each of the respective edge points of seek lines located on the other side and the actual rotation center RC, the actual rotation center RC is determined at a position ensuring that a sum of all the respective distances between each of the edge points of all the seek lines and the actual rotation center RC is equal to zero. Therefore, the following expression (9) is obtained, and the following expression (10) is obtained from the expression

(10) to calculate the positional error, v, of the actual rotation center RC from the designated center DC:

$$t_0+t_1+t_3=0 \tag{9}$$

$$(s_0-v)+\{s_0+(s_1-s_0)-v\}+\{s_0+(s_3-s_0)-v\}=0 \tag{10}$$

where $t_0$ is the distance between the rotation center RC and the seek line $SL_0$, $t_1$ is the distance between the rotation center RC and the seek line $SL_1$, $t_3$ is the distance between the rotation center RC and the seek line $SL_3$, $s_0$ is the distance between the designated center DC and the seek line $SL_0$, $s_1$ is the distance between the designated center DC and the seek line $SL_1$, and $s_3$ is the distance between the designated center DC and the seek line $SL_3$.

Figure 32:
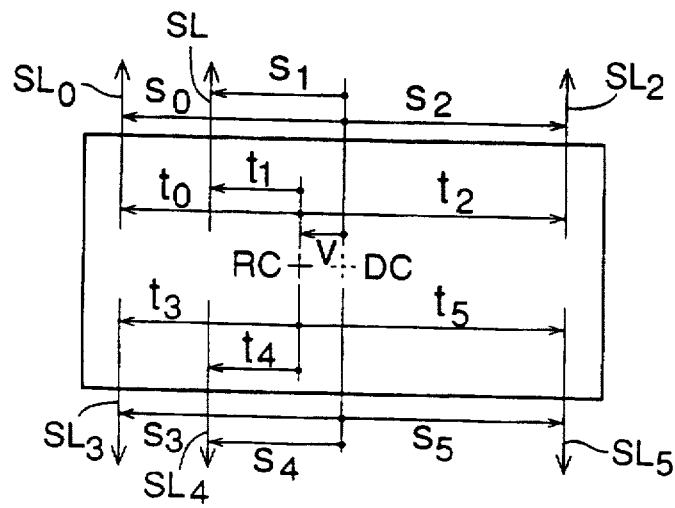
FIG. 32 is a view illustrating a manner in which an error of a reference rotation center of an actual object from a designated center is calculated in the case where a failure is recognized with at least one seek line.

FIG. 32 shows seek lines $SL_0$-$SL_5$ which are used for two parallel edge lines of a rectangular actual object. In this case, the following expression (11) is obtained, and a positional error, v, of a reference rotation center RC from a designated center DC is calculated according to the following expression (12):

$$t_0+t_1+t_2+t_3+t_4+t_5=0 \tag{11}$$

$$s_0+\{s_0+(s_1-s_0)\}+\{s_0+(s_2-s_0)\}+\{s_0+(s_3-s_0)\}+\{s_0+(s_4-s_0)\}+\{s_0+(s_5-s_0)\}-6v=0 \tag{12}$$

Figure 33:
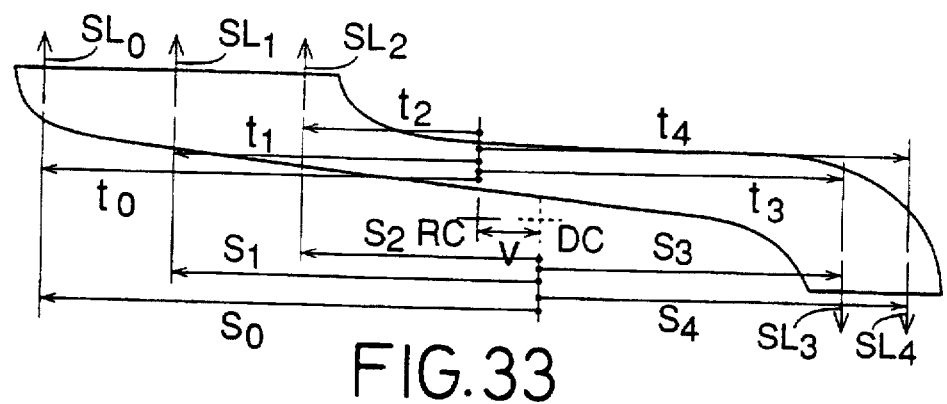
FIG. 33 is a view illustrating another manner in which an error of a reference rotation center of an actual object from a designated center is calculated in the case where a failure is recognized with at least one seek line.

FIG. 33 shows seek lines $SL_0$-$SL_4$ which are used for two parallel edge lines of a reference object like an letter "S". In this case, the following expression (13) is obtained, and a positional error, v, of a reference rotation center RC from a designated center DC is calculated according to the following expression (14):

$$t_0+t_1+t_2+t_3+t_4=0 \tag{13}$$

$$s_0+\{s_0+(s_1-s_0)\}+\{s_0+(s_2-s_0)\}+\{s_0+(s_3-s_0)\}+\{s_0+(s_4-s_0)\}-5v=0 \tag{14}$$

Figure 34:
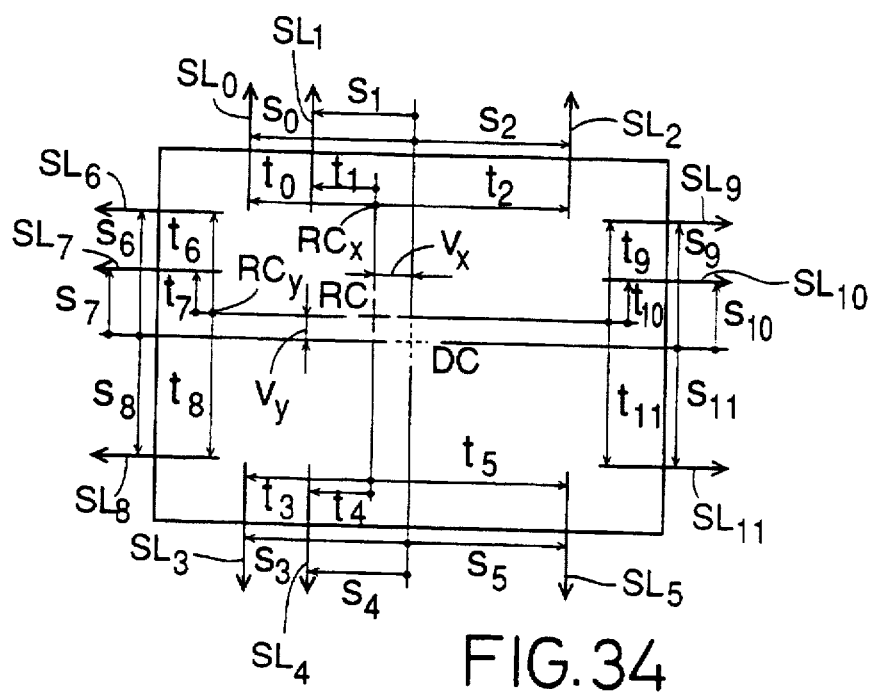
FIG. 34 is a view illustrating a manner in which a reference rotation center of an actual object, and an error of the reference rotation center from a designated center are calculated in the case where a plurality of seek lines extending in two directions perpendicular to each other are employed.

FIG. 34 shows seek lines $SL_0$—$SL_5$ used for one pair of parallel edge lines of a rectangular actual object and seek lines $SL_6$-$SL_{11}$ used for the other pair of parallel edge lines of the same object. In this case, regarding the X and Y axes or directions, the following expressions (15) and (16) are obtained, respectively, and an X-direction positional error, vx, and a Y-direction positional error, $v_y$, of a reference rotation center RC from a designated center DC are calculated according to the following expressions (17) and (18), respectively:

$$t_0+t_1+t_2+t_3+t_4+t_5=0 \tag{15}$$

$$t_6+t_7+t_8+t_9+t_{10}+t_{11}=0 \tag{16}$$

$$s_0+\{s_0+(s_1-s_0)\}+\{s_0+(s_2-s_0)\}+\{s_0+(s_3-s_0)\}+\{s_0+(s_4-s_0)\}+\{s_0+(s_5-s_0)\}-6v_x=0 \tag{17}$$

$$s_6+\{s_6+(s_7-s_6)\}+\{s_6+(s_8-s_6)\}+\{s_6+(s_9-s_6)\}+\{s_6+(s_{11}-s_6)\}+\{s_6+(s_{11}-s_6)\}-6v_y=0 \tag{18}$$

The positional error $v_x$ of the reference rotation center $RC_x$ from the designated center DC is calculated according to the expression (17) regarding the X direction, and the position of the rotation center $RC_x$ is determined based on the error $v_x$; and the positional error $v_y$ of the reference rotation center $RC_y$ from the designated center DC is calculated according to the expression (18) regarding the Y direction, and the position of the rotation center $RC_y$ is determined based on the error $v_y$. Regarding the actual object shown in FIG. 34, a reference rotation center RC is determined at a position where a straight line passing through the reference rotation center $RC_x$ and extending parallel to the Y axis intersects a straight line passing through the reference rotation center $RC_y$ and extending parallel to the X axis.

Figure 35:
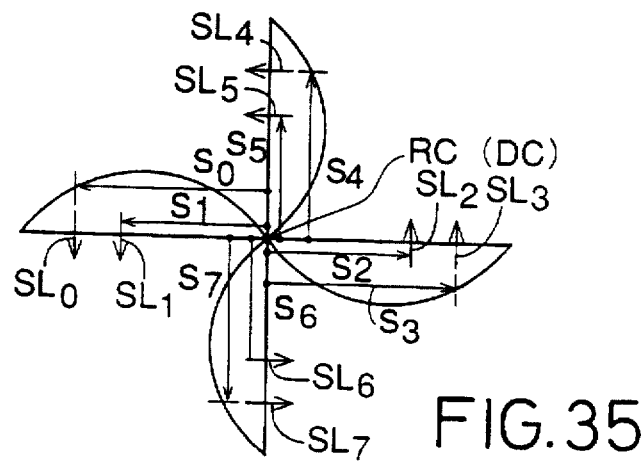
FIG. 35 is a view illustrating another manner in which a reference rotation center of an actual object, and a positional error of the reference rotation center from a designated center are calculated in the case where seek lines extending in two directions perpendicular to each other are employed.

FIG. 35 shows another example wherein seek lines $SL_0$-$SL_7$ are used for two directions perpendicular to each other. Regarding this example, it is assumed that there is no positional error between a reference rotation center RC and a designated center DC, i.e., $v_x=v_y=0$, and accordingly that the distance between each seek line $SL_0$-$SL_7$ and the rotation center RC is equal to the distance between each seek line and the designated center DC, i.e., $t_0$ to $t_7$ are equal to $s_0$ to $s_7$, respectively. For these seek lines, the following expressions (19) and (20) are obtained, and an X-direction positional error, $v_x$, and a Y-direction positional error, $v_y$, of a reference rotation center RC from a designated center DC are calculated according to the following expressions (21) and (22), respectively:

$$s_0+s_1+s_2+s_3=0 \tag{19}$$

$$s_4+s_5+s_6+s_7=0 \tag{20}$$

$$s_0+\{s_0+(s_1-s_0)\}+\{s_0+(s_2-s_0)\}+\{s_0+(s_3-s_0)\}-4v_x=0 \tag{21}$$

$$s_4+\{s_4+(s_5-s_4)\}+\{s_4+(s_6-s_4)\}+\{s_4+(s_7-s_4)\}-4v_y=0 \tag{22}$$

Figures 36, 37:
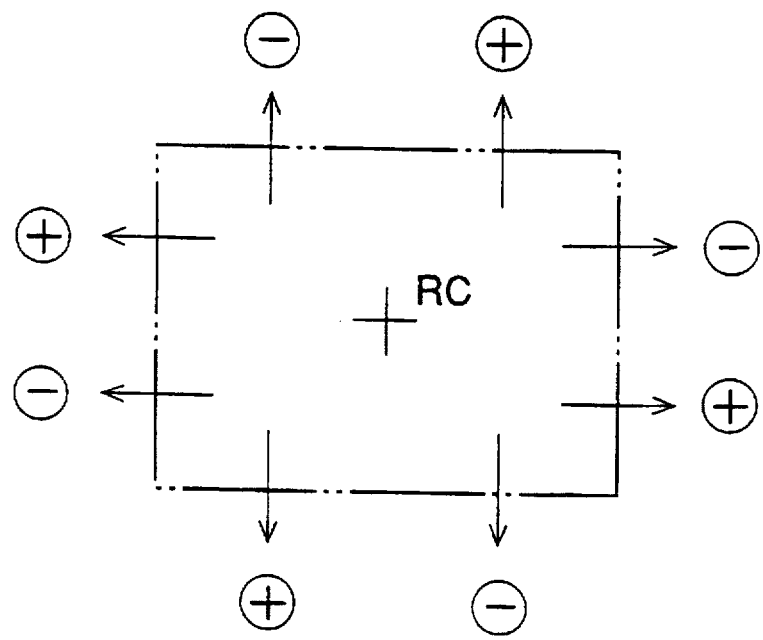
FIG. 36 is a table showing angle factors employed for the calculation of a rotation amount of an actual object.
FIG. 37 is a view illustrating the angle factors of FIG. 36 in relation with an x-y coordinate plane.

The rotation angle of an actual object is calculated using predetermined eight angle signs or factors shown in a table of FIG. 36. An appropriate one of the angle factors of the table is selected based on the angle (i.e., 0, 180, 90, or −90 degrees), and the position (upper, lower, left, or right position with respect to a rotation center RC), of each seek line. FIG. 37 shows, on an X-Y coordinate plane, the eight angle factors selected and used for representative eight seek lines having different angles and positions with respect to the reference rotation center RC, respectively.

Figure 38:
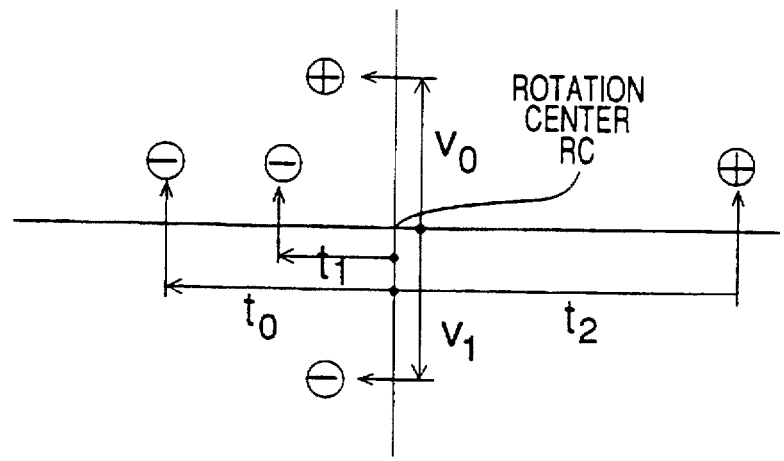
FIG. 38 is a view illustrating a manner in which a rotation center and a rotation amount of an actual object are calculated.

FIG. 38 shows a manner in which a position and a rotation angle of an actual object are calculated based on a rotation center RC and the angle factors of FIG. 36. A rotation angle is calculated according to the expressions (23) and (24):

$$(\text{Rotation Angle})=(-d_0 \cdot t_0-d_1 \cdot t_1+d_3 \cdot v_0-d_4 \cdot v_1)/t_a \tag{23}$$

$$t_a=t_0^2+t_1^2+t_2^2+v_0^2+v_1^2 \tag{24}$$

where $d_0$, $d_1$, $d_2$, $d_3$, and $d_4$ are respective errors of the respective edge points of five seek lines from the respective size points of the same, respectively.

In the above expression (23), the positive or negative sign of each of the four terms, $d_0 \cdot t_0$ $d_4 \cdot v_1$, is determined according to the table of FIG. 36. The rotation angle determined according to the expression (23) is that of an actual object being image-processed from the coordinate plane of the re-measure template including the above five seek lines.

An X-direction positional error, δx, and a Y-direction positional error, δy, of a rotation center RC are calculated according to the following expressions (25) and (26), respectively:

$$\delta x=(d_3+d_4)/2 \tag{25}$$

$$\delta y = (d_0 + d_1 + d_2)/3 \quad (26)$$

The thus obtained positional errors $\delta x$, $\delta y$ are those of an actual rotation center RC from a reference rotation center RC.

Figure 39:
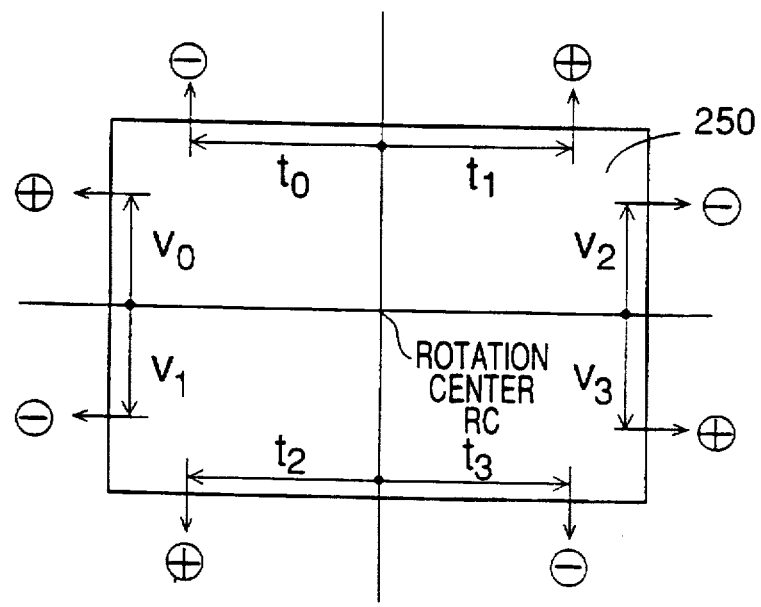
FIG. 39 is a view illustrating another manner in which a rotation center and a rotation amount of an actual object are calculated.

FIG. 39 shows an image 250 of a rectangular EC chip as an actual object to be image-processed. In the case where two seek lines parallel to the X axis and two seek lines parallel to the Y axis are used, a rotation angle, and positional errors $\delta x$, $\delta y$ of a rotation center RC are calculated according to the following expressions (27), (28), and (29), respectively:

$$\text{(Rotation Angle)} = (-d_0 \cdot t_0 + d_1 \cdot t_1 + d_2 \cdot t_2 - d_3 \cdot t_3 + d_4 \cdot v_0 - d_5 \cdot v_1 - d_6 \cdot v_2 + d_7 \cdot v_3)/(t_0^2 + t_1^2 + t_2^2 + t_3^2 + v_0^2 + v_1^2 + v_2^2 + v_3^2) \quad (27)$$

$$\delta x = (d_4 + d_5 + d_6 + d_7)/4 \quad (28)$$

$$\delta y = (d_0 + d_1 + d_2 + d_3)/3 \quad (29)$$

where $d_0$, $d_1$, $d_2$, and $d_3$ are respective errors between the edge and size points on respective seek lines having distances, $t_0$ to $t_3$, each from a rotation center RC, and $d_4$, $d_5$, $d_6$, and $d_7$ are respective errors between the edge and size points on respective seek lines having distances, $v_0$ to $t_3$, each from the rotation center RC.

The above-indicated expressions obtained for calculating the rotation angle and the positional errors $\delta x$, $\delta y$ will actually be used on examples, below, to prove that those expressions can operate correctly, in place of proving the mathematical correctness of those expressions.

Figure 40:
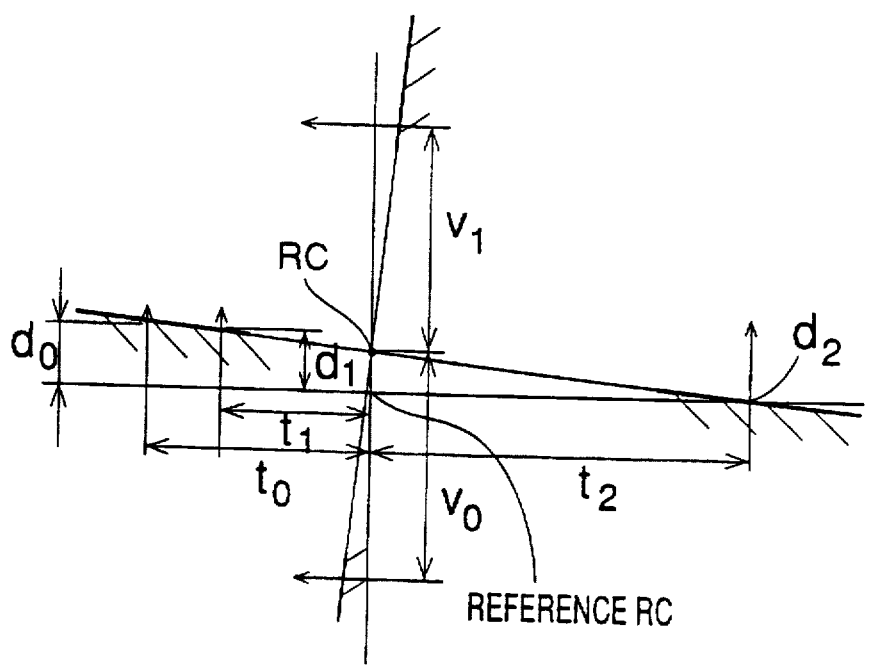
FIG. 40 is a view illustrating a manner in which an actual rotation center and an actual rotation amount of an actual object are calculated.

FIG. 40 shows an actual object whose optical image is assumed to be rotated by −0.1 radian about an actual rotation center RC and that the actual rotation center RC is remote from a reference rotation center RC by 5 mm in the Y direction and by 0 mm in the X direction. Additionally, assuming that $t_0 = 30$ mm, $t_1 = 20$ mm, $t_2 = 50$ mm, $v_0 = 30$ mm, and $v_1 = 30$ mm, and so long as a rotation angle, $\theta$, is so small that sin $\theta$ can be regarded as being equal to $\theta$ (i.e., sin $\theta = \theta$), the following results should be obtained: $d_0 = +8$ mm, $d_1 = +7$ mm, $d_2 = 0$ mm, $d_3 = -3$ mm, and $d_4 = +3$ mm. In addition, a value, $t_a$ ($= t_0^2 + t_1^2 + t_2^2 + v_0^2 + v_1^2$), should be calculated 5,600 mm$^2$.

When the above values are substituted in the expressions (24), (25), and (26), the rotation angle and the positional errors $\delta x$, $\delta y$ of the actual rotation center RC are calculated by the following equations (30), (31), and (32):

$$\text{(Rotation Angle)} = \{-(8 \times 30) - (7 \times 20) + (0 \times 50) + (-3 \times 30) - (+3 \times 30)\}/5600 = -0.1 \quad (30)$$

$$\delta x = (-3 + 3)/2 = 0 \quad (31)$$

$$\delta y = (8 + 7 + 0)/3 = 5 \quad (32)$$

Thus, a rotation angle of an actual object about an actual rotation center RC and positional errors of an actual position of the actual rotation center RC from a reference rotation center are calculated. However, the EC mounting operation needs a rotation angle of an actual object about a designated center DC and positional errors of an actual position of the designated center RC from a reference position. Therefore, the latter values are calculated based on the former values, respectively. However, a rotation angle of an actual object about the actual rotation center RC is equal to a rotation angle of an actual object about the designated center DC. Thus, only the positional errors of the designated center DC are calculated based on the positional and angular errors of the actual rotation center RC.

Figure 41:
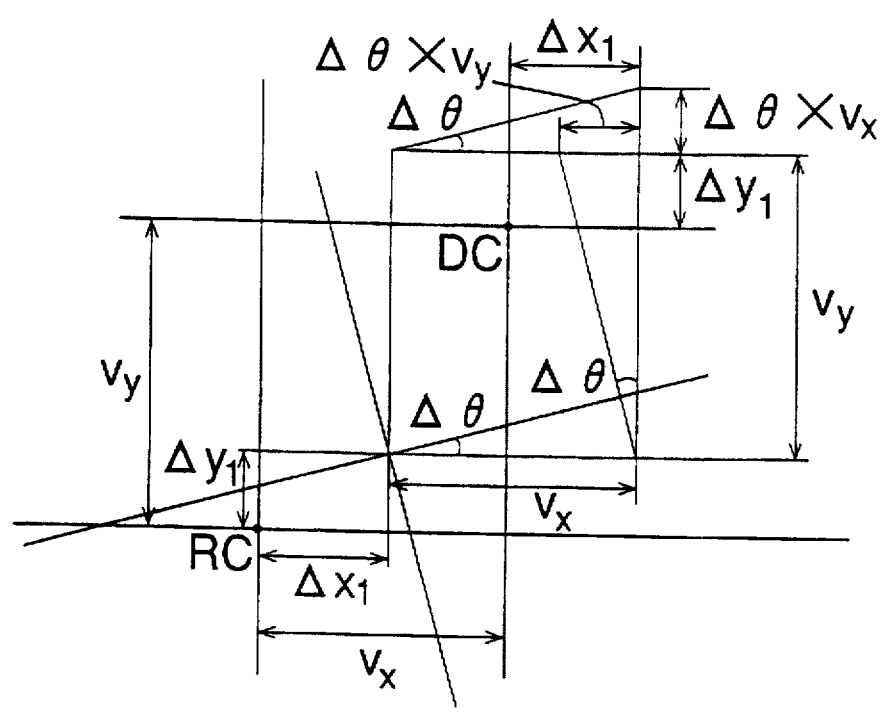
FIG. 41 is a view illustrating a manner in which a positional and an angular error of an actual designated center of an actual object are calculated in the case where there is a distance between a reference designated center and a reference rotation center of the actual object and there are a positional and an angular error of the actual object.

In the case where an actual object being image-processed has no angular error and has only positional errors, $\delta x_1$, $\delta y_1$, in the X and Y directions, both positional errors of an actual rotation center RC, and positional errors of an actual designated center DC, of the actual object are equal to the errors $\delta x_1$, $\delta y_1$. However, in the case where the actual object has an angular error, $\delta \theta$, the positional errors of the actual designated center DC that are distant by respective distances, $v_x$, $v_y$, from the actual rotation center RC in the X and Y directions, respectively, are equal to values, $(\delta x_1 - \delta \theta \times v_y)$ and $(\delta y_1 - \delta \theta \times v_x)$, respectively, as shown in FIG. 41.

Figure 42:
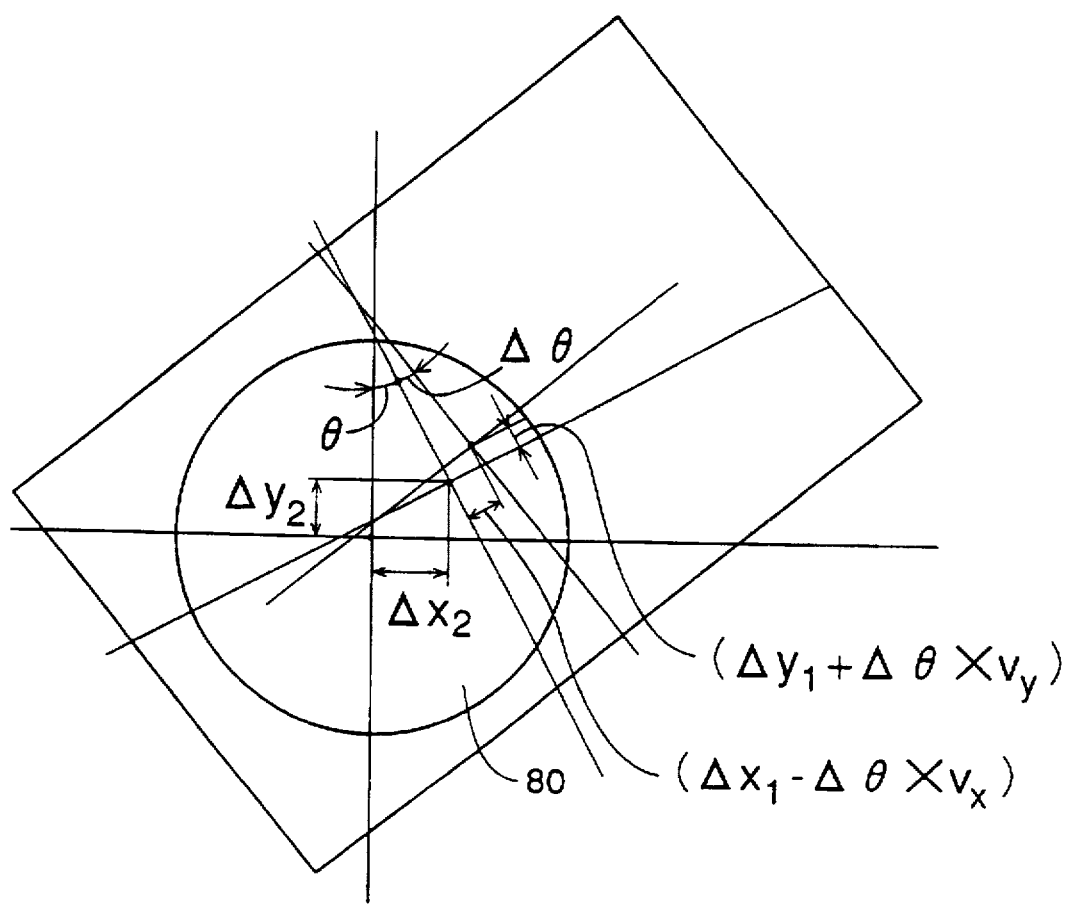
FIG. 42 is a view illustrating a manner in which a positional and an angular error of an actual object from a reference position and a reference angle thereof are calculated.

The thus obtained rotation angle $\delta \theta$ and the positional errors $(\delta x_1 - \delta \theta \times v_y)$, $(\delta y_1 - \delta \theta \times v_x)$ are those of the actual designated center DC of the actual object from the origin of the coordinate plane of the re-measure template being used. However, in many cases, the coordinate plane of each individual template has a rotation angle, $\theta$, and positional errors, $\delta x_2$, $\delta y_2$, relative to the reference coordinate plane, as shown in FIG. 42, because the individual-template coordinate plane is obtained by coordinate transformation of the reference coordinate plane.

In the present embodiment, the origin of the reference coordinate plane coincides with the optical axis of the first or second CCD camera 128, 134, i.e., the center of vision field and, at the EC-holding-error detecting position, each suction nozzle 80 is positioned such that the axis line of each suction nozzle 80 coincides with the optical axis of the second CCD camera 134. In the present embodiment, therefore, the angular error $\theta$ and positional errors $\delta x_2$, $\delta y_2$ of the individual-template coordinate plane relative to the reference coordinate plane are equal to those of the origin of the template coordinate plane relative to the axis line of each suction nozzle 80.

Thus, the angular and positional errors of a designated center DC of an EC as an actual object being image-processed, relative to the axis line of each EC suction nozzle 80, are equal to $(\theta + \delta \theta)$, $\{\delta x_2 + (\delta x_1 - \delta \theta \times v_y) \times \cos \theta\}$, and $\delta y_2 + (\delta y_1 - \delta \theta \times v_x) \times \sin \theta\}$, respectively.

The foregoing description relates to the case where one or more failures are recognized on one or more seek lines. On the other hand, in the case where no failure is recognized, the x and y coordinates of a reference rotation center RC, the respective distances of seek lines from the reference rotation center RC, and the positional errors of the reference rotation center RC from a designated center DC can be predetermined based on the re-measure template being used and the reference object corresponding to the current re-measure template. In the present embodiment, those values are pre-stored as default values in the memory card, and calculations are carried out based on those default values.

In a particular case where the calculation of a size is not prescribed, all seek lines consist of sets of paired seek lines, and no failure is recognized, the calculations of size points are omitted, and the positional errors between the ideal points and edge points of the seek lines are calculated in place of the calculations of errors between the ideal points and the size points. In this case, positional and angular errors may be calculated based on the errors between the ideal points and the edge points. Even if an actual object being image-processed has a size error, the size error does not adversely influence the accuracy of calculation of the position of the actual object, because respective size-error components relating to each set of paired seek lines offset each other.

Even in the case where one or more failures are recognized, the calculations of size points may not be needed, and accordingly may be omitted, unless the calculations of positional errors are prescribed.

Next, there will be described the operation of the present image processing apparatus in the case where an actual object to be image-processed is each of two reference marks fixed to each PCB 90. Positional errors of each PCB 90 in a horizontal plane and an angular error of the PCB 90 about a vertical axis line are calculated based on the picked-up image of the two PCB marks. Therefore, the calculation of an angular error of each PCB mark is not needed.

The positional errors of each PCB 90 are calculated in a manner almost common to that employed for the calculations of positional errors of a rectangular EC chip. However, in the present embodiment, PCB marks have a special edge line such as a full circle or a partly cut circle. The following description will be focused on the differences of the calculations of positional errors of those PCB marks from those of positional errors of rectangular EC chips.

Figure 44:
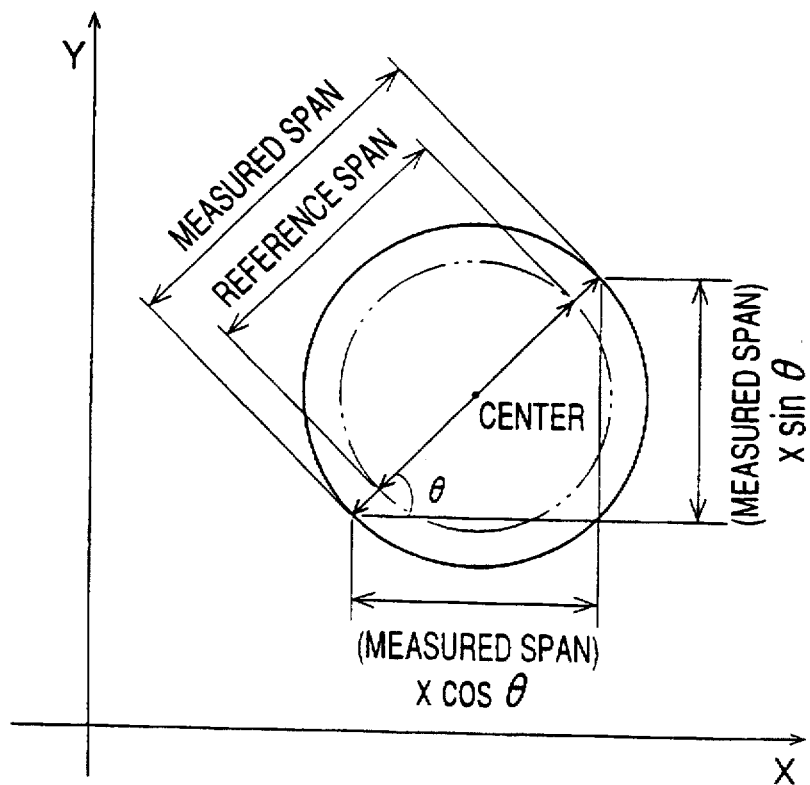
FIG. 44 is a view illustrating a manner in which a size of the circular PCB mark of FIG. 43 is calculated.
Figure 45:
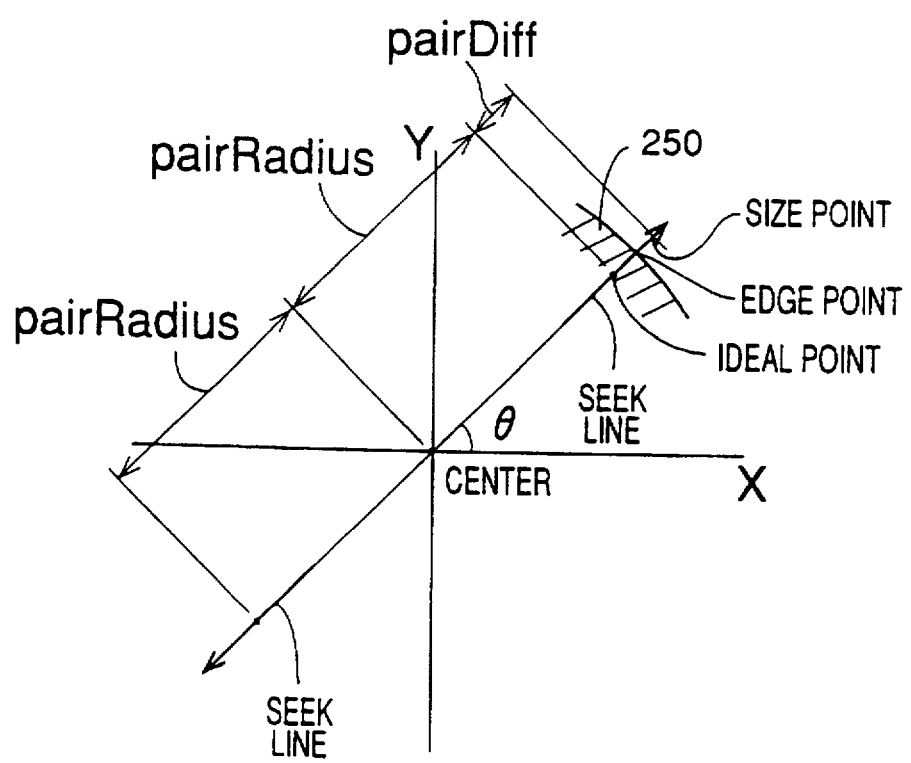
FIG. 45 is a view illustrating manners in which a size point is determined and a distance between the size point and an edge point is calculated.
Figure 46:
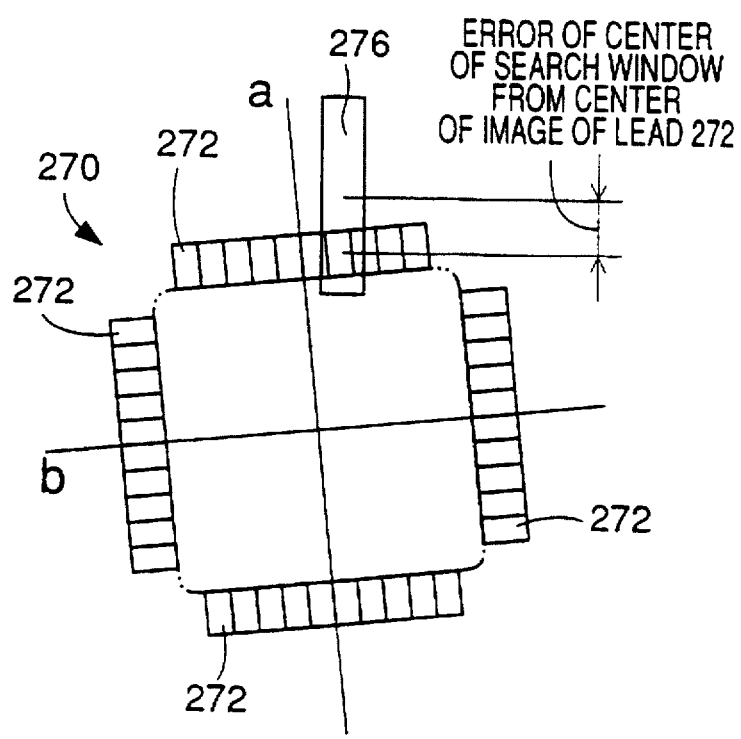
FIG. 46 is a view illustrating a pattern-matching process which is carried out on a QFP (quad flat package) EC as an actual object.

First, there will be described, by reference to FIGS. 43, 44, and 45, the case where a failure is recognized on one of seek lines which are used for a picked-up image 260 of a PCB mark. The failure seek line is one having 90 degrees as indicated at broken line in FIG. 43. It is assumed that the PCB-mark image 260 has a size larger than a reference size of a proper or correct PCB-mark image.

In the case of the PCB-mark image 260, too, the calculation of the size of the image 260 is carried out first. The size calculation needs the calculation of size factors like in the case of the rectangular-EC-chip image 250 shown in FIG. 28. Assuming that eight seek lines equidistant from one another at a regular interval of 45 degrees extend radially as shown in FIG. 43, an X-direction size factor, sizeFX, and a Y-direction size factor, sizeFY, are calculated according to the following expressions (33), (34), and (35):

```
for(i=0;i<n;i++){sizeXM+=(measured span[i]/reference span[i]
   )*abs(cosangle[i]); baseXM+=abs(cosangle[i]); sizeYM+=(mea-
   sured span[i]/reference span[i])*abs(sinangle[i]); baseYM+=
   abs(sinangle[i])};                                          (33)

sizeFX=(sizeXM)/(baseXM);                                      (34)

sizeFY=(sizeYM)/(baseYM);                                      (35)
```

The parameters sizeXM, sizeYM, baseXM, base YM are given initial values such that sizeXM=sizeYM=0 and baseXM=base YM=0.

The above expression (33) are described in the programming language C, and the word, for(i=0;i<n;i++), means the sum of the values obtained by changing the number, i, from 0 to (n−1). The number, n, means the number of the seek lines used. In the example of FIG. 43, the number, n, is 4 (n=4), and the number, i, is changed from 0 to 3. However, when the number, i, is changed to designate the failure seek line, the CPU 154 does not carry out calculation therefor and add one to the number, i. Thus, regarding the example of FIG. 43, the expression (33) is used on each of the three sets of paired seek lines except for the set of paired seek lines including the failure 0-degree seek line.

In the case of a circular image, radial seek lines are used which include seek lines inclined with respect to the X and Y axes. Each of the inclined seek lines has respective components of the X-direction and Y-direction size factors. The above expressions (33), (34), and (35) are used to calculate the X-direction and Y-direction size-factor components of each of the inclined seek lines, so that each of the inclined seek lines contributes to the determination of the X-direction and Y-direction size factors depending upon the respective X-direction and Y-direction size-factor components thereof.

Thus, the size factors, sizeFX, sizeFY, representing the X-direction and Y-direction size factors are obtained. Since two size factors are determined for the X and Y directions, respectively, the present image processing apparatus can deal with the case where there occurs a size error having different proportions in the X and Y directions, respectively.

Next, size points are specified. As shown in FIG. 45, a positional error, pairDiff, between an ideal point and a size point is calculated according to the following expressions (36) to (43) (the expressions (36), (37) are described in the programming language C), a size point is calculated based on the obtained value, pairDiff, and the ideal point, and a positional error, Diff, between the size point and the edge point is calculated:

$$\delta_{Lx} = pairRadius * \cos\theta * (sizeFX-1); \quad (36)$$

$$\delta_{Ly} = pairRadius * \cos\theta * (sizeFY-1); \quad (37)$$

For $\delta_{Lx} \geq 0$ and $\delta_{Ly} \geq 0$, pairDiff=$\sqrt{\{(\delta_{Lx})^2+(\delta_{Ly})^2\}}$; (38)

For $\delta_{Lx} < 0$ and $\delta_{Ly} < 0$, pairDiff=$-\sqrt{(\delta_{Lx})^2+(\delta_{Ly})^2\}}$; (39)

For $\delta_{Lx} < 0$ and $\delta_{Ly} \geq 0$, and $|\delta_{Lx}| \geq |\delta_{Ly}|$, pairDiff=$-\sqrt{\{(\delta_{Lx})^2-(\delta_{Ly})^2\}}$; (40)

For $\delta_{Lx} < 0$ and $\delta_{Ly} \geq 0$, and $|\delta_{Lx}| < |\delta_{Ly}|$, pairDiff=$\sqrt{\{-(\delta_{Lx})^2+(\delta_{Ly})^2\}}$; (41)

For $\delta_{Lx} \geq 0$ and $\delta_{Ly} < 0$, and $|\delta_{Lx}| \geq |\delta_{Ly}|$, pairDiff=$\sqrt{\{(\delta_{Lx})^2-(\delta_{Ly})^2\}}$; (42)

For $\delta_{Lx} \geq 0$ and $\delta_{Ly} < 0$, and $|\delta_{Lx}| < |\delta_{Ly}|$, pairDiff=$-\sqrt{\{-(\delta_{Lx})^2+(\delta_{Ly})^2\}}$; (43)

Figure 43:
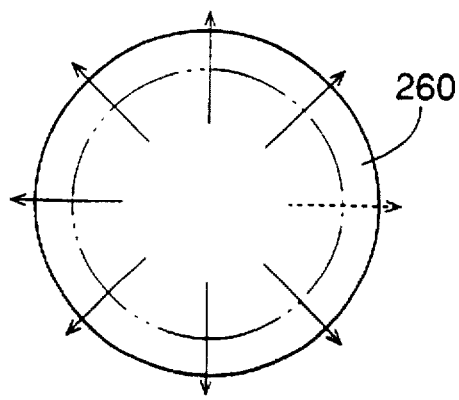
FIG. 43 is a view showing seek lines superposed on a circular PCB mark as an actual object.

As described previously, the calculation of a rotation angle of the actual image 260 of the PCB mark is not needed, and only the position of the actual image 260 is calculated. First, a position factor, posFactor, is calculated according to the following expression (44):

$$posFactorM[i]=1/\Sigma \cos^2(angleR[i]-angleR[n]) \quad (44)$$

where the number, i, indicates each seek line and changes from 0 to 7 (for the example of FIG. 43), and the number, n, indicates the number of the seek lines and changes from 1 to 8 (for the example of FIG. 43).

The term, $\Sigma \cos^2(angleR[i]-angleR[n])$, means the sum of the respective squares of the respective cosines of the differences of the angle R[i] of each seek line and each of the respective angles R[n] of all the seek lines other than the failure seek line. Regarding this calculation, too, when the number, i, is changed to designate the failure seek line, the CPU 154 does not carry out any calculation therefor and add one to the number, i. Thus, regarding the example of FIG. 43, the calculations of position factors, posFactor, are not carried out on the failure, 0-degree seek line and are carried out on each of the seek lines having the 45, 90, 135, 180, 225, 270, and 315 degrees.

Next, the thus obtained position factor, posFactor, is used to calculate the position of the actual image 260 of the PCB mark according to the following expression (45) (described in the programming language C):

```
for(x=0, y=0, i=0;i<n;i++){x=x+cos (i)*posFactorM[i]*ss[i]; y=y+
   sin (i)*posFactorM[i]*ss[i];}                               (45)
``` where ss[i] is the positional error, Diff, between the size point and the edge point of each seek line.

Regarding each of all the seek lines except for the failure seek line, the positional error, i.e., X-direction and Y-direction error values, ss[i], of each seek line are multiplied by the position factor, posFactorM[i], to provide an X-direction and a Y-direction component, respectively. All the thus obtained X-direction components are added to one another and all the thus-obtained Y-direction components are added to one another, so that a center position, (x, y), is specified. The x and y coordinates of this center position indicate the positional error, i.e., error values of the center of the actual image 260 of the PCB mark from the origin of the template coordinate plane, as measured in the X and Y directions, respectively. Therefore, the positional error of the PCB mark 260 from the reference coordinate plane is obtained by adding, to this center position, the positional error of the template coordinate plane from the reference coordinate plane.

In the case where the actual image of an actual object being image-processed has a circular edge line and no failure is recognized on the seek lines used therefor, the calculation of a position of the actual image is carried out by using default values as position factors, etc., like in the case where an actual object being image-processed is a rectangular EC chip.

The term of "position factor" is not used in the previous description relating to the cases where the actual object is the straight segment shown in FIG. 30 or the rectangular EC chip shown in FIG. 39. However, in fact, also in those cases, the calculation of a position factor is carried out according to the expression (44). The number of ⅓ occurring in the expression (8) or the number of ¼ occurring in the expression (28) or (29) is a position factor. This can easily be demonstrated by applying particular values to the expression (44). The expression (44) is a general expression that can be used on any shape or edge line of an actual object. The reason why the expression (44) is not referred to in the description of the example of FIG. 30 or 39, is to help understand the nature of a rotation center RC, and to prove the correctness of the expression (44) by comparing the results of the easy calculations on those simple examples, with the results of the complex calculations in accordance with the general expression (44). The value, ⅓ or ¼, occurring in the expression (28) or (29) can change if one or more failures are recognized on one or more seek lines.

The above-described calculations that carried out in the case of an actual object having a circular edge line are applicable to the case of an actual object having an octagonal edge line obtained by cutting off each corner of a rectangle obliquely at 45 degrees. Generally, those size and position calculations are applicable to the case of any actual object having an edge line including one or more inclined straight or curved portions.

While the present image processing apparatus has been described with respect the case where the actual object is a rectangular EC chip having no lead wire and the case where the actual object is a circular PCB mark, ECs 82 which are mounted on a PCB 90 may include an EC having a plurality of lead wires, such as QFP EC. In the case where the actual object is an EC with lead wires, the image processing of an actual image of that EC is carried out according to the pattern-matching manager in which a plurality of pattern-matching processes are combined.

In the case of an actual image 270 of a QFP EC, the image processing of the actual image 270 is carried out based on not the entire profile of the QFP EC but an image 272 of each lead wire of the same. The errors of positioning of the lead wires with respect to the printed pattern on the PCB 90 can be minimized by mounting the QFP EC on the PCB 90 based on data indicative of the positions of the lead wires. The size, position, and/or rotation angle of the QFP EC are calculated by combining pattern-matching processes in each of which a corresponding one of the lead images 272 is dealt with as an actual object to be image-processed.

Initially, one of the lead images 272 is sought. To this end, a search window 276 sufficient to cover or encompass just a single lead image 272 is produced. Within the search window, a seek template including a plurality of pairs of points which are prepared in advance and pre-stored, is used to seek one lead image 272.

A full pattern-patching process including all steps, i.e., a seek step, a re-seek step, a measure step, and a re-measure step are carried out to measure a position and a rotation angle of the lead image 272. Thereafter, a half pattern-matching process including only a seek step and a re-seek step is carried out to seek out each of lead images 272 on one of the four sides of the actual image 270. Since a regular interval of distance, i.e., pitch at which the lead wires are regularly provided on the QFP EC is known to the computer of the control device 150, the position and rotation angle of a seek template which is suitably used in the following seek step for the next lead image 272 are determined based on the position and rotation angle of the lead image 272 obtained in the current re-seek step and the pitch of the lead wires. Thus, a full pattern- patching process is not needed in seeking the second or following lead images 272.

After pattern-matching processes are carried out on all the lead images 272 provided on one side of the actual image 270 and the respective positions of those lead images 272 are calculated, respective X coordinates of centers of those lead images 272 are added to one another and the thus obtained value is divided by the number of those lead images 272. Similarly, respective Y coordinates of the centers of those lead images 272 are added to one another and the thus obtained value is divided by the number of those lead images 272. Thus, x and y coordinates of a center of those lead images 272 are determined. In a similar manner, regarding each of the other three sides of the actual image 270, x and y coordinates of a center of the lead images 272 provided on each side are determined by repeating half pattern-matching processes in each of which the position and rotation angle of a seek template are determined based on the position and rotation angle of a re-seek template used in the preceding half pattern-matching process. Since a positional relationship between each side and the other three sides is known to the computer, a seek template used for one side of the actual image 270 can be determined based on a re-seek template used for another side of the same. After the x and y coordinates of the center of the lead images 272 on each of the four sides of the actual image 270 are calculated, the x and y coordinates of a point of intersection of two straight lines, a and b, one of which connect between two of the four centers and the other of which connect the other two centers are calculated as those of a center of the actual image 270, i.e., QFP EC. A rotation angle (in degrees) of the EC image 270 is calculated according to the following expression (46):

$$\{(\text{angle of slope of straight line, a})-90+(\text{angle of slope of straight line, b})\}/2 \quad (46)$$

Also in the case where a PLCC EC or a BGA EC is image-processed, lead wires or balls of the EC are image-processed according to the pattern-matching manager.

In the case of a PLCC EC, the light used to irradiate the EC is more reflected by the lead wires of the EC than the remaining, main portion of the same. Since the amount of light reflected from the main portion of the EC is less than that reflected from the lead wires, the image picked up by the second CCD camera 134 contains a bright image of the lead wires and a dark image of the main portion. Thus, the present invention can be carried out on an optical image including an actual image of an actual object to be image-processed and an image of a background of the actual object.

In this way, the recognition of an optical image of each of almost all sorts of ECs that are available for being mounted on PCBs is accomplished according to the pattern-matching program or the pattern-matching manager. A master seek template and a master measure template are produced in advance for each of individual sorts of ECs. However, the image-processing program can commonly be utilized to use each master template or each measure template. Thus, different image-processing programs are not needed for image-processing different sorts of ECs. Thus, the time needed to produce those programs is saved. An image of an EC having lead wires to be inserted into holes of a PCB 90 and then soldered can be processed by the pattern-matching process or the combination of pattern-matching processes.

The time needed to carry out the image processing increases as the distance between the center of the search window and the center of an actual image increases. To avoid this, it is preferred that the position of the center of the search window be changed based on the position of the seek template used to seek out the actual image. For example, in the case where respective actual images 270 of QFP ECs are processed, it is preferred to determine the distance between the center of each of a plurality of lead images 272 and a corresponding one of a plurality of search windows used therefor and calculate, as an positional error, an average of the thus determined distances. In the latter case, a search window to be used for another lead image is changed or moved so as to obviate the positional error.

Figure 47:
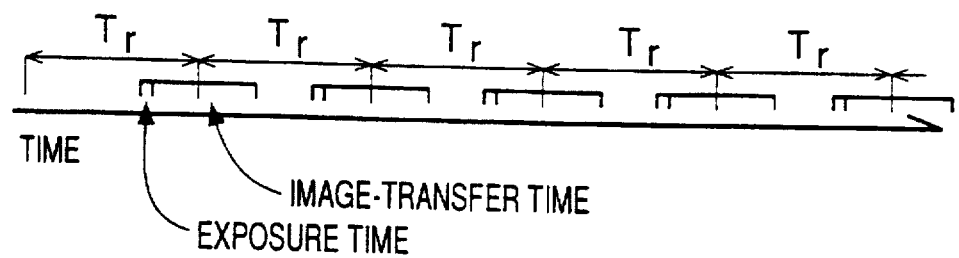
FIG. 47 is a time chart showing a time-wise relationship between respective time periods of intermittent rotations of the index table of the system of FIG. 1 and an exposure time and an image-transfer time of a first or second CCD camera of the system.

Each time each EC mounting head 56 is moved to the EC-holding-error detecting position and an optical image of an EC 82 held by each EC mounting head 56 is picked-up by the second CCD camera 134, the pattern-matching operating or the combination of pattern-matching operations is carried out and the calculation of object vectors are performed, so that the identification of an EC 82 and the positional and angular errors of the EC are calculated. As indicated in a time chart of FIG. 47, during a time, $T_r$, needed to carry out a single intermittent rotation of the index table 42, the EC 82 held by each EC mounting head 56 is irradiated with light and an actual image of the EC 82 is picked up by the second CCD camera 134, when the EC holding head 56 is stopped at the EC-holding-error detecting position. Subsequently, image data indicative of the picked-up actual image of the EC 82 are produced by the CCD camera 134 and transferred to an appropriate one of the four FGMs 164 so as to be processed by the control device 150. The transferring and processing of the image data are carried out concurrently with each other.

The four FGMs 164 can store four batches of image data for four ECs, separately from one another. The time needed to complete the image processing of an EC may be longer than that needed to complete a single intermittent rotation of the index table 42. An image processing must be finished a predetermined time before the results of the image processing are utilized. In the case where a plurality of intermittent rotations of the index table 42 as an intermittent-rotation member are done after the picking-up of the actual image and before the use of the results of the image processing, it is not essentially required that the image processing be completed during a single intermittent rotation of the index table 42. The present image processing apparatus can finish, while the index table 42 makes a predetermined number of intermittent rotations, the image processing of the same number of objects as the predetermined number. More specifically, since the EC mounting system has four operative positions (FIG. 4) from the EC-holding-error detecting position to the EC-posture correcting position, the present image processing apparatus can finish the image processing of four ECs 82 during four intermittent rotations of the index table 42 such that the time of image processing of one EC 82 may exceed the time of a single intermittent rotation of the index table 42 and the image-processing time of another EC 82 may be shorter than the single-intermittent-rotation time of the table 42 by a time equal to, or more than, the above excess of time.

ECs 82 which are mounted on a PCB 90 may include one having no lead wire and accordingly having a simple edge line, such as a rectangular EC chip, and one having a plurality of lead wires and accordingly having a complex edge line. The image processing of a simple EC needs only a short time, whereas the image processing of a complex EC needs a long time. The present image processing apparatus can image-process a complex EC in a time longer than a single intermittent-rotation time, by utilizing a portion of the single intermittent-rotation time which portion is left as a result of image processing of a simple EC.

If the image processing of each EC 82 must be completed during each intermittent rotation (i.e., sum of an intermittently rotating time and a stopping time) of the index table 42, each intermittent rotation must be defined as taking a time corresponding to the longest one of respective times needed to image-process all sorts of ECs 82. Consequently the speed of intermittent rotations of the index table 42 would decrease. In contrast thereto, in the present image processing apparatus, four batches of image data are separately stored in the four FGMs 164, respectively, so that the processing of each of the four batches of image data is completed during four intermittent rotations of the index table 42. Thus, the present image processing apparatus processes each of four batches of image data in such a manner that the sum of respective times needed to process the four batches of image data is not more than the time needed for the four intermittent rotations of the index table 42. Generally, the processing apparatus processes each of a plurality of batches of image data in such a manner that the sum of respective times needed to process the batches of image data is not more than the time needed for the same number of intermittent rotations of the index table 42 as the number of the batches of image data. Stated differently, the processing apparatus processes a plurality of batches of image data in such a manner that an average of respective times needed to process the batches of image data is not more than the time needed for a single intermittent rotation of the index table 42. Thus, the speed of intermittent rotation of the index table 42 can be increased.

Figure 48:
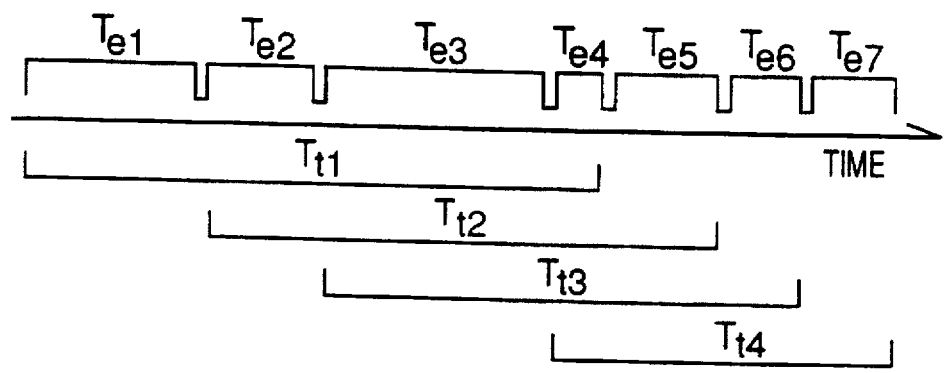
FIG. 48 is a time chart illustrating image-processing cycles of the image processing apparatus of the system of FIG. 1.

FIG. 48 shows an example of respective times, $T_{e1}$ to $T_{e7}$, which are consumed to image-process seven ECs 82, respectively. The times $T_{e1}-T_{e7}$ are different from each other, such that some are longer, and some are shorter, than the time $T_r$ (FIG. 47) needed for a single intermittent rotation of the index table 42. However, as can be understood by comparison with FIG. 47, each of respective times, $T_{t1}$ to $T_{t4}$, which is needed to image-process a corresponding one of four groups of successive ECs 82 (each group includes four ECs 82) is always shorter than a time, $4 \times T_r$, needed for four intermittent rotations of the index table 42.

As is apparent from the foregoing description, in the present image processing apparatus, the batches of image data representative of the actual images of the EC 82 and the PCB mark picked up by the first and second CCD cameras 128, 134 are processed by the pattern-matching program or the pattern-matching manager. The pattern-matching program or the pattern-matching manager is carried out to produce the seek, re-seek, measure, and re-measure templates with which an actual image of an actual object is sought and edge points are determined. Those templates are produced within a limited area or areas in a x-y coordinate system. Thus, a limited portion or portions of each of the batches of image data is/are processed by the present image processing apparatus. Even in the case where a batch of image data suffers from image "noise" such as white or black spots, the processing apparatus can process the image data without being adversely influenced by the image noise, so long as the image noise is not present in the limited portion or portions to be processed.

Regarding an EC having lead wires located within an outer edge line of the EC, such as a PLCC EC, the present image processing apparatus can recognize only the lead wires of the EC. In this case, the processing apparatus do not have to recognize the outer edge line of the EC and accordingly can carry out the image processing of the EC without being adversely influenced by noise possibly present on the outer edge line.

In addition, regarding an EC having lead wires within an outer edge line of the EC, such as a PLCC EC, which do not require the present image processing apparatus to recognize the edge line of the actual object, the processing apparatus can carry out the image processing of the EC, unless something analogous with the lead wires of the EC is present in the background of the EC, even though background may be white or black, or has a special pattern. For example, in the case where a main portion of the EC other than the lead wires has the same color as that of the background, or in the case where a portion of the background has the same color as that of the main portion of the EC, it is difficult to recognize the edge line of the EC because the main portion of the EC may be lost in the background. However, the lead wires of the EC are glossy and can easily be sought out and measured unless something analogous therewith is present in the background. The present image processing apparatus can produce various templates to be used for lead wires as actual objects to be image-processed, and accordingly can recognize the lead wires with those templates without being confused by the background thereof.

In the seek step, the CPU 154 of the control device 150 judges whether an actual object being image-processed is identical with a reference object corresponding to various templates. This judgment is made based on an amount of difference (e.g., difference itself, or ratio) between two optical-characteristic values (e.g., luminance values) of a batch of image data which correspond to the two points of each pair out of a plurality of pairs of points providing each seek template. In the re-seek, measure, and re-measure steps, an edge point is determined on each of a plurality of seek lines or segments providing each of the re-seek, measure, and re-measure templates. This determination is made based on rates of change of optical-characteristic values of the image data which correspond to each of the seek lines or segments. Even in the case of a large actual object, such as a QFP or PLCC EC, which may easily fail to receive uniform lighting or irradiation, the present image processing apparatus compares or differentiates the optical-characteristic values of the image data which correspond to the points or portions of the actual object which receive substantially uniform lighting. Thus, the processing apparatus can image-process any actual object with accuracy, without being adversely influenced by possible uneven lighting of the actual object.

In the present image processing apparatus, the first or second CCD camera 128, 134 may be replaced with a different CCD camera including solid-state image pick-up elements each having a different size. In this case, the processing apparatus is operated according to substantially the same control programs as those employed in the illustrated embodiment.

It emerges from the foregoing description that in the present embodiment, each of the first and second CCD cameras 128, 134 provides an image pick-up device; the FGMs 164 provide an image-data memory; the DRAM 156 provides a seek-template-data memory and a measure-template-data memory; a portion of the control device 150 for carrying out the seek step of the pattern-matching program provides judging means; a portion of the control device 150 for carrying out the re-seek, measure, and re-measure steps of the pattern-matching program provides edge-point specifying means; a portion of the control device 150 for carrying out the re-seek step of the pattern-matching program provides re-judging means; a portion of the control device 150 for carrying out the object-vector calculating program provides object-parameter calculating means; a portion of the control device 150 for automatically producing seek lines or segments according to the pattern-matching program provides segment-producing means; and a portion of the control device 150 for repetitively operating the segment-producing means, the edge-point specifying means, and the object-parameter calculating means according to the pattern-matching program, provides repeating means.

In addition, a portion of the control device 150 for designating points so as to calculate luminance values corresponding thereto, in the seek, re-seek, measure, and re-measure steps according to the pattern-matching program, provides designating means; a portion of the control device 150 for producing data indicative of the luminance values corresponding to the designated points provides means for producing data indicative of the luminance values corresponding to the designated points as virtual points; a portion of the control device 150 for calculating luminance values corresponding to division points on each seek line provides means for obtaining optical-characteristic values corresponding to the division points; and a portion of the control device 150 for specifying, as an edge point, a point corresponding to a maximum value of the rates of change of the luminance values which correspond to each seek line or segment, provides a sort of edge-point specifying means.

Furthermore, the overlay display memory 166, the CPU 154, and the CRT interface 186 cooperate with one another to provide first display control means for operating the monitor CRT device 188 to display an optical image of an actual object picked up by the CCD camera 128, 134, while superimposing each template on the optical image; the Chinese ROM 162, the CPU 154, and the CRT interface 186 cooperate with one another to provide second display control means for operating the monitor CRT 188 to display an input-related image corresponding to the input-related data; and a portion of the CPU 154 for operating the monitor CRT 188 to display the input-related image in place of a portion or entirety of the optical image, when the input-related data are input to the second display control means, provides third display control means.

Moreover, the index table 42 provides an intermittent-rotation member which is intermittently rotated, each by a regular angle; the cylindrical cam 20, the barrel cam 34, etc. cooperate with each other to provide, as an intermittent-rotation-member driving device, a table-rotating device which intermittently rotates the index table 42; and the EC suction nozzles 80 provide a plurality of holding devices each of which holds an EC as an actual object to be image-processed and which are provided on the index table 42 such that the holding devices are spaced from one another by a regular angle corresponding to the angle of each intermittent rotation of the index table 42.

The present image processing apparatus is provided in such a manner that the processing apparatus is opposed to an actual object being held by each holding device being stopped at one of the stopping positions thereof, so that the image pick-up device of the processing apparatus picks up an actual image of the actual object and the image-data memory successively stores a plurality of batches of image data representing a plurality of actual images picked up the image pick-up device. The processing apparatus is designed to complete the processing of each of the batches of image data during the same number of intermittent rotations of the index table 42 as the number of the batches of image data stored in the image-data memory. The index table 42, the table-rotating device, the holding devices, and the image processing apparatus cooperate with one another to provide an electronic-component feeding system which sequentially feeds an EC to each of the twenty operative positions as the stopping positions of the holding devices.

The foregoing description relates to the case where the designated center DC of an actual object is located at the origin of the reference coordinate plane. A designated center may be located a position other than the origin of the reference coordinate plane. In the latter case, a positional (or angular) error between the designated center DC and the origin of the reference coordinate plane is added to a positional (or angular) error between a rotation center RC and the designated center DC and a positional (or angular) difference between the individual-template coordinate plane and the reference coordinate plane. Thus, a positional (or angular) error of the designated center DC from the origin of the reference coordinate plane is obtained.

While the present invention has been described in its preferred embodiment, the present invention may otherwise be embodied.

For example, although in the illustrated embodiment the X-direction and Y-direction size factors are determined to deal with the case where different size errors occur in the X and Y directions, respectively. However, it is possible to determine a single size factor under the assumption that the X- and Y-direction size factors are equal to the single size factor. For example, regarding the actual image 250 of the rectangular EC chip shown in FIG. 28, a single size factor may be defined as an average of (a) respective values calculated by dividing, by the reference X-direction span, each of the measured X-direction spans obtained on all sets of paired seek lines, except for a set of paired seek lines including a failure seek line, which extend parallel to the X axis, and (b) respective values calculated by dividing, by the reference Y-direction span, each of the measured Y-direction spans obtained on all sets of paired seek lines, except for a set of paired seek lines including a failure seek line, which extend parallel to the Y axis. The thus obtained single size factor is used for determining size points on both the seek lines parallel to the X axis and the seek lines parallel to the Y axis.

A single size factor may be determined for the actual image 260 of the circular PCB mark shown in FIG. 43. The single size factor is obtained as an average of respective values calculated by dividing, by the reference span, each of the measured spans obtained on all sets of paired seek lines, except for a set of paired seek lines including a failure seek line. Size points are determined by multiplying, by the thus obtained single size factor, each of the values, pairRadius, calculated on all the seek lines except for the failure seek line. Subsequently, the positional errors, Diff, between the size points and the corresponding edge points are calculated. In this case, position factors and the manner of calculation of position factors are not changed.

While in the illustrated embodiment the image processing of each actual object includes a single re-seek step, it is possible that the image processing of each actual object include a plurality of re-seek steps. If in the first re-seek step the CPU 154 recognizes not more than a predetermined amount of failures, the CPU 154 determines edge points on the seek lines except for the failure seek lines and then produce another re-seek template to carry out another re-seek step. The second re-seek template is made based on the first re-seek template, and the edge points determined, in the first re-seek step, in such a manner that the second re-seek template has smaller positional and angular errors with respect to the actual object. Experiences indicate that when a plurality of re-seek steps are carried out, the possibility that a failure occurs in the measure step is low as compared with when a single re-seek step is carried out. If, in the seek step, an actual object is judged to be identical with a reference object though there is a large error between a seek template and the actual object, there may be a large error between a re-seek template and the actual object. In the latter case, in the measure step, there will be a large error between a measure template and the actual object so that one or more failures may occur. On the other hand, if a plurality of re-seek steps are carried out, then there would be a smaller error between the measure template and the actual object.

In the case where the present image processing apparatus has data indicative of a shape and approximate position and rotation angle of an actual object, the CPU 154 do not have to produce any seek templates and can directly produce a measure template at an appropriate position where seek lines of the measure template can be used to specify edge points thereon. In this case, the judging means may be omitted.

While in the illustrated embodiment the measure step is carried out following the re-seek step in which the re-seek template is used, the re-seek step may be omitted in the case where a possible size error or a possible shape defect of an actual object is considerably small. In this case, the measure step is carried out directly after the seek step. Although the re-seek template may be used as the measure template, it is preferred to use a measure template including a greater number of seek lines than that of the re-seek template.

In the illustrated embodiment, the CPU 154 finds an abnormality with the pattern-matching process when the CPU 154 recognizes a greater number of failures than a predetermined number of failures which are permitted according to the pattern-matching program. However, the present image processing apparatus may employ both (a) a program wherein an abnormality is identified when at least one failure is recognized and the calculation of object vectors are carried out on only actual objects free from failure, and (b) a program wherein at least one failure is permitted and the calculation of object vectors are carried out in spite of the recognition of failure. In the latter case, the processing apparatus may be modified such that the operator can select one of the above-described first and second programs. In some cases, the first program can advantageously be selected to reduce respective times needed to image-process ECs 82 and thereby reduce a total time needed to mount the ECs 82 on each PCB 90.

The present image processing apparatus includes the image pick-up device which takes an optical image of a front surface of an actual object to be image-processed, and also includes the lighting device of a front-side-lighting type which irradiates the front surface of the actual object. In contrast to the case where an optical image of a projection of a rear surface of an actual object is picked up, the present processing apparatus need not employ a light emitting plate or a light reflecting plate on each EC suction nozzle 80. Thus, each EC suction nozzle 80 enjoys a lighter weight, and can be moved at a higher speed. In addition, a greater number of EC suction nozzles 80 can be provided with smaller spacings being provided therebetween. After all, more sorts of ECs can be mounted on PCBs 90 at a higher speed by the EC mounting system.

The present invention is applicable to an image processing apparatus which is employed in an EC mounting system including an image pick-up device which picks up an optical image of a projection of a rear surface of an actual object.

In addition, the present invention is applicable to various sorts of image processing apparatus, such as one which is employed in an EC mounting system which mounts ECs on PCBs by straightly moving each EC suction nozzle between an EC supplying device and each PCB, or one which is employed in a screen printing machine to pick up an actual image of a reference mark and image-process the picked-up actual image of the mark. Moreover, actual objects to be image-processed are by no means limited to ECs or PCB marks and may be any actual objects which require the recognition thereof or the calculation of object vectors therefor.

It is to be understood that the present invention may be embodied with other changes, improvements, and modifications that may occur to those skilled in the art without departing from the spirit and scope of the invention defined in the appended claims.

What is claimed is:

1. An image processing apparatus comprising:
    an image pick-up device which picks up an optical image of at least a portion of an actual object and a background thereof;
    an image data memory which stores image data representing said optical image picked up by said image pick-up device, said image data defining a plurality of optical-characteristic values corresponding to a plurality of positions in said optical image, respectively;
    a seek-template data memory which stores seek-template data representing at least one seek template, said seek template including a plurality of pairs of points which correspond to a reference edge line of at least a portion of a reference object, said seek-template data including a plurality of sets of paired-points position data each set of which defines respective positions of the two points of a corresponding one of said pairs such that one of said two points is located inside said reference edge line and the other of said two points is located outside said reference edge line; and
    processing means for processing said image data and said seek-template data so that said seek template represented by the seek-template data is superposed on said optical image represented by said image data, said processing means comprising judging means for making, when the optical-characteristic values of said optical image which correspond to the two points of each of said pairs satisfy a predetermined condition relating to an amount of difference between the optical-characteristic values inside and outside an actual edge line of said actual object in said optical image, an individual positive judgement that one of said two points of said each pair is located inside said actual edge line and the other point of said each pair is located outside said actual edge line, and further making, when said individual positive judgment is made with respect to the two points of each pair out of not less than a predetermined amount of said pairs, a total positive judgment that said actual object in said optical image is identical with said reference object.

2. An image processing apparatus according to claim 1, wherein said judging means comprises means for judging whether a difference of the optical-characteristic value of said optical image which corresponds to said one point of said each pair and the optical-characteristic value of said optical image which corresponds to said other point of said each pair satisfies said predetermined condition.

3. An image processing apparatus according to claim 1, wherein said judging means comprises means for judging whether a ratio of the optical-characteristic value of said optical image which corresponds to said one point of said each pair to the optical-characteristic value of said optical image which corresponds to said other point of said each pair satisfies said predetermined condition.

4. An image processing apparatus according to claim 1, wherein said judging means comprises means for judging whether said individual positive judgment is made with respect to the two points of each of not less than a predetermined number of said pairs.

5. An image processing apparatus according to claim 1, wherein said judging means comprises means for judging whether said individual positive judgment is made with respect to the two points of each of not less than a predetermined proportion of said pairs.

6. An image processing apparatus according to claim 1, further comprising a measure-template data memory which stores, for said actual object which is judged by said judging means to be identical with said reference object, measure-template data representing at least one measure template, said measure template including a plurality of segments each of which intersects said reference edge line of said reference object, said measure-template data including a plurality of sets of segment data each set of which defines a corresponding one of said segments such that said one segment connects between two points one of which is located inside said reference edge line and the other of which is located outside said reference edge line,
    wherein said processing means further comprises edge-point specifying means for specifying, based the optical-characteristic values of said optical image which correspond to each of said segments, an edge point on said each segment which point is located on said actual edge line of said actual object in said optical image.

7. An image processing apparatus according to claim 6, wherein said processing means further comprises re-judging means for making, based on the edge points specified on said segments by said edge-point specifying means, a positive re-judgment that said actual object in said optical image is identical with said reference object.

8. An image processing apparatus according to claim 7, wherein said re-judging means comprises middle-pointutilizing judging means for making said positive re-judgment based on respective positional errors of said edge points specified on said segments from corresponding middle points of the segments.

9. An image processing apparatus according to claim 6, wherein said processing means further comprises object-parameter calculating means for calculating, based on the edge points specified on said segments by said edge-point specifying means, at least one of a size, a position, and a rotation amount of said actual object.

10. An image processing apparatus according to claim 9, wherein said object-parameter calculating means comprises middle-point-utilizing calculating means for calculating said at least one of said size, said position, and said rotation amount of said actual object, based on respective positional errors of said edge points specified on said segments from corresponding middle points of the segments.

11. An image processing apparatus according to claim 1, wherein said processing means further comprises repeating means for consecutively operating said judging means to judge whether said actual object in said optical image is identical with said reference object, by using each of a plurality of seek templates different from said seek template with respect to at least one of position and rotation angle, until the judging means makes said total positive judgment.

12. An image processing apparatus according to claim 6, wherein said processing means further comprises:
  repeating means for consecutively operating said judging means to judge whether said actual object in said optical image is identical with said reference object, by using each of a plurality of second seek templates different from said seek template as a first seek template with respect to at least one of position and rotation angle, until the judging means makes said total positive judgment; and
  first segment-producing means for producing said segments of said measure template by straightly connecting between the two pints of each pair out of the pairs of points of one of said first and second seek templates with which template said actual object has been judged to be identical with said reference object by said judging means.

13. An image processing apparatus according to claim 12, wherein said processing means further comprises second segment-producing means for producing a plurality of segments of a re-measure template different from said measure template, based on the edge points specified on said segments of said measure template by said edge-point specifying means, and wherein said edge-point specifying means comprises means for specifying respective edge points on said segments of said re-measure template.

14. An image processing apparatus according to claim 13, wherein said second segment-producing means comprises means for producing said re-measure template including a greater number of said segments than a number of said segments of said measure template produced by said first segment-producing means, based on said edge points specified on said segments of said measure template by said edge-point specifying means and master-measure-template data representing a master measure template.

15. An image processing apparatus according to claim 6, wherein said edge-point specifying means comprises:
  means for calculating the optical characteristic value of said optical image which corresponds to each of division points determined on said each segment; and
  means for specifying, as said edge point, a point on said each segment where the calculated optical characteristic values corresponding to said division points most significantly change.

16. An image processing apparatus according to claim 15, wherein said image pick-up device comprises a plurality of image pick-up elements each of which detects a light incident thereto and produces an electric signal indicative of an optical characteristic value of the received light, and wherein said edge-point specifying means further comprises means for determining said division points on said each segment at a regular interval of distance which is shorter than a regular interval of distance of said image-pick up elements of said image pick-up device.

17. An image processing apparatus according to claim 1, wherein said image pick-up device comprises a plurality of image pick-up elements each of which detects a light incident thereto and produces an electric signal indicative of an optical-characteristic value of the received light, wherein said image-data memory stores a set of picture-element data representing the optical-characteristic value indicated by the electric signal produced by said each image pick-up element, in relation with a position of said each image pick-up element in said image pick-up device, and wherein said processing means further comprises designating means for designating a plurality of virtual points on a virtual screen corresponding to a physical screen defined by said image pick-up elements, and means for calculating the optical characteristic value of said optical image which corresponds to each of the virtual points designated by said designating means.

18. An image processing apparatus according to claim 1, further comprising:
  a monitor device which displays said optical image and said seek template superposed on the optical image, based on said image data and said seek-template data; and
  an input device which is operable for inputting input-related data into said processing means,
  and wherein said processing means further comprises control means for operating said monitor device to display, when said input-related data are input through operation of said input device while the monitor device displays said optical image and said seek template, an image corresponding to the input-related data, in place of at least a portion of the optical image and the seek template.

19. An image processing apparatus comprising:
  an image pick-up device which picks up an optical image of at least a portion of an actual object and a background thereof;
  an image data memory which stores image data representing said optical image picked up by said image pick-up device, said image data defining a plurality of optical-characteristic values corresponding to a plurality of positions in said optical image, respectively;
  a measure-template data memory which stores measure-template data representing at least one measure template, said measure template including a plurality of segments each of which intersects a reference edge line of at least a portion of a reference object, said measure-template data including a plurality of sets of segment data each set of which defines a corresponding one of said segments such that said one segment connects between two points one of which is located inside said reference edge line and the other of which is located outside said reference edge line; and
  processing means for processing said image data and said measure-template data so that said measure template represented by the measure-template data is superposed on said optical image represented by the image data, said image-data processing means including edge-point specifying means for specifying, based on the optical-characteristic values of said optical image which correspond to each of said segments, an edge point on said each segment which point is located on an actual edge line of said actual object in said optical image.

20. An image processing apparatus according to claim 19, wherein said measure-template data memory stores said measure-template data defining said at least one measure template in a coordinate system, said edge-point specifying means comprising means for determining coordinate values of said edge point in said coordinate system.

21. An image processing apparatus according to claim 19, wherein said edge-point specifying means comprises means for specifying, based on said image data stored in said image-data memory, said edge point on said each segment such that the specified edge point corresponds to a maximum value of respective absolute values of change rates of the optical characteristic values of said optical image which correspond to said each segment.

22. An image processing apparatus according to claim 21, wherein said processing means further comprises failure-treating means for recognizing, when said maximum value of said respective absolute values of said rates of change is smaller than a reference value, a failure with said each segment and inhibiting said edge-point specifying means from specifying said edge point on said each segment with which said failure is recognized.

23. An image processing apparatus according to claim 22, wherein said processing means further comprises:

object-parameter calculating means for calculating, based on the edge points specified on said segments by said edge-point specifying means, at least one of a size, a position, and a rotation amount of said actual object; and control means for operating, when said failure-treating means recognizes said failure on each of not more than a predetermined amount of segments out of said segments, said object-parameter calculating means to calculate said at least one of said size, said position, and said rotation amount of said actual object, and inhibiting, when said failure-treating means recognizes said failure on each of more than said predetermined amount of segments, said calculating means from calculating said size, said position, and said rotation amount.

24. An image processing apparatus according to claim 23, wherein said object-parameter calculating means comprises positional-error determining means for determining, based on positional errors between said edge points specified on said segments by said edge-point specifying means, and corresponding ones of a plurality of target edge points, a positional error of a first position of a representative point of said actual object from a second position of a reference representative point.

25. An image processing apparatus according to claim 24, wherein said object-parameter calculating means further comprises:

size determining means for determining said size of said actual object; and size-factor determining means for determining a size factor defined by a ratio of said size determined by said size determining means, to a reference size of said reference object, and wherein said positional-error determining means comprises target-edge-point determining means for determining said target edge points based on said size factor determined by said size-factor determining means and a plurality of reference edge points corresponding to said reference edge line of said reference object having said reference size.

26. An image processing apparatus according to claim 25, wherein said size-factor determining means comprises single-size-factor determining means for determining, as said size factor, an average of respective ratios of a plurality of actual dimensions of said actual object in a plurality of different directions, to a plurality of reference dimensions of said reference object in said different directions.

27. An image processing apparatus according to claim 25, wherein said size-factor determining means comprises plural-size-factors determining means for determining, as said size factor with respect to each of a plurality of different directions, a ratio of an actual dimension of said actual object in said optical image in said each direction, to a reference dimension of said reference object in said each direction.

28. An electronic-component feeding system, comprising:

a plurality of holding devices each of which is adapted to hold an electronic component as an actual object, is rotated about an axis line, and is sequentially moved to each of a plurality of stopping positions where said each holding device is stopped, so that said electronic component held by said each holding device is fed from a start position as one of said stopping positions to an end position as another of said stopping positions;

an image pick-up device which is provided at an intermediate position between said start and end positions, and picks ups an optical image of at least a portion of said electronic component held by said each holding device, and a background thereof;

an image data memory which stores image data representing said optical image picked up by said image pick-up device, said image data defining a plurality of optical-characteristic values corresponding to a plurality of positions in said optical image, respectively;

a seek-template data memory which stores seek-template data representing at least one seek template, said seek template including a plurality of pairs of points which correspond to a reference edge line of at least a portion of a reference object, said seek-template data including a plurality of sets of paired-points position data, each set of which defines respective positions of the two points of a corresponding one of said pairs such that one of said two points is located inside said reference edge line and the other of said two points is located outside said reference edge line; and processing means for processing said image data and said seek-template data so that said seek template represented by the seek-template data is superposed on said optical image represented by said image data, said processing means comprising judging means for making, when the optical-characteristic values of said optical image which correspond to the two points of each of said pairs satisfy a predetermined condition relating to an amount of difference between the optical-characteristic values inside and outside an actual edge line of said actual object in said optical image, an individual positive judgment that one of said two points of said each pair is located inside said actual edge line and the other point of said each pair is located outside said actual edge line, and further making, when said individual positive judgment is made with respect to the two points of each pair out of not less than a predetermined amount of said pairs, a total positive judgment that said actual object in said optical image is identical with said reference object.

29. An electronic-component feeding system according to claim 28, wherein said each holding device receives said electronic component from an electronic-component supplying device, at a receiving position as said start position, and mounts said electronic component on a substrate as said actual object, at a mounting position as said end position.

30. A method of processing image data representing an optical image of at least a portion of an actual object and a background thereof, comprising the steps of:

picking up said optical image by using an image pick-up device, storing, in an image data memory, said image data representing said optical image picked up by said image pick-up device, said image data defining a plurality of optical-characteristic values corresponding to a plurality of positions in said optical image, respectively, storing, in a seek-template data memory, seek-template data representing at least one seek template, said seek template including a plurality of pairs of points which correspond to a reference edge line of at least a portion of a reference object, said seek-template data including a plurality of sets of paired-points position data each set of which defines respective positions of the two points of a corresponding one of said pairs such that one of said two points is located inside said reference edge line and the other of said two points is located outside said reference edge line, and processing said image data and said seek-template data so that said seek template represented by the seek-template data is superposed on said optical image represented by said image data, wherein, when the optical-characteristic values of said optical image which correspond to the two points of each of said pairs satisfy a predetermined condition relating to an amount of difference between the optical-characteristic values inside and outside an actual edge line of said actual object in said optical image, an individual positive judgement is made that one of said two points of said each pair is located inside said actual edge line and the other point of said each pair is located outside said actual edge line, and wherein, when said individual positive judgment is made with respect to the two points of each of not less than a predetermined amount of said pairs, a total positive judgment is made that said actual object in said optical image is identical with said reference object.

31. A method according to claim 30, further comprising the steps of:

storing, in a measure-template data memory, measure-template data representing at least one measure template, for said actual object which is judged to be identical with said reference object, said measure template including a plurality of segments each of which intersects said reference edge line of said reference object, said measure-template data including a plurality of sets of segment data each set of which defines a corresponding one of said segments such that said one segment connects between two points one of which is located inside said reference edge line and the other of which is located outside said reference edge line, and specifying, based the optical-characteristic values of said optical image which correspond to each of said segments, an edge point on said each segment which point is located on said actual edge line of said actual object in said optical image.

32. A method according to claim 30, wherein the step of processing said image data comprises processing said image data representing an optical image of a portion of an electronic component as said portion of said actual object and a background of said portion of said electronic component.

33. A method according to claim 30, wherein the step of processing said image data comprises processing said image data representing an optical image of a whole of an electronic component as a whole of said actual object and a background of said whole of said electronic component.

34. A method of processing an optical image of at least a portion of an actual object and a background thereof, comprising the steps of:

picking up said optical image by using an image pick-up device, storing, in an image data memory, image data representing said optical image picked up by said image pick-up device, said image data defining a plurality of optical-characteristic values corresponding to a plurality of positions in said optical image, respectively, storing, in a measure-template data memory, measure-template data representing at least one measure template, said measure template including a plurality of segments each of which intersects a reference edge line of at least a portion of a reference object, said measure-template data including a plurality of sets of segment data each set of which defines a corresponding one of said segments such that said one segment connects between two points one of which is located inside said reference edge line and the other of which is located outside said reference edge line, and processing said image data and said measure-template data so that said measure template represented by the measure-template data is superposed on said optical image represented by the image data, wherein, based the optical-characteristic values of said optical image which correspond to each of said segments, an edge point is specified on said each segment such that said edge point is located on an actual edge line of said actual object in said optical image.

35. A method according to claim 34, wherein the step of processing said image data comprises processing said image data representing an optical image of a portion of an electronic component as said portion of said actual object and a background of said portion of said electronic component.

36. A method according to claim 34, wherein the step of processing said image data comprises processing said image data representing an optical image of a whole of an electronic component as a whole of said actual object and a background of said whole of said electronic component.

37. An electronic-component feeding system according to claim 28, wherein said image-data memory concurrently stores a first number of batches of image data representing respective images of the electronic components held by said first number of holding devices out of said holding devices, said first number being not greater than a second number of holding devices present between said intermediate position and said end position, and wherein said image processing apparatus finishes the processing of each batch of image data out of said first number of batches of image data, before the electronic component corresponding to said each batch of image data is moved to said end position.

38. An electronic-component feeding system, comprising:

a plurality of holding devices each of which is adapted to hold an electronic component as an actual object, is rotated about an axis line, and is sequentially moved to each of a plurality of stopping positions where said each holding device is stopped, so that said electronic component held by said each holding device is fed from a start position as one of said stopping positions to an end position as another of said stopping positions;

an image pick-up device which is provided at an intermediate position between said start and end positions, and picks up an optical image of at least a portion of said electronic component held by said each holding device, and a background thereof;

an image data memory which stores image data representing said optical image picked up by said image pickup device, said image data defining a plurality of optical-characteristic values corresponding to a plurality of positions in said optical image, respectively;

a measure-template data memory which stores measure-template data representing at least one measure template, said measure template including a plurality of segments each of which intersects a reference edge line of at least a portion of a reference object, said measure-template data including a plurality of sets of segment data each set of which defines a corresponding one of said segments such that said one segment connects between two points, one of which is located inside said reference edge line and the other of which is located outside said reference edge line; and processing means for processing said image data and said measure-template data so that said measure template represented by the measure-template data is superposed on said optical image represented by the image data, said image-data processing means including edge-point specifying means for specifying, based the optical-characteristic values of said optical image which correspond to each of said segments, an edge point on said each segment, which point is located on an actual edge line of said actual object in said optical image.

39. An electronic-component feeding system according to claim 38, wherein said image-data memory concurrently stores a first number of batches of image data representing respective images of the electronic components held by said first number of holding devices out of said holding devices, said first number being not greater than a second number of holding devices present between said intermediate position and said end position, and wherein said image processing apparatus finishes the processing of each batch of image data out of said first number of batches of image data, before the electronic component corresponding to said each batch of image data is moved to said end position.

40. An electronic-component feeding system according to claim 38, wherein said each holding device receives said electronic component from an electronic-component supplying device, at a receiving position as said start position, and mounts said electronic component on a substrate as said actual object, at a mounting position as said end position.

* * * * *